(12) United States Patent
Meroueh

(10) Patent No.: US 11,655,148 B2
(45) Date of Patent: May 23, 2023

(54) HYDROGEN GENERATING REACTIONS

(71) Applicant: Massachusetts Institute of Technology, Cambridge, MA (US)

(72) Inventor: Laureen Meroueh, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 164 days.

(21) Appl. No.: 16/891,014

(22) Filed: Jun. 2, 2020

(65) Prior Publication Data

US 2021/0276866 A1     Sep. 9, 2021

Related U.S. Application Data

(60) Provisional application No. 62/984,423, filed on Mar. 3, 2020.

(51) Int. Cl.
| | | |
|---|---|---|
| *C22C 21/08* | (2006.01) | |
| *C01B 3/08* | (2006.01) | |
| *C23C 10/26* | (2006.01) | |
| *B01J 7/02* | (2006.01) | |
| *B01J 8/00* | (2006.01) | |
| *C01B 3/02* | (2006.01) | |
| *C22F 1/047* | (2006.01) | |
| *B01J 4/00* | (2006.01) | |

(52) U.S. Cl.
CPC .................. *C01B 3/08* (2013.01); *B01J 7/02* (2013.01); *B01J 8/00* (2013.01); *B01J 8/0015* (2013.01); *C01B 3/02* (2013.01); *C22C 21/08* (2013.01); *C23C 10/26* (2013.01); *B01J 4/001* (2013.01); *B01J 4/008* (2013.01); *B01J 2208/00628* (2013.01); *B01J 2208/00743* (2013.01); *B01J 2219/00274* (2013.01); *C22F 1/047* (2013.01)

(58) Field of Classification Search
CPC .......... C22C 21/04; C22C 21/08; C22C 21/00; C22C 21/02; C22C 21/06; C22F 1/043; C22F 1/047
See application file for complete search history.

(56) References Cited

U.S. PATENT DOCUMENTS

2010/0209288 A1*   8/2010   Marya ..................... C22F 1/047
  148/702
2020/0199728 A1   6/2020   Slocum

FOREIGN PATENT DOCUMENTS

EP            1719820 A2 *   11/2006   ............. C22C 21/06

OTHER PUBLICATIONS

F. Weill, G. Wyon, Superplastic Behaviour of Fine Grained Aluminium Alloys Whose Grain-boundaries Have Been Enriched by Gallium, Strength of Metals and Alloys, Pergamon, 1979, pp. 387-392, ISBN 9781483284125, https://doi.org/10.1016/B978-1-4832-8412-5.50070-9.*

Trenikhin, M.V., Bubnov, A.V., Kozlov, A.G. et al. The penetration of indium-gallium melt components into aluminum. Russ. J. Phys. Chem. 80, 1110-1114 (2006). https://doi.org/10.1134/S0036024406070193.*

Uan, Jun-Yen, and Cheng-Chia Chang. "Characterization of gallium-induced intergranular fracture surface and the Auger electron spectroscopic analysis for mg grain boundary segregation in AA6061 T4 Al—Mg—Si alloy." Materials transactions 45.6 (2004): 1925-1932.*

* cited by examiner

*Primary Examiner* — Jessee R Roe

(74) *Attorney, Agent, or Firm* — Wolf, Greenfield & Sacks, P.C.

(57) ABSTRACT

Compositions, methods, and reactors related to hydrogen production are generally described.

17 Claims, 66 Drawing Sheets

400

402 — Selectively combine water with first reactant and/or second reactant

404 — Generate hydrogen gas from reaction

406 — Monitor parameter of reaction

FIG. 10A

| Elt. | Intensity (cs) | Atomic % | Conc. (wt.%) |
|---|---|---|---|
| C | 67.29 | 8.30 | 2.33 |
| Mg | 1,877.43 | 16.57 | 9.41 |
| Al | 3,841.82 | 30.05 | 18.94 |
| Si | 338.79 | 2.42 | 1.59 |
| Fe | 111.68 | 0.43 | 0.56 |
| Ga | 4,131.00 | 40.94 | 66.69 |

| Elt. | Line | Intensity (c/s) | Atomic % | Conc. (wt.%) |
|---|---|---|---|---|
| O | Kα | 270.18 | 8.95 | 4.59 |
| Mg | Kα | 479.60 | 3.83 | 2.98 |
| Al | Kα | 9,453.59 | 72.18 | 62.34 |
| Si | Kα | 313.30 | 3.41 | 3.07 |
| Fe | Kα | 36.09 | 0.52 | 0.92 |
| Ga | Kα | 190.26 | 10.20 | 22.77 |
| In | Lα | 95.33 | 0.91 | 3.33 |

| Elt. | Line | Intensity (c/s) | Atomic % | Conc. (wt.%) |
|---|---|---|---|---|
| O | Kα | 235.37 | 6.16 | 3.73 |
| Mg | Kα | 331.26 | 0.84 | 0.78 |
| Al | Kα | 33,912.45 | 89.43 | 91.32 |
| Si | Kα | 460.60 | 3.30 | 3.51 |
| Fe | Kα | 25.66 | 0.12 | 0.25 |
| Ga | Kα | 12.76 | 0.13 | 0.34 |
| In | Lα | 4.01 | 0.02 | 0.08 |

| Elt. | Line | Intensity (c/s) | Atomic % | Conc. (wt.%) |
|---|---|---|---|---|
| O | Kα | 128.91 | 3.33 | 1.90 |
| Mg | Kα | 961.49 | 3.14 | 2.72 |
| Al | Kα | 25,803.96 | 82.02 | 78.86 |
| Si | Kα | 946.99 | 6.56 | 6.57 |
| Fe | Kα | 1,010.05 | 4.81 | 9.58 |
| Ga | Kα | 8.40 | 0.09 | 0.22 |
| In | Lα | 8.45 | 0.04 | 0.15 |

HYDROGEN GENERATING REACTIONS

CROSS-REFERENCE TO RELATED APPLICATIONS

This application claims the benefit under 35 U.S.C. § 119(e) of U.S. provisional application Ser. No. 62/984,423, filed on Mar. 3, 2020, the disclosure of which is incorporated herein by reference in its entirety.

TECHNICAL FIELD

Compositions, methods, and reactors related to hydrogen production are generally described.

BACKGROUND

Hydrogen has been well recognized as an emission-free fuel holding promise for a more sustainable energy economy compared to fossil fuels. Oxidation-reduction reactions involving metals can produce hydrogen on-demand, eliminating the cost and safety concerns of storing hydrogen as a gas or liquid at high-pressure. Aluminum (Al), for example, reacts with water to produce hydrogen at room temperature and atmospheric pressure. The main obstacle that prevents wide-spread utilization of the aluminum-water reaction, however, is the stable passive oxide layer, $Al_2O_3$, that forms on the surface of aluminum and prohibits the aluminum-water reaction from proceeding.

Hydrogen produced from such reactions can be stored at high pressure and/or low temperature using standard equipment like dewars or tanks. However, the hydrogen containers themselves are often bulky and may be significantly heavier than the hydrogen they contain.

SUMMARY

Compositions, methods, and reactors related to hydrogen production are generally described. The subject matter of the present disclosure involves, in some cases, interrelated products, alternative solutions to a particular problem, and/or a plurality of different uses of one or more systems and/or articles.

In certain embodiments, a composition is described, the composition comprising an aluminum alloy comprising less than or equal to 50 weight percent (wt. %) silicon (Si) and/or less than or equal to 50 wt. % magnesium (Mg) based on a total weight of the aluminum alloy, and wherein the aluminum alloy comprises an activating composition comprising gallium (Ga), and wherein the Ga is concentrated proximate to grain boundaries of the aluminum alloy.

In some embodiments, a method is described, the method comprising: exposing a surface of an aluminum alloy to an activating composition comprising gallium, wherein the aluminum alloy comprises less than or equal to 50 weight percent (wt. %) silicon (Si) and/or less than or equal to 50 wt. % magnesium (Mg) based on a total weight of the aluminum alloy; and permeating the activating composition through one or more grain boundaries and/or subgrain boundaries of the aluminum alloy for an amount of time.

According to certain embodiments, a method of producing hydrogen gas is described, the method comprising: exposing an activated aluminum alloy to water, wherein the activated aluminum alloy comprises less than or equal to 50 weight percent (wt. %) silicon (Si) and/or less than or equal to 50 wt. % magnesium (Mg) based on a total weight of the activated aluminum alloy, and wherein the activated aluminum alloy comprises an activating composition comprising gallium (Ga), and wherein the Ga is concentrated proximate to grain boundaries of the activated aluminum alloy; and producing hydrogen gas.

According to some embodiments, a reactor is described, the reactor comprising: a water source; a first reactant reservoir configured to contain a first reactant, wherein the first reactant reservoir and the water source are configured to selectively react the first reactant with water from the water source; and a second reactant reservoir configured to contain a second reactant, wherein the second reactant reservoir and the water source are configured to selectively react the second reactant with the water, wherein a first reaction of the water with the first reactant generates hydrogen gas, wherein a second reaction of the water with the second reactant generates hydrogen gas, and wherein a first reaction rate of the first reaction is different from a second reaction rate of the second reaction.

In certain embodiments, a system is described, the system comprising: a reactor configured to: selectively react water with a first reactant in a first reaction to generate hydrogen gas, and selectively react water with a second reactant in a second reaction to generate hydrogen gas, wherein a first reaction rate of the first reaction is different from a second reaction rate of the second reaction; and a processor operatively coupled to the reactor, the processor configured to: determine a desired hydrogen generation profile, and control the first reaction of the first reactant with water and the second reaction of the second reactant with water based at least in part on the desired hydrogen generation profile.

In some embodiments, a method is described, the method comprising: reacting a first reactant with water to generate hydrogen in a first reaction with a first reaction rate; and reacting a second reactant with the water to generate hydrogen in a second reaction with a second reaction rate, wherein the second reaction rate is different from the first reaction rate, wherein the first reactant comprises a first activated aluminum reactant and the second reactant comprises a second activated aluminum reactant.

Other advantages and novel features of the present disclosure will become apparent from the following detailed description of various non-limiting embodiments of the disclosure when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present disclosure will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the disclosure shown where illustration is not necessary to allow those of ordinary skill in the art to understand the disclosure. In the figures:

FIG. 10A is a flow diagram of one embodiment of a method for generating hydrogen gas;

DETAILED DESCRIPTION

Figure 1A:
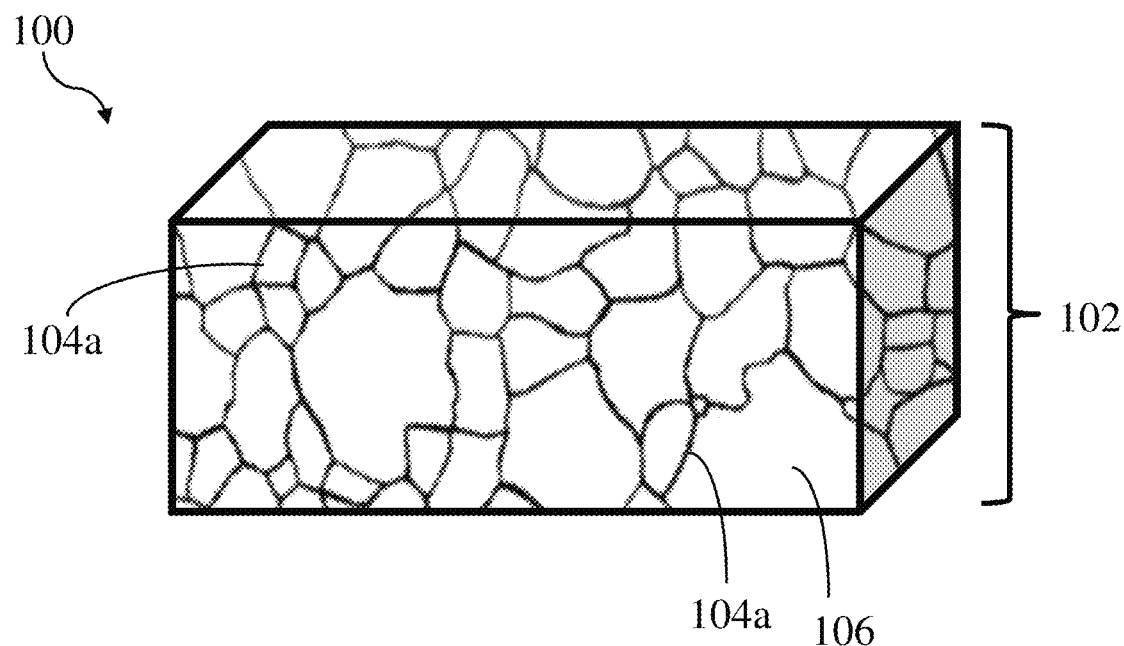
FIG. 1A shows, according to certain embodiments, a perspective view schematic diagram of a composition comprising an aluminum alloy and an activating composition.

In certain embodiments, hydrogen gas is produced by exposing a reactant (e.g., a metal) to water. The Inventor has realized and appreciated that the rate and amount of hydrogen produced from the hydrogen production reaction can be controlled by modifying the concentration of certain elements within the composition and/or modifying the grain size of the composition. In certain embodiments, the reactant comprises aluminum (Al) and/or alloys thereof. Without wishing to be bound by theory, using aluminum or an aluminum alloy as the reactant, hydrogen may be produced according to either of the following exothermic reactions shown in Equations (1) and (2):

$$2Al + 6H_2O \rightarrow 3H_2 + 2Al(OH)_3 + Q1 \quad (1)$$

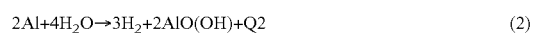

$$2Al + 4H_2O \rightarrow 3H_2 + 2AlO(OH) + Q2 \quad (2)$$

wherein Q1 and/or Q2 is between 840 kJ to 880 kJ of heat, depending on the extent of the reaction.

Although aluminum has a high energy density (29 MJ/kg), the metal inherently reacts with ambient dioxygen in the atmosphere to form a stable passive oxide layer (i.e., $Al_2O_3$) that prohibits the aluminum-water reaction from proceeding when the aluminum is exposed to water. The Inventor has realized, however, that activating the reactant (e.g., aluminum alloy) prior to exposure to water not only allows the inertness afforded by the passivation layer to be bypassed, but also allows the rate and/or amount of hydrogen produced to be finely-tuned. In some embodiments, for example, the reactant is activated by applying an activating composition that permeates through the grain boundaries of the reactant microstructure. The reactant may also be further controlled, in certain embodiments, by subjecting the reactant to a rolling process (e.g., cold rolling) in order to manipulate the grain structure of the reactant. Altering various microstructural variables, such as the reactant composition and grain size, may affect the permeation of the activating composition through one or more grain boundaries of the reactant microstructure, which in turn affects the rate of the hydrogen producing reaction when the composition is exposed to water. Advantageously, the compositions and methods described herein permit flexible manipulation of the reactant microstructure, thereby affording various hydrogen production rates depending on the compositional makeup and/or grain size. In certain embodiments, for example, depending on the composition of the aluminum alloy and/or the microstructure, the rate of hydrogen production may be increased by two orders of magnitude and/or decreased by an order of magnitude.

In addition to recognizing the benefits associated with the material compositions described herein, the Inventor has recognized that it may be undesirable to use large and/or heavy hydrogen tanks in certain applications. Thus, the Inventor has recognized that there may be benefits associated with using a chemical reaction to produce hydrogen on-demand, as described above and shown, for example, in Equations (1) and (2). Using a chemical reaction may obviate the need for separate hydrogen tanks and/or other hydrogen storage device. For example, in applications that are space and/or weight constrained, a smaller and/or lighter solution for producing hydrogen gas on-demand may have certain benefits over a larger and/or heavier gas tank or other storage device.

The Inventor has additionally appreciated that different reactants may be associated with different reaction rates. For example, a first reactant may react with water to produce hydrogen gas at a first slower rate, while a second reactant may react with water to produce hydrogen gas at a second faster rate. The Inventor has recognized and appreciated that reacting different reactants with different reaction rates at different times may enable control of an overall hydrogen generation profile. For example, a first reactant may be associated with a slow reaction rate which may comprise a lengthy "ramp up" period, in which the reaction takes time to reach steady state. During the ramp up period, a second reactant that may be associated with a faster reaction rate may be reacted to compensate for the reduced hydrogen output of the first reactant. Of course, other combinations of reactants including any desired number of reactants with corresponding different reaction rates are possible depending at least in part on different desired hydrogen generation profiles, as the disclosure is not limited in this regard.

According to some embodiments, a reactant is a composition comprising an aluminum alloy. As used herein, the term "alloy" is given its ordinary meaning in the art and generally refers to a metal made by combining at least two metallic elements. For example, in certain embodiments, the aluminum alloy comprises aluminum and at least one alloying element present in a concentration greater than a trace impurity present in the alloy, as is described in greater detail below. FIG. 1A shows, according to certain embodiments, a perspective view schematic diagram of composition 100 comprising aluminum alloy 102.

The aluminum alloy may comprise Al in any of a variety of suitable amounts. In certain embodiments, for example, the aluminum alloy comprises greater than or equal to 50 weight percent (wt. %) Al, greater than or equal to 60 wt. % Al, greater than or equal to 70 wt. % Al, greater than or equal to 80 wt. % Al, greater than or equal to 90 wt. % Al, greater than or equal to 95 wt. % Al, or greater than or equal to 99 wt. % Al based on the total weight of the aluminum alloy. In some embodiments, the aluminum alloy comprises less than or equal to 99.9 wt. % Al, less than or equal to 99 wt. % Al, less than or equal to 90 wt. % Al, less than or equal to 80 wt. % Al, less than or equal to 70 wt. % Al, or less than or equal to 60 wt. % Al based on the total weight of the aluminum alloy. Combinations of the above recited ranges are also possible (e.g., the aluminum alloy comprises greater than or equal to 50 wt. % Al and less than or equal to 99.9 wt. % Al based on the total weight of the aluminum alloy, the aluminum alloy comprises greater than or equal to 90 wt. % Al and less than or equal to 99 wt. % Al based on the total weight of the aluminum alloy). Other ranges are also possible. Additionally, in some embodiments, the aluminum alloy may comprise a non-reactant, such as aluminum dross. In certain embodiments, for example, the aluminum alloy may comprise a non-reactant in an amount of greater than or equal to 1 wt. % and less than or equal to 10 wt. % based on the total weight of the aluminum alloy. Methods of determining the amount of Al in the aluminum alloy include, but are not limited to, atomic absorption spectroscopy (AAS), energy-dispersive X-ray spectroscopy (EDS), X-ray fluorescence (XRF) analysis, and/or X-Ray diffraction (XRD).

As mentioned above, the aluminum alloy may comprise an alloying metal. Advantageously, the alloying element may affect (e.g., increase, decrease) the rate of the reaction between the aluminum alloy and water. In certain embodiments, the alloying element may also affect the rate of activating composition permeation through the aluminum alloy. In some embodiments, for example, one or more alloying elements (e.g., Si, Mg) may reduce the surface energy of the grain boundary, thereby decreasing the permeation rate of the activating composition and/or increasing the rate and/or amount of hydrogen produced due to enhanced grain boundary embrittlement. In some embodiments, intermetallic precipitates may affect the rate and/or extent of the activating composition permeation. In some embodiments, however, the rate of hydrogen generation may not be affected by the uniformity of permeation of the activating composition.

Any of a variety of suitable alloying elements may be utilized. For example, in some embodiments, the aluminum alloy comprises silicon (Si), magnesium (Mg), iron (Fe), copper (Cu), manganese (Mn), chromium (Cr), zinc (Zn), titanium (Ti) sodium (Na), calcium (Ca), and/or any appropriate combination thereof. In certain embodiments, the aluminum alloy comprises Si and/or Mg.

The aluminum alloy may comprise Si in any of a variety of suitable amounts. In some embodiments, for example, the aluminum alloy comprises greater than or equal to 0.1 wt. % Si, greater than or equal to 1 wt. % Si, greater than or equal to 5 wt. % Si, greater than or equal to 10 wt. % Si, greater than or equal to 20 wt. % Si, greater than or equal to 30 wt. % Si, or greater than or equal to 40 wt. % Si based on the total weight of the aluminum alloy. In certain embodiments, the aluminum alloy comprises less than or equal to 50 wt. % Si, less than or equal to 40 wt. % Si, less than or equal to 30 wt. % Si, less than or equal to 20 wt. % Si, less than or equal to 10 wt. % Si, less than or equal to 5 wt. % Si, or less than or equal to 1 wt. % Si based on the total weight of the aluminum alloy. Combinations of the above recited ranges are also possible (e.g., the aluminum alloy comprises greater than or equal to 0.1 wt. % Si and less than or equal to 50 wt. % Si based on the total weight of the aluminum alloy, the aluminum alloy comprises greater than or equal to 1 wt. % Si and less than or equal to 5 wt. % Si based on the total weight of the aluminum alloy). Other ranges are also possible.

The aluminum alloy may comprise Mg in any of a variety of suitable amounts. In some embodiments, for example, the aluminum alloy comprises greater than or equal to 0.1 wt. % Mg, greater than or equal to 1 wt. % Mg, greater than or equal to 5 wt. % Mg, greater than or equal to 10 wt. % Mg, greater than or equal to 20 wt. % Mg, greater than or equal to 30 wt. % Mg, or greater than or equal to 40 wt. % Mg based on the total weight of the aluminum alloy. In certain embodiments, the aluminum alloy comprises less than or equal to 50 wt. % Mg, less than or equal to 40 wt. % Mg, less than or equal to 30 wt. % Mg, less than or equal to 20 wt. % Mg, less than or equal to 10 wt. % Mg, less than or equal to 5 wt. % Mg, or less than or equal to 1 wt. % Mg based on the total weight of the aluminum alloy. Combinations of the above recited ranges are also possible (e.g., the aluminum alloy comprises greater than or equal to 0.1 wt. % Mg and less than or equal to 50 wt. % Mg based on the total weight of the aluminum alloy, the aluminum alloy comprises greater than or equal to 1 wt. % and less than or equal to 10 wt. % Mg based on the total weight of the aluminum alloy). Other ranges are also possible.

Depending on the particular embodiment, an aluminum alloy including the other above noted alloying elements may have them present in any appropriate concentration including weight percentages between or equal to 0.1 wt. % and 50 wt. %. However, other ranges are also possible.

Methods of determining the amount of an alloying metal in an aluminum alloy include, but are not limited to, AAS, EDS, XRF, and/or XRD.

In certain embodiments, the aluminum alloy may be manufactured by methods known to a person of ordinary skill in the art. For example, in certain embodiments, a substantially pure sample of aluminum may be melted to a molten liquid and doped with one or more alloying elements. In some embodiments, the aluminum and/or aluminum alloy may be commercially available (e.g., from Novelis, Inc.). For example, in certain embodiments, the aluminum may be a 1000 series aluminum (e.g., AA1060) that is separately doped with one more alloying elements. In other embodiments, the aluminum alloy may be a 1000 (e.g., AA1100), 4000 (e.g., AA4017), 5000 (e.g., AA5005), or 6000 series aluminum alloy (e.g., AA6061) in any temper (e.g., AA1100-0). In certain embodiments, the aluminum alloy may be scrap aluminum and/or recycled aluminum.

Although the depiction in FIG. 1A shows the aluminum alloy is a block shape, it should be understood that the depicted shape is non-limiting and any of a variety of suitable shapes and/or sizes for the aluminum alloy may be employed, including, but not limited to, two-dimensional and/or three-dimensional shapes, such as spheres, particles, cones, cubes, cylinders, pellets, plates, sheets, layers, powders, or the like. As described in further detail below, the aluminum alloy may be manufactured as a first structure (e.g., a three-dimensional block structure) and then processed to a second structure (e.g., microparticles) prior to exposing the composition to water.

The aluminum alloy may have any of a variety of suitable sizes. In certain embodiments, for example, the aluminum alloy may have one or more average characteristic dimensions (e.g., height, width, length, diameter) less than or equal to 10 centimeters, less than or equal to 5 centimeters, less than or equal to 1 centimeter, less than or equal to 5 millimeters, less than or equal to 1 millimeter, less than or equal to 500 micrometers, less than or equal to 100 micrometers, less than or equal to 50 micrometers, or less than or equal to 10 micrometers. In some embodiments, the aluminum alloy has one or more characteristic dimensions greater than or equal to 1 micrometer, greater than or equal to 10 micrometers, greater than or equal to 50 micrometers, greater than or equal to 100 micrometers, greater than or equal to 500 micrometers, greater than or equal to 1 millimeter, greater than or equal to 5 millimeters, greater than or equal to 1 centimeter, or greater than or equal to 5 centimeters. Combinations of the above recited ranges are also possible (e.g., the aluminum alloy has one or more average characteristic dimensions less than equal to 10 centimeters and greater than or equal to 1 micrometer, the aluminum alloy has one or more average characteristic dimensions less than or equal to 1 centimeter and greater than or equal to 1 millimeter). Other ranges are also possible.

The shape and/or size of the aluminum alloy may be tailored to a size suitable for the specific application using methods understood to a person of ordinary skill in art. For example, in some embodiments, the size of the aluminum alloy may be altered using milling and/or jet cutting, laser cutting, and/or any other appropriate manufacturing method. Additionally, the aluminum alloy may have any appropriate physical form including plates, pellets, powders, blocks, and/or any other form as the disclosure is not limited in this fashion.

In some embodiments, the composition comprises an activating composition that is permeated into the grain boundaries and/or subgrain boundaries of the composition to facilitate the reaction of water with the aluminum. The activating composition may comprise gallium, in some embodiments. Without wishing to be bound by theory, gallium may permeate through one or more grain boundaries and/or subgrain boundaries of the aluminum alloy. In certain embodiments, the activating composition comprises one or more constituents in addition to gallium that may also permeate through the one or more grain boundaries. A person of ordinary skill in the art would be aware of constituents that may be added to an aluminum alloy to circumvent the inertness afforded by the oxide passivation layer. In some embodiments, for example, the one or more additional constituents may be indium (In), tin (Sn), bismuth (Bi), and/or zinc (Zn). Other additional constituents may be utilized.

In certain embodiments, the activating composition may comprise 100 wt. % Ga based on the total weight of the activating composition.

The activating composition may comprise any of a variety of suitable amounts of gallium and indium. In certain embodiments, for example, the activating composition comprises greater than or equal to 70 wt. % Ga and less than or equal to 99.9 wt. % Ga based on the total weight of the activating composition. In some embodiments, the activating composition comprises greater than or equal to 0.1 wt. % In and less than or equal to 30 wt. % In based on the total weight of the activating composition.

The activating composition may comprise any of a variety of suitable amounts of gallium and tin. In certain embodiments, for example, the activating composition comprises greater than or equal to 50 wt. % Ga and less than or equal to 90 wt. % Ga based on the total weight of the activating composition. In some embodiments, the activating composition comprises greater than or equal to 10 wt. % Sn and less than or equal to 50 wt. % Sn based on the total weight of the activating composition.

The activating composition may comprise any of a variety of suitable amounts of gallium and bismuth. In certain embodiments, for example, the activating composition comprises greater than or equal to 10 wt. % Ga and less than or equal to 99 wt. % Ga based on the total weight of the activating composition. In some embodiments, the activating composition comprises greater than or equal to 1 wt. % Bi and less than or equal to 90 wt. % Bi based on the total weight of the activating composition.

The activating composition may comprise any of a variety of suitable amounts of gallium and zinc. In certain embodiments, for example, the activating composition comprises greater than or equal to 96.5 wt. % Ga and less than or equal to 100 wt. % Ga based on the total weight of the activating composition. In some embodiments, the activating composition comprises greater than or equal to 0 wt. % Zn and less than or equal to 3.5 wt. % Zn based on the total weight of the activating composition.

The activating composition may comprise any of a variety of suitable amounts of gallium, indium, tin, bismuth, and/or zinc. In certain embodiments, for example, the activating composition comprises greater than or equal to 30 wt. % Ga and less than or equal to 100 wt. % Ga based on the total weight of the activating composition. In some embodiments, the activating composition comprises greater than or equal to 0 wt. % In, Sn, Bi, and/or Zn and less than or equal to 70 wt. % In, Sn, Bi, and/or Zn based on the total weight of the activating composition.

In certain non-limiting embodiments, the activating composition is an eutectic composition (e.g., comprising gallium). As used herein, the term "eutectic" is given its ordinary meaning in the art and generally refers to a homogeneous mixture of substances that melts or solidifies at a temperature that is lower than the melting point of any of its constituents. While a eutectic composition may generally refer to a single composition where the liquid transitions directly from a liquid to a solid without the co-existence of separate liquid and solid phases, for purposes of this application, a eutectic composition may refer to a both hypereutectic and hypoeutectic compositions that are within 5 wt. % of an eutectic composition. In certain embodiments, the eutectic composition comprises gallium (Ga) and indium (In). Thus, given that the eutectic of indium and gallium is at 21.4 wt. % indium, a composition of indium and gallium may be considered to be eutectic for purposes of this application if it is between or equal to 16.4 wt. % indium and 26.4 wt. % indium.

An aluminum alloy may comprise any activating composition in any of a variety of suitable amounts. In some embodiments, for example, the aluminum alloy comprises greater than or equal to 0.1 wt. % of the activating composition, greater than or equal to 1 wt. % of the activating composition, greater than or equal to 5 wt. % of the activating composition, greater than or equal to 10 wt. % of the activating composition, greater than or equal to 20 wt. % of the activating composition, greater than or equal to 30 wt. % of the activating composition, or greater than or equal to 40 wt. % of the activating composition based on the total weight of the aluminum alloy. In certain embodiments, the aluminum alloy comprises less than or equal to 50 wt. % of the activating composition, less than or equal to 40 wt. % of the activating composition, less than or equal to 30 wt. % of the activating composition, less than or equal to 20 wt. % of the activating composition, less than or equal to 10 wt. % of the activating composition, less than or equal to 5 wt. % of the activating composition, or less than or equal to 1 wt. % of the activating composition based on the total weight of the aluminum alloy. Combinations of the above recited ranges are also possible (e.g., the aluminum alloy comprises greater than or equal to 0.1 wt. % of the activating composition and less than or equal to 50 wt. % of the activating composition based on the total weight of the aluminum alloy, the aluminum alloy comprises greater than or equal to 1 wt. % of the activating composition and less than or equal to 10 wt. % of the activating composition based on the total weight of aluminum alloy). Other ranges are also possible.

Figure 1B:
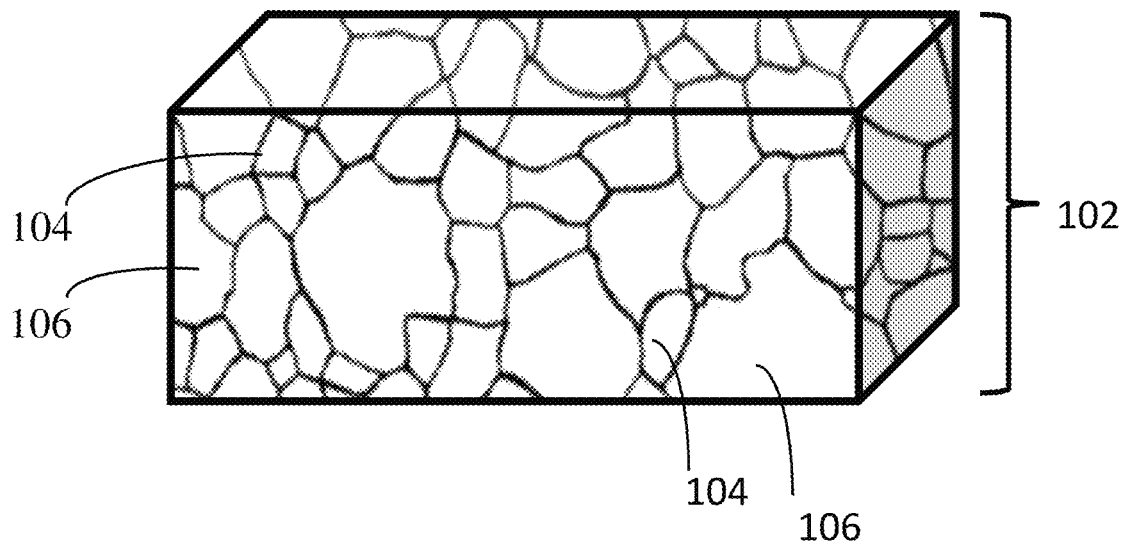
FIG. 1B shows, according to certain embodiments, a perspective view schematic diagram of an aluminum alloy comprising a plurality of grains and grain boundaries.

As would be understood by a person of ordinary skill in the art, the aluminum alloy comprises a plurality of grains. As used herein, the term "grain" is given its ordinary meaning in the art and generally refers to a region of metal having a given continuous crystal lattice orientation. The aluminum alloy may, in some embodiments, comprise a plurality of grain boundaries. The term "grain boundary" is given its ordinary meaning in the art and generally refers to the interface between two grains. Grain boundaries may be categorized, in some embodiments, according to the extent of misorientation between the two grains. For example, high-angle grain boundaries (e.g., grain boundaries) have a misorientation greater than about 15 degrees, and low-angle grain boundaries (e.g., subgrain boundaries) have a misorientation less than about 15 degrees. FIG. 1B shows, according to certain embodiments, a perspective view schematic diagram of an aluminum alloy comprising a plurality of grains and grain boundaries. As shown in FIG. 1B, aluminum alloy 102 comprises a plurality of grains 106 and a plurality of grain boundaries 104 at the interfaces between the plurality of grains 106.

In some embodiments, the composition comprises the activating composition within one or more grain boundaries and/or subgrain boundaries of the aluminum alloy. Referring to FIG. 1A, for example, composition 100 comprises aluminum alloy 102 comprising plurality of grain boundaries 104a, which are doped with an activating composition.

The plurality of grains may have any of a variety of suitable average grain sizes. In some embodiments, for example, the aluminum alloy comprises an average grain size greater than or equal to 10 micrometers, greater than or equal to 50 micrometers, greater than or equal to 100 micrometers, greater than or equal to 150 micrometers, greater than or equal to 200 micrometers, greater than or equal to 250 micrometers, greater than or equal to 300 micrometers, greater than or equal to 350 micrometers, greater than or equal to 400 micrometers, or greater than or equal to 450 micrometers. In certain embodiments, the aluminum alloy comprises an average grain size less than or equal to 500 micrometers, less than or equal to 450 micrometers, less than or equal to 400 micrometers, less than or equal to 350 micrometers, less than or equal to 300 micrometers, less than or equal to 250 micrometers, less than or equal to 200 micrometers, less than or equal to 150 micrometers, less than or equal to 100 micrometers, or less than or equal to 50 micrometers. Combinations of the above recited ranges are also possible (e.g., the aluminum alloy comprises an average grain size greater than or equal to 10 micrometers and less than or equal to 500 micrometers, the aluminum alloy comprises an average grain size greater than or equal to 100 micrometers and less than or equal to 200 micrometers). Other ranges are also possible. Methods of determining the average grain size of an aluminum alloy include, but are not limited to, polishing the sample surface as per usual in the field of metallurgy, then optical microscopy of potted and etched samples, scanning electron microscopy (SEM), transmission electron microscopy (TEM), and/or EDS. In certain embodiments, SEM imaging may be performed in backscattered electron mode or electron backscatter diffraction (EBSD) mode. In some embodiments, the average grain size is determined by applying the activating composition to the aluminum alloy surface, as described in greater detail below, therefore revealing one or more grain boundaries and/or subgrain boundaries.

According to some embodiments, the average grain size of the aluminum alloy may be manipulated. Manipulating the average grain size of the aluminum alloy may advantageously provide control of the rate of the hydrogen production reaction and/or the amount of hydrogen produced when the composition is exposed to water. In some embodiments, for example, decreasing the average grain size of the aluminum alloy provides an increased number of grain boundaries on the surface area of the aluminum alloy. In some such embodiments, the aluminum alloy may react with water at a faster rate due to an increased number of reaction sites (e.g., grain boundaries permeated with the activating composition).

In certain embodiments, the average grain size of the aluminum alloy may be manipulated by subjecting the aluminum alloy to a rolling process (e.g., a cold rolling process, a hot rolling process). As used herein, "rolling" is given its ordinary meaning in the art and generally refers to a metal forming process in which a metal substrate is passed through one or more rollers to reduce the size of one or more dimensions of the metal substrate. If the temperature of the metal is above its recrystallization temperature, then the process is known as hot rolling. If the temperature of the metal is below its recrystallization temperature, then the process is known as cold rolling. For aluminum alloys the recrystallization temperature typically varies between 650° C. to 750° C. depending on the material composition. In some embodiments, the aluminum alloy may be annealed after a rolling process to further manipulate the shape and/or size of the grains.

Figure 3A:
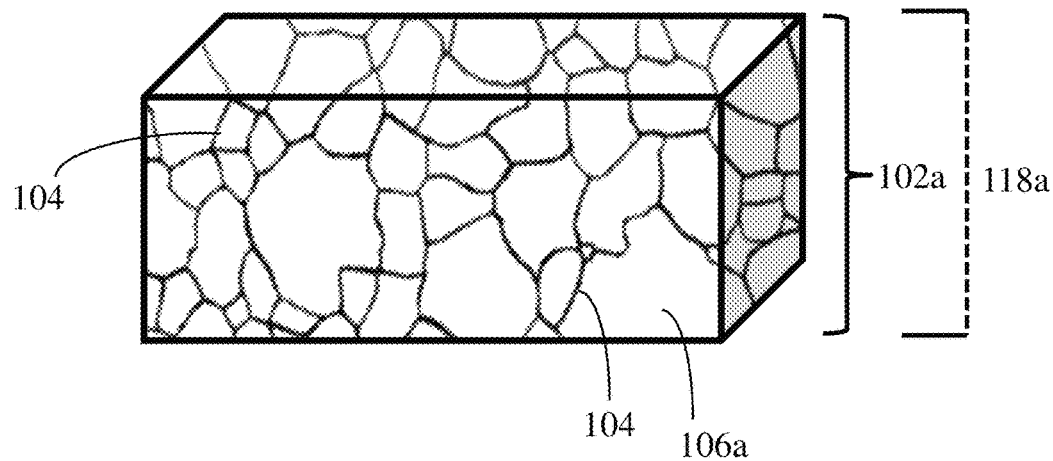
FIGS. 3A-3C show, according to certain embodiments, perspective view schematic diagrams illustrating a method of rolling a composition comprising an aluminum alloy.
Figure 3B:
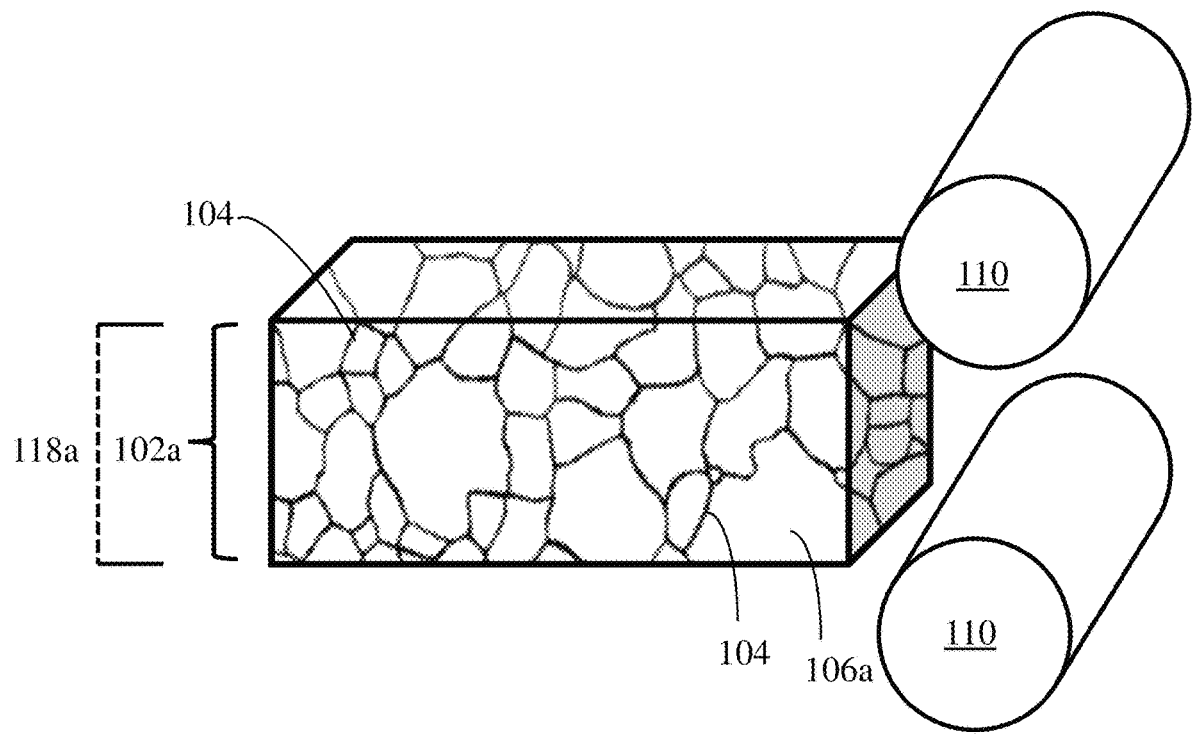
Figure 3C:
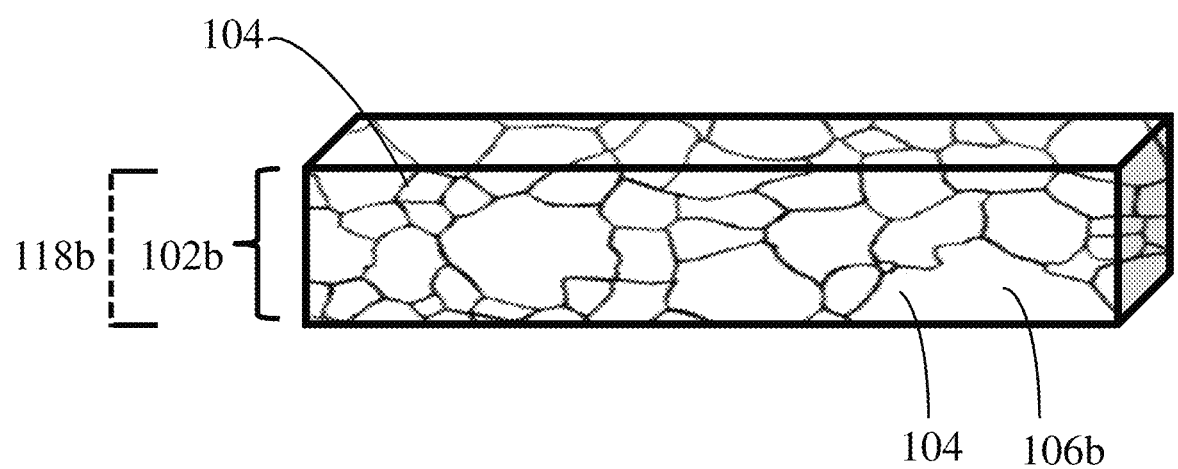

FIGS. 3A-3C show, according to certain embodiments, perspective view schematic diagrams illustrating a method of rolling a composition comprising an aluminum alloy. As shown in FIG. 3A, aluminum alloy 102a has characteristic dimension 118a (e.g., height). Referring to FIG. 3B, aluminum alloy 102a may be passed through one or more sets of rollers 110 where a thickness between the rollers is less than a thickness of the alloy. Rollers 110 may be used, in some embodiments, to reduce the characteristic dimension of aluminum alloy 102a by exerting pressure on the aluminum alloy 102a. For example, referring to FIG. 3C, in some embodiments, as a result of the rolling process, aluminum alloy 102b has characteristic dimension 118b that is smaller than characteristic dimension 118a of aluminum alloy 102a. In certain non-limiting embodiments, the rolling process may be performed such that characteristic dimension 118b is half of characteristic dimension 118a.

It may be advantageous, in some embodiments, to subject the aluminum alloy to the rolling process in order to decrease the average grain size in order to increase the surface area of the grain boundaries and/or subgrain boundaries on the surface of the aluminum alloy. As a result of decreasing the average grain size and increasing the surface area of the grain boundaries and/or subgrain boundaries, the rate and amount of hydrogen produced when the aluminum alloy is exposed to water may be increased. For example, according to some embodiments, as a result of the rolling process, the aluminum alloy may take on an elongated grain structure associated with a rolling process. Subsequently, in some embodiments, annealing may be performed on the rolled aluminum alloy to transform the elongated grain structure to a crystal structure including equiaxed grains. As used herein, the term "equiaxed grains" is given its ordinary meaning in the art and generally refers to grains that have axes of approximately the same length. The term "elongated grains" is also given its ordinary meaning in the art and generally refers to grains with a characteristic dimension that is increased or extended in the rolling direction as compared to the grain structure prior to the rolling process.

According to certain embodiments, the average grain size may decrease as a result of the rolling process. In certain embodiments, for example, the aluminum alloy may comprise an initial average grain size. Referring to FIGS. 3A-3B for example, aluminum alloy 102a, prior to the rolling process, comprises characteristic dimension 118a and plurality of grains 106a (e.g., having an initial average grain size). As shown in FIG. 3C, however, after the rolling process, aluminum alloy 102b, in addition to having decreased characteristic dimension 118b, also has plurality of grains 106b, which have a decreased average grain size (e.g., as compared to plurality of grains 106a. In certain embodiments, plurality of grains 106b may be equiaxed and/or elongated grains.

The average grain size may decrease by any of a variety of suitable amounts as a result of the rolling process. In certain embodiments, for example, the average grain size decreases by greater than or at least 10%, greater than or at least 20%, greater than or at least 30%, greater than or at least 40%, greater than or at least 50%, greater than or at least 60%, greater than or at least 70%, greater than or at least 80%, or greater than or at least 90% as a result of the rolling process. In some embodiments, the average grain size decrease by less than or equal to 99%, less than or equal to 90%, less than or equal to 80%, less than or equal to 70%, less than or equal to 60%, less than or equal to 50%, less than or equal to 40%, less than or equal to 30%, or less than or equal to 20% as a result of the rolling process. Combinations of the above recited ranges are also possible (e.g., the average grain size decreases by greater than or equal to 10% and less than or equal to 99% as a result of the rolling process, the average grain sizes decreases by greater than or equal to 40% and less than or equal to 60% as a result of the rolling process). Other ranges are also possible.

Figure 2A:
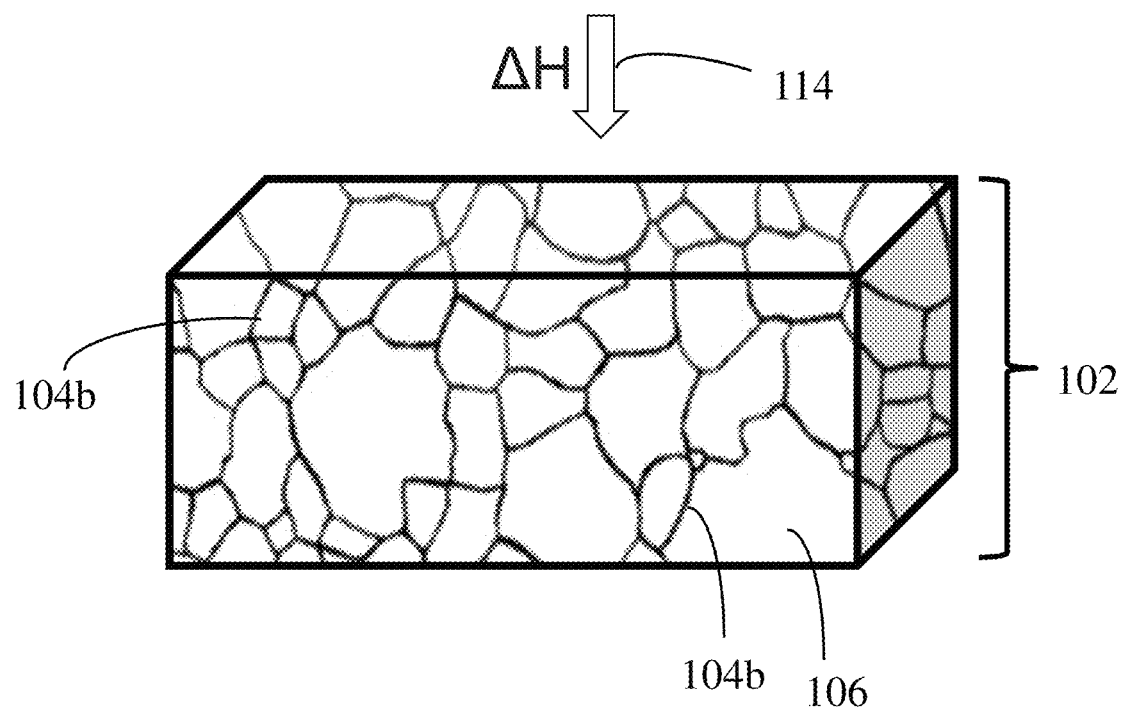
FIGS. 2A-2D show, according to certain embodiments, perspective view schematic diagrams illustrating a method of manufacturing a composition comprising an aluminum alloy and an activating composition.

According to certain embodiments, a method of manufacturing the composition is described. FIGS. 2A-2D show, according to certain embodiments, perspective view schematic diagrams illustrating a method of manufacturing a composition comprising an aluminum alloy and an activating composition. In some embodiments, the method comprises optionally heating an aluminum alloy. Referring to FIG. 2A, for example, aluminum alloy 102 may be exposed to heat 114. In some embodiments, aluminum alloy 102 may be uniformly exposed to heat 114, for example, in an oven or a furnace. In certain embodiments, the aluminum alloy is annealed. Heating the aluminum alloy may advantageously reduce the surface tension of the activating composition when exposed to the aluminum alloy and/or increase the rate of permeation of the activating composition within one or more grain boundaries and/or subgrain boundaries of the aluminum alloy, as described in further detail below. In certain embodiments, the average grain size of the aluminum alloy may be manipulated, as described above by a rolling process, prior to heating. In some such embodiments, the heating and/or annealing process may minimize internal stresses imposed during the rolling process and/or further manipulate a crystal structure of the aluminum alloy.

During treatment with an activating composition, an aluminum alloy may be heated to any of a variety of suitable temperatures. In some embodiments, for example, the aluminum alloy is heated to a temperature greater than or equal to 100° C., greater than or equal to 200° C., greater than or equal to 300° C., greater than or equal to 400° C., or greater than or equal to 500° C. In certain embodiments, the aluminum alloy is heated to a temperature less than or equal to 600° C., less than or equal to 500° C., less than or equal to 400° C., less than or equal to 300° C., or less than or equal to 200° C. Combinations of the above recited ranges are also possible (e.g., the aluminum alloy is heated to a temperature greater than or equal to 100° C. and less than or equal to 600° C., the aluminum alloy is heated to a temperature greater than or equal to 400° C. and less than or equal to 500° C.). Other ranges are also possible. In some embodiments, the aluminum alloy may be heated using an appropriate increasing and/or decreasing ramp rate. Of course embodiments in which an aluminum alloy is not heated during exposure to an activating composition are also contemplated.

Figure 2B:
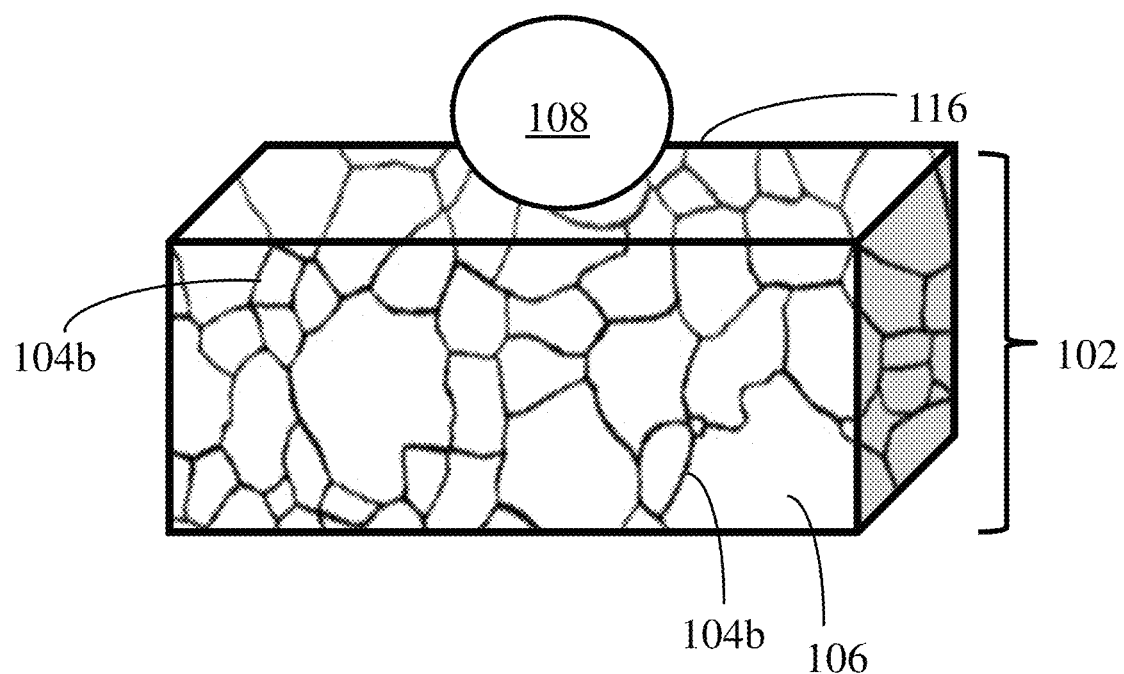

In certain embodiments, the method comprises exposing a surface of the aluminum alloy to an activating composition (e.g., comprising gallium and indium). Referring to FIG. 2B, for example, surface 116 of aluminum alloy 102 is exposed to activating composition 108. Surface 116 of aluminum alloy 102 may be exposed to activating composition 108 using any of a variety of suitable methods. In some embodiments, for example, a glass applicator (or other suitable device) may be used to dispense and/or spread one or more droplets of activating composition 108 onto surface 116 of aluminum alloy 102. Advantageously, applying one or more droplets of the activating composition using, for example, a glass applicator is cost efficient as less of the activating composition (e.g., comprising gallium and indium) is subjected to waste. Alternatively, the aluminum alloy be immersed and/or submerged in a bath of the activating composition, in certain embodiments. According to other embodiments, the activating composition may be applied to the aluminum alloy by spin coating or doctor blading. Other suitable methods of exposing the activating composition to a surface of the aluminum alloy are also possible.

Figure 2C:
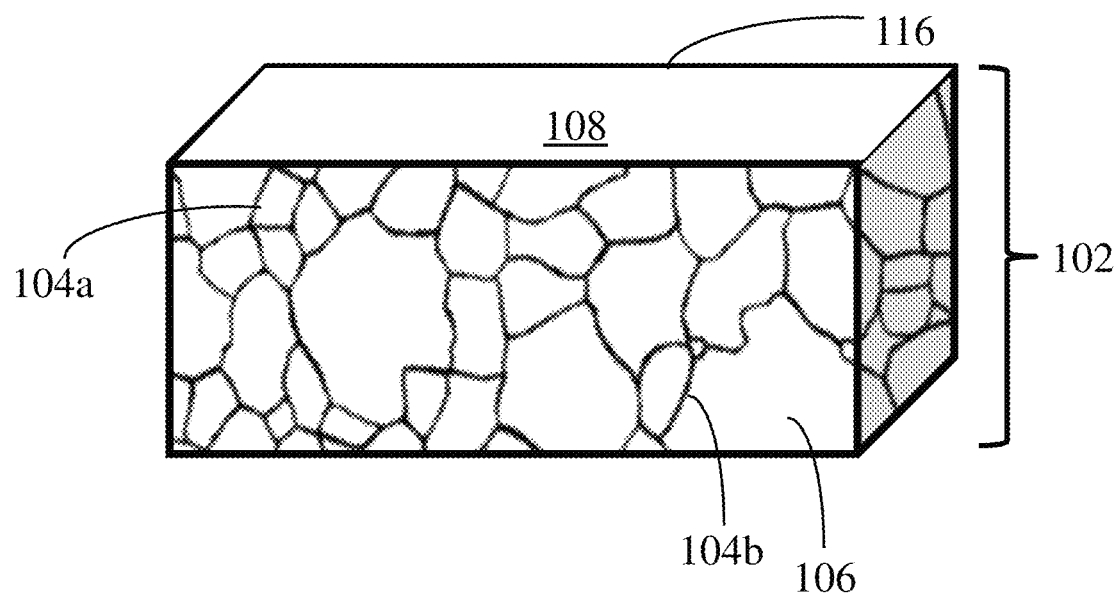
Figure 2D:
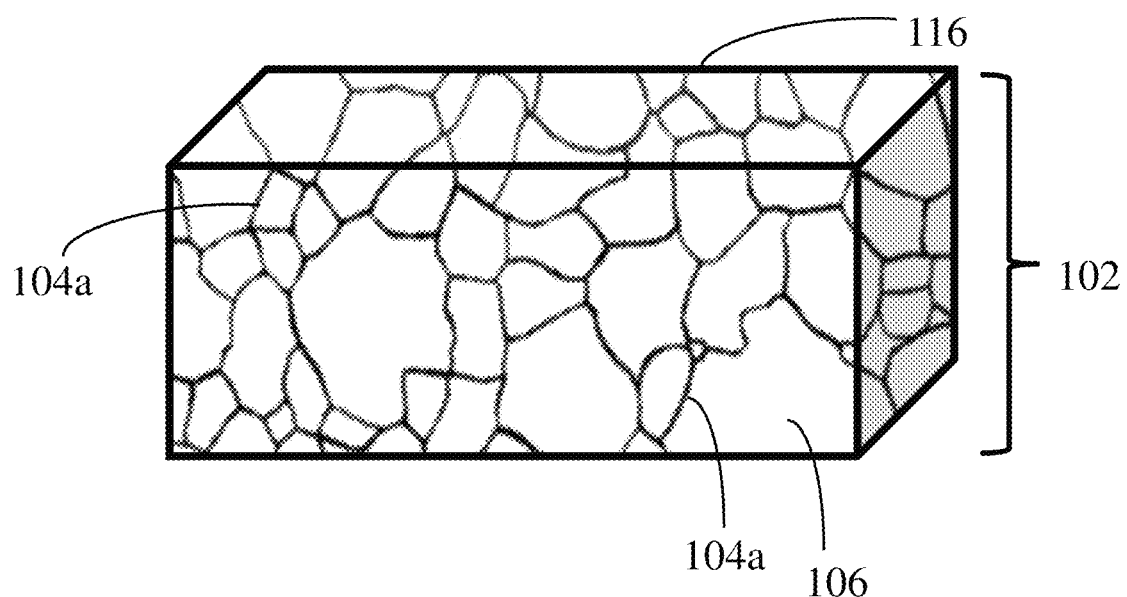

According to some embodiments, the method comprises allowing the activating composition to permeate through one or more grain boundaries and/or subgrain boundaries of the aluminum alloy for an amount of time. Referring to FIG. 2C, for example, activating composition 108 has wetted and/or dispersed across a surface 116 of aluminum alloy 102, and activating composition 108 permeates through one or more grain boundaries and/or subgrain boundaries of aluminum alloy 102. In some embodiments, for example, aluminum alloy 102 may comprise at least one grain boundary 104a, which is doped with an activating composition, and at least one grain boundary 104b, which has not yet been doped with an activating composition because the activating composition has not yet permeated through the aluminum alloy for a suitable amount of time. Referring to FIG. 2D, however, aluminum alloy 102 comprises plurality of grain boundaries 104a, which are doped with the activating composition due to the activating composition permeating through one or more grain boundaries and/or subgrain boundaries for a suitable amount of time.

The activating composition may permeate through one or more grain boundaries and/or subgrain boundaries of the aluminum alloy for any of a variety of suitable amounts of time. As described in further detail below, it may be beneficial, in some embodiments, to tailor the permeation time to control the amount of activating composition permeated through one or more grain boundaries in order to control the rate and/or amount of hydrogen produced from the hydrogen production reaction upon exposing the composition to water. In certain embodiments, for example, the rate and/or amount of hydrogen produced when the aluminum alloy is exposed to water may be increased if the activating composition permeates through one or more grain boundaries and/or subgrain boundaries for an increased amount of time.

In some embodiments, the amount of time is greater than or equal to 1 hour, greater than or equal to 10 hours, greater than or equal to 50 hours, greater than or equal to 100 hours, or greater than or equal to 150 hours. In certain embodiments, the amount of time is less than or equal to 200 hours, less than or equal to 150 hours, less than or equal to 100 hours, less than or equal to 50 hours, less than or equal to 25 hours, or less than or equal to 10 hours. Combinations of the above recited ranges are also possible (e.g., the amount of time is greater than or equal to 1 hour and less than or equal to 200 hours, the amount of time is greater than or equal to 50 hours and less than or equal to 100 hours). Other ranges are also possible.

In certain embodiments, as the activating composition permeates through one or more grain boundaries and/or subgrain boundaries of the aluminum alloy, there may be partial segregation of the activating composition (e.g., partial segregation of indium from gallium). It should therefore be understood that some areas of the grain boundaries and/or subgrain boundaries may comprise the activating composition, some areas of the grain boundaries and/or subgrain boundaries may comprise Ga, and areas of the grain boundaries and/or subgrain boundaries may comprise In. Without wishing to be bound by theory, the degree to which segregation occurs is a function of the composition (e.g., chemical makeup) of the aluminum alloy and grain boundary precipitate density. For example, in certain non-limiting embodiments, there may be a larger concentration of indium segregated from the activating composition for an aluminum alloy comprising Mg than for an aluminum alloy comprising Si.

In view of the above, it should be understood that an activating composition may at least partially segregate during permeation into the grain boundaries of an alloy such that the exact amounts of the constituents of the remaining activating composition changes due to some of the material reacting with and/or migrating into the periphery of the grains, thereby forming a solid solution with the aluminum and/or other alloying elements. However, the weight percentage of the constituents of the activating composition may still be present adjacent to the edges of the grains and/or between the individual grains within the grain boundaries and/or subgrain boundaries. For example, the previously noted weight percentages for the use of an activating composition with an aluminum alloy may result in the constituents of the activating composition being located substantially outside of an inner 90%, 95%, or 99% of the grains of a structure. For instance, a combined weight percent of one or more constituents of the activating composition (e.g., Ga and In, Sn, Bi, and/or Zn) within an aluminum alloy may be greater than or equal to 0.1 wt. % and less than or equal to 50 wt. %, and the constituents of the activating composition (e.g., Ga and In, Sn, Bi, and/or Zn) are concentrated proximate to the grain boundaries and/or subgrain boundaries of the alloy. Of course, the use of different weight percentages of the activating composition and the use of different activating compositions are also contemplated. Further, the overall proportions of the constituents of the activating composition once permeated into the alloy may still be in a proportion that would be an activating composition as defined herein if located outside of the alloy.

In certain embodiments, it should be understood that the activating composition, or components thereof (e.g., gallium, gallium and/or indium), may not always uniformly coat the grain boundaries and/or subgrain boundaries, which also is a function of the composition of the aluminum alloy and grain boundary precipitate density. For example, in certain non-limiting embodiments, a grain boundary and/or subgrain boundary of the aluminum alloy may comprise a higher concentration of aluminum, alloying element, activating composition, or component of the activating composition (e.g., gallium, gallium and/or indium), as compared to another grain boundary and/or subgrain boundary.

According to certain embodiments, the composition may be optionally placed in a desiccator and/or an inert environment (e.g., under Ar or $N_2$ gas) prior to exposing the composition to water. In some embodiments, the composition may optionally be polished prior to exposing the composition to water.

According to certain embodiments, a method of producing hydrogen gas is described. In some embodiments, the method comprises exposing an activated aluminum alloy to water. According to certain embodiments, the activated aluminum alloy is activated by allowing an activating composition to permeate through one or more grain boundaries and/or subgrain boundaries of an aluminum alloy for an amount of time, as described above.

Figure 4:
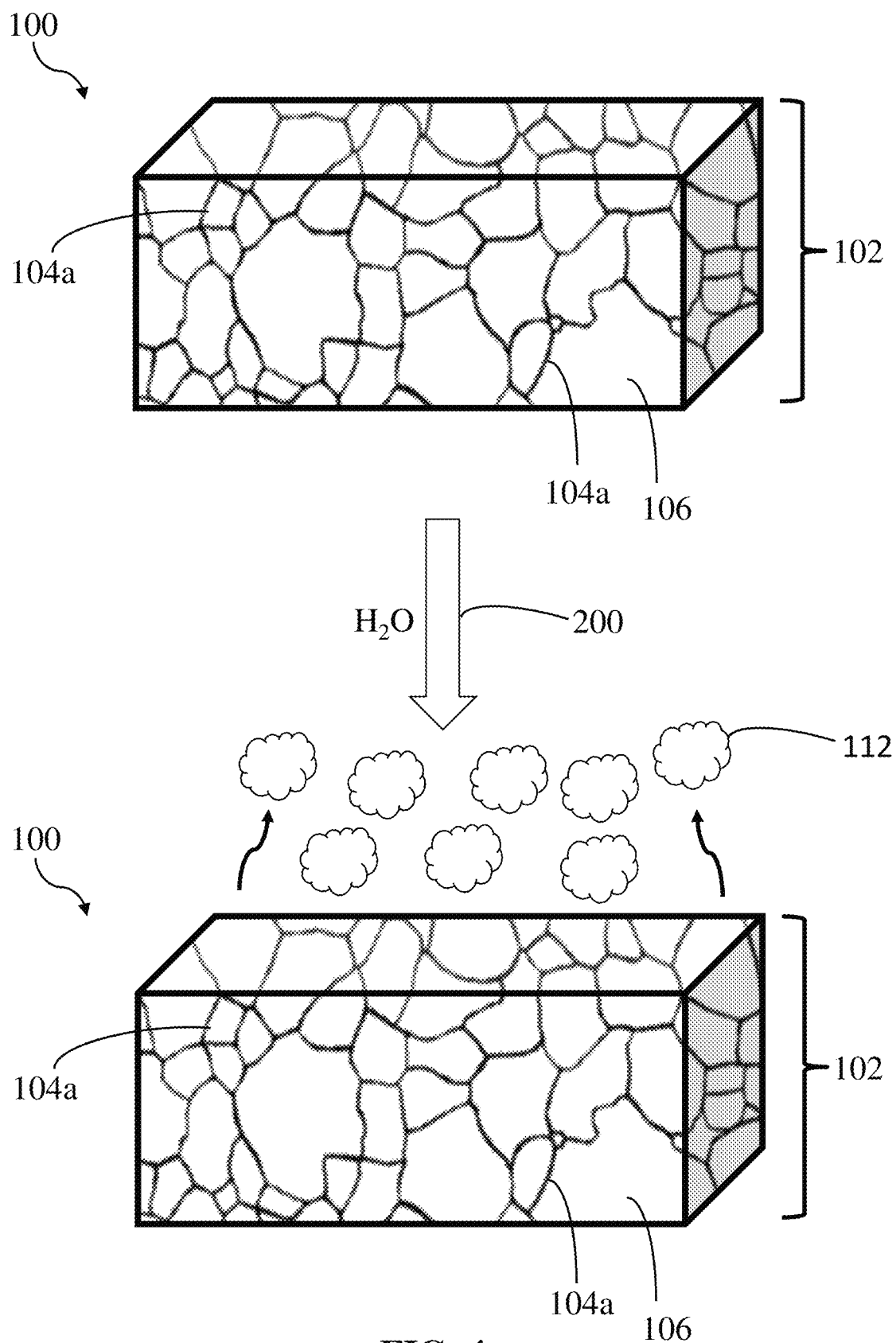
FIG. 4 shows, according to certain embodiments, perspective view schematic diagrams illustrating a method of producing hydrogen gas.

FIG. 4 shows, according to certain embodiments, perspective view schematic diagrams illustrating a method of producing hydrogen gas. Referring to FIG. 4, composition 100 (e.g., activated aluminum) comprises aluminum alloy 102 comprising plurality of grain boundaries 104a, which are doped with an activating composition. In some embodiments, composition 100 is exposed to water 200. Composition 100 may be exposed to water 200 in any of a variety of suitable ways. In some embodiments, for example, water 200 may be dripped, poured, and/or sprayed on composition 100. In certain embodiments, composition 100 may be submerged and/or immersed in water 200. Other methods of exposing the composition to water may be employed and are elaborated on below.

According to some embodiments, the composition may be exposed to water in a reactor, as described herein in further detail. In certain embodiments, the composition may be exposed to water at any of a variety of suitable temperatures and pressures, including, for example, ambient temperature and pressure.

Although FIG. 4 depicts that the aluminum alloy is a block shape, it should be understood that the depicted shape is non-limiting and any of a variety of suitable shapes and/or sizes for the aluminum alloy may be employed when the composition is exposed to water. In certain embodiments, for example, the aluminum alloy may be one or more spheres, particles, cones, cubes, cylinders, pellets, plates, sheets, layers, powders, or the like. As mentioned above, it may be beneficial to manufacture the composition as a first structure (e.g., as shown in FIGS. 2A-2D), and then process the composition into a second structure prior to exposing the composition to water. In some embodiments, for example, the aluminum alloy may be processed into a powder (e.g., a plurality of microparticles) prior to exposing the composition to water. Thus, it should be understood that the aluminum alloy may be provided in any desired form for reaction with water as the disclosure is not limited in this fashion.

In certain embodiments, the method comprises producing hydrogen gas. Referring to FIG. 4, for example, composition 100 reacts with water 200 (e.g., via Equations (1) and/or (2), as described above) to produce hydrogen gas 112. In some embodiments, the one or more alloying elements (e.g., Si, Mg) may enhance grain boundary embrittlement of the aluminum alloy. As a result, in certain embodiments, the aluminum alloy may become more brittle as the aluminum alloy is exposed to water and the hydrogen generation reaction proceeds. In some embodiments, for example, the aluminum alloy may break, crack, and/or fall apart as the hydrogen generation reaction proceeds, therefore leading to an increase in the rate and/or amount of hydrogen produced.

According to some embodiments, the rate and/or amount of hydrogen produced may be influenced by the alloying element. In certain embodiments, for example, the rate and/or amount of hydrogen produced may be increased for an aluminum alloy comprising Si (e.g., as compared to a substantially pure aluminum sample). In some embodiments, the rate and/or amount of hydrogen produced may be decreased for an aluminum alloy comprising Mg (e.g., as compared to a substantially pure aluminum sample). Without wishing to be bound by theory, the rate and/or amount of hydrogen produced may be decreased for an aluminum alloy comprising Mg due to a larger concentration of indium segregated from the activating composition at one or more grain boundaries and/or subgrain boundaries, as explained above, therefore providing less surface area (e.g., less grain boundaries and/or subgrain boundaries that have been permeated with the activating composition) for the hydrogen producing reaction to take place. In some embodiments, the rate and/or amount of hydrogen produced may be decreased for an aluminum alloy comprising Si and Mg (e.g., as compared to a substantially pure aluminum sample). Without wishing to be bound by theory, the rate and/or amount of hydrogen produced may be decreased for an aluminum alloy comprising Si and Mg due to the formation of one or more grain boundary precipitates, such as, for example, a Mg—Si—Al—Ga compound.

In some embodiments, a yield percent of hydrogen gas produced is proportional to the amount of time that the activating composition is allowed to permeate within the grain boundaries and/or subgrain boundaries of the aluminum alloy. For example, in certain non-limiting embodiments, for an aluminum alloy comprising Si, the yield percent of hydrogen gas produced may be increased by increasing the amount of time that the activating composition permeates through the grain boundaries and/or subgrain boundaries of the aluminum alloy. As used herein, the yield percent of hydrogen gas produced is defined as the ratio between the molar amount of hydrogen produced to the theoretical maximum amount of hydrogen produced through Equations (1) and (2) multiplied by 100. The amount of hydrogen produced may be quantified using a water displacement method, as would be understood by a person of ordinary skill in the art. Briefly, in some embodiments, the volume of hydrogen produced from the reaction between the aluminum alloy and water may displace water in a separate flask. The mass of the displaced water may be converted to a volume of produced hydrogen ($V_{H_2}$) through the following equation:

$$V_{H_2}(t) = m(t)\rho_w \frac{[p_{atm} - p_v]T_{STP}}{T_x(t)P_{STP}}$$

where $\rho_w$ is the density of water, $p_{atm}$ is atmospheric pressure, $p_v$ is the vapor pressure of water at temperature $T_x$ (i.e., temperature of a gas mixture composed of hydrogen and water vapor), and $T_{STP}$ and $P_{STP}$ are the temperature and pressure at standard conditions, respectively.

In certain embodiments, a flow rate of hydrogen gas produced is proportional to the amount of time that the activating composition is allowed to permeate within the grain boundaries and/or subgrain boundaries of the aluminum alloy. For example, in certain non-limiting embodiments, for an aluminum alloy comprising Si, the flow rate of hydrogen gas produced may be increased by increasing the amount of time that the activating composition permeates through the grain boundaries and/or subgrain boundaries of the aluminum alloy. The flow rate of hydrogen gas produced may be quantified, in some embodiments, by calculating the time derivative of the water displacement method, as described above.

In some embodiments, a reactor may be used in performing the above-described reactions. A reactor may include a water source, two or more reactant reservoirs, and a reaction chamber. Each reactant reservoir may contain a different reactant. For example, a first reactant reservoir may be configured to contain a first reactant, and a second reactant reservoir may be configured to contain a second reactant. The different reactant reservoirs and the water source may be configured to selectively react the different reactants with water from the water source. For instance, an amount of the water and first reactant may be reacted independently from an amount of the water and second reactant. In some embodiments, reactions of the water with the reactants may generate hydrogen gas. As described above, different reactants may be associated with different reaction rates. For example, a first reaction rate of the first reactant with water may be different from a second reaction rate of the second reactant with water for a given amount of each reactant.

A water source may be a tank, reservoir, container, a water line, or any other source from which water may be provided. For instance, in some embodiments, a water source may be a water line in a building, even if the water itself originates from a tank or reservoir separated from the reactor. It should be appreciated that a water source may include any suitable source of water, as the disclosure is not limited in this regard.

A reactant reservoir may include a tank, container, or any other vessel in which one or more reactants may be disposed. A reactant reservoir may be completely enclosed or may be partially exposed. For example, a single vessel may comprise two reactant reservoirs, each reactant reservoir defined in part by a divider that may, or may not, fully separate the two reactant reservoirs. In some embodiments, one or more reactant reservoirs may be in fluid communication, such that hydrogen gas generated in different reactant reservoirs may passively combine and/or mix.

A reaction chamber may include any container, vessel, or body in which a reaction may occur. In some embodiments, a reaction chamber may be separate and distinct from the water source and/or the reactant reservoir(s). In some embodiments, a reaction chamber may include one or more of the water source and/or the reactant reservoirs. For example, in embodiments in which water is transported to one or more of the reactant reservoirs and applied to a reactant disposed within a reactant reservoir, a reaction may occur within the reactant reservoir, and the reaction chamber may include the reactant reservoir.

In some embodiments, a reactor may comprise at least one feeder. The feeder may be operatively coupled to at least one of the water source, the first reactant reservoir, and the second reactant reservoir. The at least one feeder may be configured to selectively transport at least one of the water, the first reactant, and the second reactant. For example, a reactant feeder may transport a reactant from a reactant reservoir to a reaction chamber, and a water feeder may transport water from a water source to a reaction chamber. In some embodiments, a feeder may be configured to selectively transport at least one of the first reactant and the second reactant to the water source. In some embodiments, a feeder may be configured to selectively transport the water to at least one of the first reactant reservoir and the second reactant reservoir.

Any appropriate type of feeder capable of transporting reactant and/or water from a corresponding reservoir and/or source to a desired location within a reactor may be used. A feeder may include any suitable number of active and/or passive components. In some embodiments, a feeder may include a valve configured to enable or prevent flow of a material. A valve may be a gate valve, a ball valve, a butterfly valve, or any other suitable valve that may be selectively opened or closed to control the flow of a material, such as water and/or a reactant. Appropriate types of feeders may also include, but are not limited to, a valve, a pump, a belt feeder, a scoop feeder, a screw feeder, and/or any other appropriate type of construction capable of transporting a desired amount of material from the associated reservoir and/or source. For example, solid reactant in the form of pellets or powder may be transmitted to the reaction chamber by means of gravity where the reactant reservoir is a hopper suspended above the reaction chamber with a valve configured to selectively permit or prevent the transmission of reactant to the reaction chamber. Alternatively, a pump and/or valve associated with a water source may be used to transport water to a desired location within a reactor. Accordingly, it should be understood that the disclosure is not limited to how the reactants and/or water are transported to a desired location within a reactor as elaborated on below.

A reactor may comprise one or more outlets. In some embodiments, a reactor may comprise a gas outlet configured to release hydrogen gas from the reactor. In some embodiments, a reactor may comprise a waste outlet configured to remove waste generated during a reaction from the reactor. A gas outlet and/or a waste outlet may be include any suitable number of passive and/or active components. For example, an outlet may include a regulator configured to regulate a flow rate of a fluid exiting the outlet. Alternatively, an outlet may include a pump configured to actively remove a material from the reaction chamber. It should be appreciated that an outlet may include any appropriate number of valves, pumps, regulators, sensors, or any other component, as the disclosure is not so limited. An outlet may be disposed at any suitable position relative to a reaction chamber. For example, a gas outlet may be disposed on a top surface of a reaction chamber, as gas produced in a reaction may be less dense than air and may collect at the top of the reaction chamber. A waste outlet may be disposed on a bottom surface of a reaction chamber, as waste produced in a reaction may be more dense than air and may collect at the bottom of the reaction chamber. However, it should be appreciated that any outlet may be disposed at any suitable position, as the disclosure is not so limited.

A base of a reaction chamber may collect waste generated in a reaction and/or other materials that may foul a surface of a reactant. As such, it may be desirable to elevate a reactant off of the base of the reaction chamber. In some embodiments, a reactor may comprise a support configured to elevate at least one of the first reactant and the second reactant from a base of the reactor. A support may include holes, slits, perforations, or other gaps to allow water, waste, and unreacted portions of the reactant to fall through the support and away from the reactant. In some embodiments, a reactor may include additional supports configured to control an orientation of a reactant within a reaction chamber. For example, an additional support may angle a reactant to urge water to drain off of the reactant.

In some embodiments, a reactor may include feedback control. For example, a reaction within a reactor may be monitored and compared to a desired reaction, and then adjusted to match the desired reaction. In some embodiments, a reactor may comprise a processor operatively coupled to the various components of the reactor. The processor may be configured to determine a desired hydrogen generation profile, monitor a hydrogen generation rate of the reactor, and control the reaction based at least in part on the desired hydrogen generation profile and/or the monitored hydrogen generation rate. For example, in embodiments in which the first and second reactants are disposed within the reactor, the processor may be configured to control an amount of the water provided to the reactor. In embodiments in which the water is disposed within the reactor, the processor may be configured to control an amount of the first reactant and/or the second reactant provided to the reactor.

It should be appreciated that any suitable parameter of a reaction may be monitored. In some embodiments, a monitored parameter may include a temperature of a reaction, a temperature of a reaction chamber, a hydrogen generation rate, an amount of water and/or reactant provided to a reaction chamber, a flow rate through an output of the reactor, an amount of water and/or reactant remaining in a water source and/or reactant reservoir, or any other suitable parameter.

In some embodiments, a monitored parameter may be compared to a desired parameter. For example, a monitored hydrogen generation rate may be compared to a desired hydrogen generation rate. A difference between the monitored and desired hydrogen generation rates may be used to determine how inputs to the reaction should be adjusted, if at all. For example, if a monitored hydrogen generation rate is lower than a desired hydrogen generation rate, an overall reaction rate may be increased, such as by increasing an amount of a reactant, or by heating a reaction chamber with a heater. In some embodiments, a desired parameter may be derived from a desired profile. For example, a desired hydrogen generation rate may be derived from a desired hydrogen generation profile, which may describe variations in the desired hydrogen generation rate over time. In some embodiments, a desired hydrogen generation profile may comprise a constant rate of hydrogen generation, while in some embodiments, a desired rate of hydrogen generation may vary over time.

It should be appreciated that any suitable parameter of a reaction may be adjusted using feedback control. In some embodiments, an amount of the first reactant, the second reactant, and/or the water provided to the reaction may be varied based at least in part on the at least one monitored parameter. For example, the amount of water and/or reactant may be varied based at least in part on a desired hydrogen generation profile and a monitored hydrogen generation rate. Of course, other suitable parameters and/or inputs to the reaction may be adjusted, as the disclosure is not limited in this regard.

The physical form of a reactant used in a system may vary depending on the particular application. In some embodiments, the reactant may be solid which may be provided in discrete pieces such as in sheets, plates, bars, irregular scraps, or pellets. The pellets may be regularly shaped, such as spherical, or may be irregularly shaped chunks. The size of the pellets may be uniform or varied. Alternatively, the solid reactant may be provided in a more continuous form, such as a powder with any appropriate size distribution for a desired application. Of course, combinations of the forgoing forms of the reactants of a reactor may be used as the disclosure is not limited in this fashion.

Figure 5:
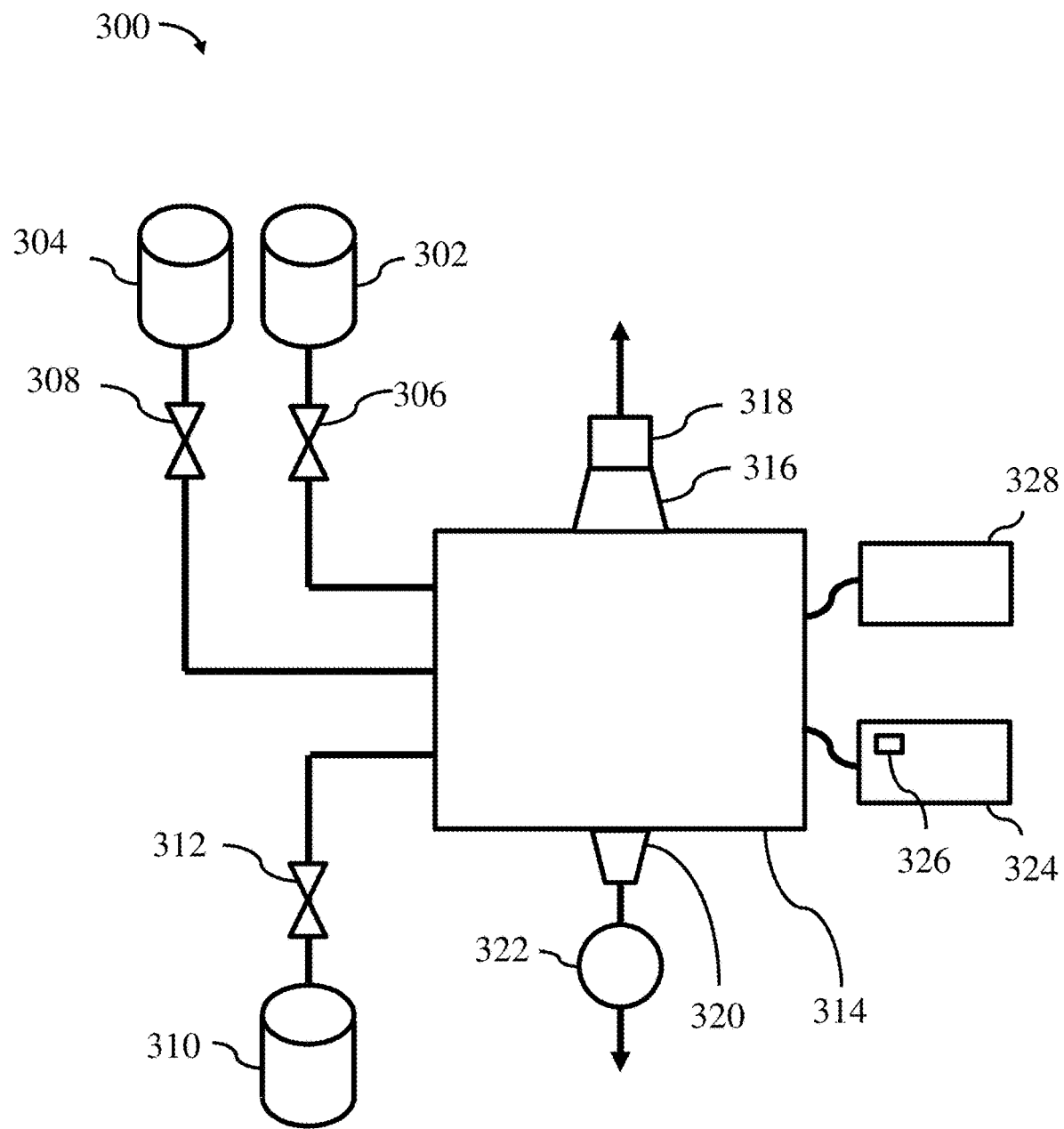
FIG. 5 is a schematic representation of a reactor in which water and reactants are transported to a reaction chamber.

FIG. 5 is a schematic representation of one embodiment of a reactor 300 for generating hydrogen gas. In this embodiment, a first reactant reservoir 302, a second reactant reservoir 304, and a water source 310 are operatively coupled to a reaction chamber 314. When one of the reactants is combined with the water in the reaction chamber 314, a reaction produces hydrogen gas. For example, in embodiments in which the reactant is aluminum or an alloy of aluminum, hydrogen gas may be produced according to Equations (1) or (2), as described above. The hydrogen gas exits the reaction chamber 314 through a gas outlet 316.

In some embodiments, the depicted reactor 300 may include a regulator 318 coupled to the gas outlet 316 of the reaction chamber 314. The regulator 318 may be configured to regulate the outlet pressure and/or flow rate of the hydrogen gas produced in the reaction chamber 314 through the outlet. In some embodiments, a reaction chamber may have multiple outlets with multiple corresponding regulators. Further, in some applications, the one or more outlets may not be regulated at all. In some embodiments, a regulator may be a pressure regulator, a flow regulator, a regulator that regulates both pressure and flow, and/or any other suitable type of regulator as the disclosure is not limited in this regard.

The embodiment of FIG. 5 may additionally include one or more sensors 326 configured to sense one or more parameters of the reaction within the reaction chamber 314. Sensors 326 may additionally or alternatively sense parameters associated with the reactant reservoirs, the water source, one or more outlets of the reactor, and/or any other suitable component or subsystem of the reactor 300. A processor 324 is operatively coupled to the one or more sensors 326. The sensors output one or more corresponding signals representative of the one or more sensed parameters to the processor. In some embodiments, the system may additionally include a non-transitory computer readable memory associated with the processor. The memory may include instructions that when executed by the processor act to control the overall system and perform the methods of operation as described herein. Of course, in some embodiments, a reactor may not include sensors and/or a processor as the disclosure is not limited in this fashion.

Using the signals from the one or more sensors, the processor 324 may control an amount of water and/or an amount of the first and/or second reactants provided to the reactor chamber. For example, the one or more sensors 318 may sense a temperature of the reaction chamber 314. If the sensors sense that a rate of hydrogen generation is different from a desired rate of hydrogen generation, the processor may generate commands to vary the amount of water and/or reactants provided to the reaction chamber to vary the rate of hydrogen production. For example, if the rate of hydrogen production is determined to be too low, the processor may generate commands to switch from a first reactant with a low rate of reaction to a second reactant with a relatively higher rate of reaction to quickly alter and control the amount of hydrogen being generated to be within a commanded hydrogen generation rate. Alternatively, if the sensors sense that the temperature of the reaction chamber 314 is above a threshold temperature, the processor 324 may generate commands to an associated heating and/or cooling device to control a temperature within the reaction chamber. Such feedback control may allow the reactor 300 to control various aspects associated with the reaction. Of course, feedback control of the reactor may be performed using other operating parameters including, for example, an amount of reactant and/or water fed into the system, time, a pressure within the reactor chamber, a flow rate of hydrogen from the reactor chamber, and/or any other appropriate operating parameter. The one or more sensors may include temperature sensors, pressure sensors, flow rate sensors, or any other suitable type of sensor.

In the embodiment of FIG. 5, the processor 324 may control an amount of reactant provided to the reaction chamber 314 from the first and second reactant sources 302 and 304 using one or more reactant feeders. A reactant feeder may include a reactant reservoir valve that is positioned downstream from and is connected to an outlet of a reactant reservoir. In some embodiments, the first reactant reservoir 302 may be associated with a first valve 306. Similarly, in some embodiments, the second reactant reservoir 304 may be associated with a second valve 308. A valve may be a gate valve, a ball valve, a butterfly valve, or any other suitable valve that may be selectively opened or closed to control the flow of reactant from a reactant reservoir to the reaction chamber 314. Of course, while the use of valves may be appropriate for dispensing pellets and/or powders, other types of reactant feeders for use in dispensing a desired amount of reactant may also be used as previously noted. Similarly, in the embodiment of FIG. 5, the processor 324 may control the amount of water provided to the reaction chamber 314 using a water valve 312 or other appropriate type of water feeder. The water valve 312 may be a gate valve, a ball valve, a butterfly valve, or any other suitable valve connected to and located downstream from an outlet of the water reservoir such that the valve may control the flow of water from the water source 310 to the reaction chamber 314.

In some embodiments, the processor 324 may control the amount of reactant and/or water provided to the reaction chamber 314 based on signals received from the one or more sensors 326 which may be configured to sense one more operating parameters associated with the reaction chamber and/or other portions of the reactor. For example, the sensors may be configured to sense the pressure of the reaction chamber, a flow rate of gas from the reaction chamber, and/or any other appropriate operating parameter using any appropriate type of sensor as the disclosure is not limited in this fashion. For instance, if a pressure and/or flow rate of the gas is below a predetermined threshold pressure and/or flow rate, the processor may control the feeder system(s) associated with either the first reactant reservoir, the second reactant reservoir, and/or the water source to add additional reactant and/or water to the reaction chamber to increase the production of gas. In some embodiments, a material composition of the reactants being reacted may be adjusted instead of or in addition to adjusting an amount of reactant being reacted. For example, reacting a first reactant with water may generate hydrogen at a first rate, while reacting a second reactant with water may generate hydrogen at a second different rate for a given amount of reactant. The processor may control an overall hydrogen generation rate of the reactor by varying which reactant is reacted, in addition to varying an amount of reactant that is reacted. In some embodiments, a processor my control a heater 328 to heat a reaction chamber to control a rate of reaction. Control of a heater may be used independently of or in conjunction with any other form of control, including but not limited to adjusting amounts of water and/or reactants provided for a reaction.

In some embodiments, a reaction chamber may have multiple outlets. For example, in addition to an outlet that may allow the produced hydrogen gas to exit the reactor chamber, the reactor 300 may include a waste outlet 320 that may be distinct from the hydrogen gas outlet 316. In embodiments in which the reactant is aluminum or an alloy of aluminum, combining one of the reactants with the water may produce aluminum hydroxide in addition to producing hydrogen gas, as described in Equations (1) and (2). The produced aluminum hydroxide may be considered a waste product. In some applications, it may be desirable to remove the produced waste from the system. For instance, the waste may be actively discharged from the reaction chamber 314 through the waste outlet using one or more pumps, a valved outlet that may be selectively opened and closed to allow the material to flow through the waste outlet under the influence of gravity, screw mechanisms, a belt feeder, a scoop feeder, and/or any other type of construction capable of removing the waste from the reactor chamber. For example, a waste pump 322 may urge the waste from the reaction chamber 314 through the waste outlet 320. The pump may be controlled by the processor 324, and the one or more sensors 326 may sense parameters related to waste removal, such as operation of the waste pump 322. Of course, it should be understood that the waste may be removed from the reactor in any appropriate manner including both manual and automated operations.

Figure 6:
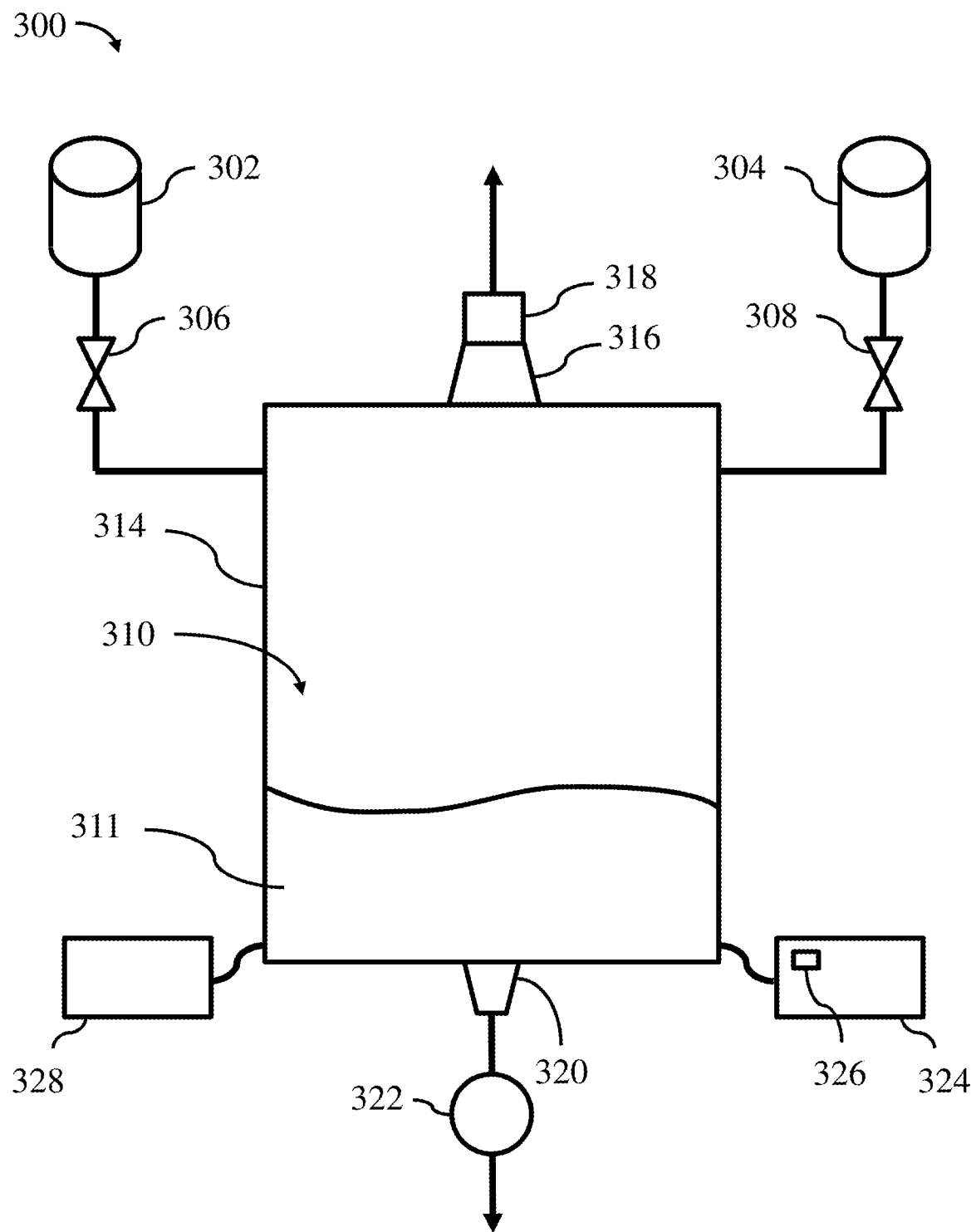
FIG. 6 is a schematic representation of a reactor in which reactants are transported to a reaction chamber containing water.

FIG. 6 is a schematic representation of another embodiment of a reactor 300 for generating hydrogen gas. In this embodiment, the reaction chamber 314 is configured to contain water 311. Accordingly, in some embodiments, a water source 310 may be disposed within a reaction chamber 314. Reactants from the first reactant reservoir 302 and the second reactant reservoir 304 may be transported to the reaction chamber 314 via one or more associated reactant feeders and dropped into the water 311 to generate hydrogen gas. As described above in reference to FIG. 5, a reactor 300 may include any suitable number of valves, pumps, outlets, sensors, processors, heaters, and/or any other component configured to initiate, monitor, or control a reaction. To avoid unnecessary repetition, components that may not vary substantially between the embodiments of FIG. 5 and FIG. 6 may not be described again. For detailed descriptions of such components, the reader is referred to the discussion above.

Figure 7:
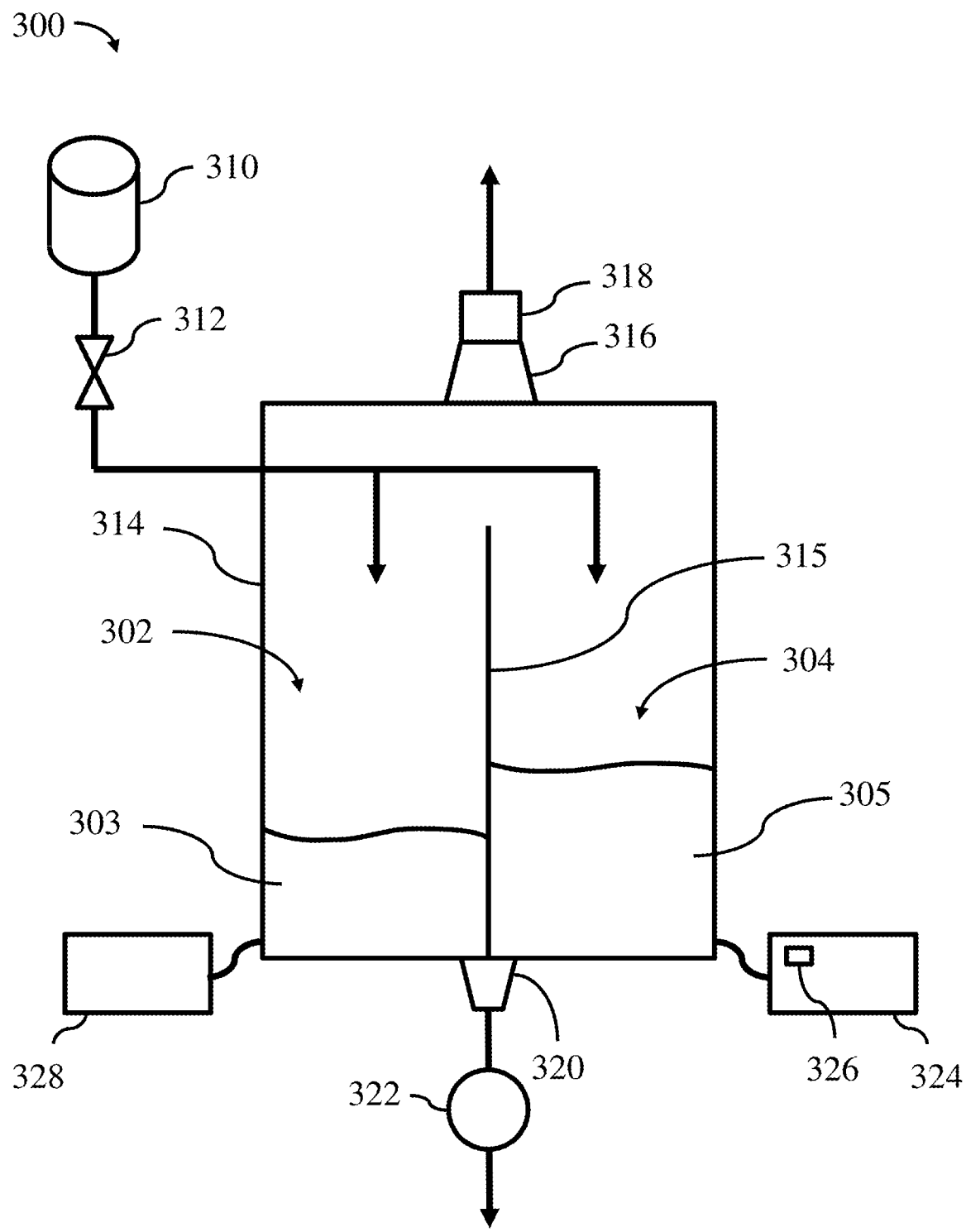
FIG. 7 is a schematic representation of a reactor in which water is transported to a reaction chamber containing reactants.

FIG. 7 is a schematic representation of yet another embodiment of a reactor 300 for generating hydrogen gas. In this embodiment, the reaction chamber 314 is configured to contain the first reactant 303 and the second reactant 305. Accordingly, in some embodiments, a reaction reservoir may be disposed within one or more reaction chambers 314. Water from the water source 310 may be transported to the reaction chamber 314 and selectively applied to the first reactant 303 and/or the second reactant 305 to generate hydrogen gas. In some embodiments, water may be transported to a position above a reactant, and selectively allowed to drip onto the reactant under the force of gravity. In some embodiments, water may be sprayed onto a reactant from a position above, to a side, or below a reactant. Water may be applied using any suitable number of pipes, tubes, pumps, valves, nozzles, sprayers, diffusers, and/or any other appropriate water transporting component, as the disclosure is not limited in this regard. In the embodiment of FIG. 7, the first reactant 303 is separated from the second reactant 305 by a divider 315. The divider may be configured to prevent inadvertent application of water to a reactant. For example, the height of the divider may be based at least in part on a position of one or more sprayers, such that a sprayer configured to deliver water to the first reactant 303 does not inadvertently deliver water to the second reactant 305. The divider may not extend to the top of the reaction chamber, such that hydrogen gas generated from either the first reactant or the second reactant may exit the reaction chamber through a single gas outlet 316. However, it should be understood that in some embodiments, the divider 315 may fully separate the reactants such that two reaction chambers are formed. In such an embodiment, either separate outlets for each reactant may be used and/or the divider may be permeable to hydrogen gas, such as by including small perforations.

Figure 8:
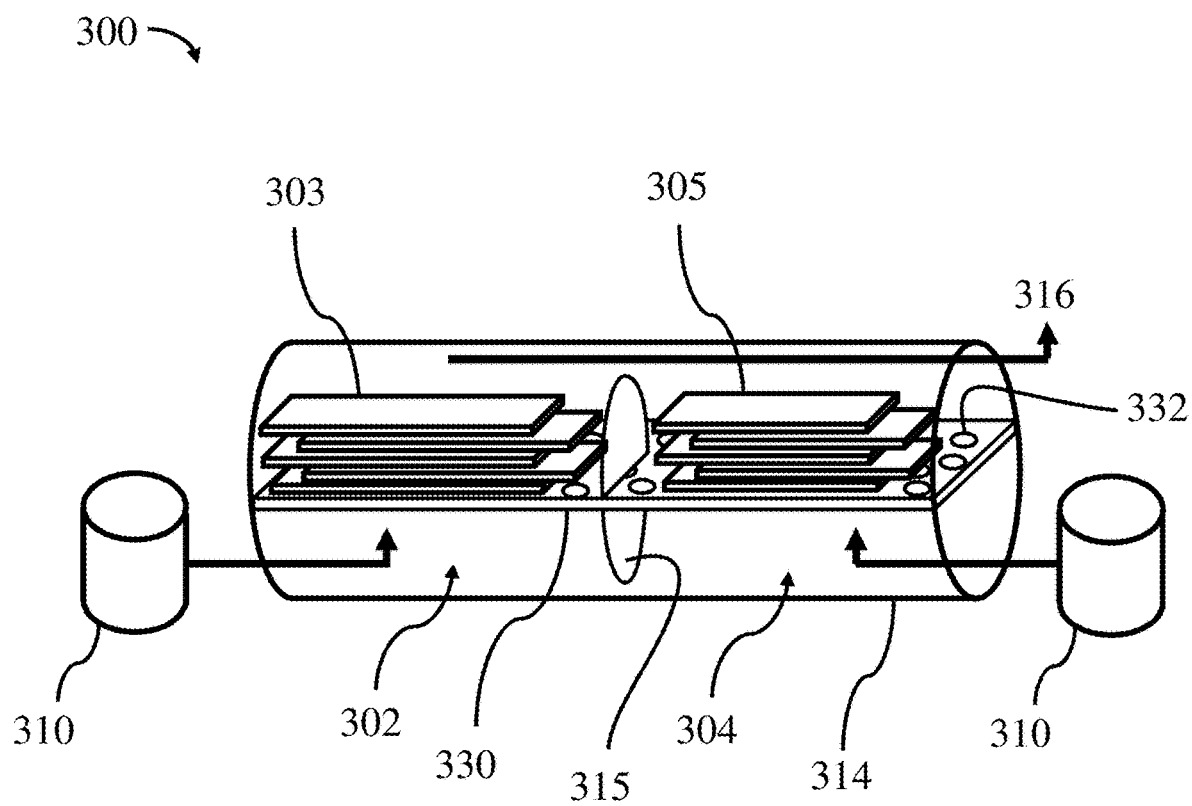
FIG. 8 depicts one embodiment of a reactor.

FIG. 8 depicts an embodiment of a reactor 300 for generating hydrogen gas with a configuration similar to the embodiment of FIG. 7. In this embodiment, the first reactant 303 and the second reactant 305 are disposed on a support 330. The support is configured to elevate the reactants away from a base of the reaction chamber. In this embodiment, water from one or more water sources 310 is sprayed upwards through a plurality of holes 332 extending from a first side to a second opposing side of a portion of the support 330 that the associated reactant is disposed on. Thus, the water sprayed through the holes may contact the bottom surface of the reactants. Of course, while a spray from below the reactant through the support has been depicted, embodiments in which the water is applied from above the reactants is also contemplated. Water may also drip off of the reactants and collect at the bottom of the reaction chamber 314. As the reaction occurs, waste may be generated. If the reactants are aluminum alloys, the waste may be aluminum hydroxide, as described in Equations (1) and (2). The aluminum hydroxide (or other waste product) may fall through the holes 332 of the support 330 and collect at the bottom of the reaction chamber 314. Small portions of the reactant may also separate from the reactants and fall through the holes 332 and into water that has collected at the bottom of the reaction chamber, where the small portions of the reactant may continue reacting. As described above in relation to FIG. 7, the reactor 300 may include a divider 315 that may at least partially separate the reactants from one another. The divider may permit mixing of hydrogen gas generated by either the first reactant 303 or the second reactant 305 such that all generated hydrogen gas may exit the reaction chamber 314 through a single gas outlet 316, though the use of multiple separate gas outlets for fully separated reactants are also contemplated.

Figure 9:
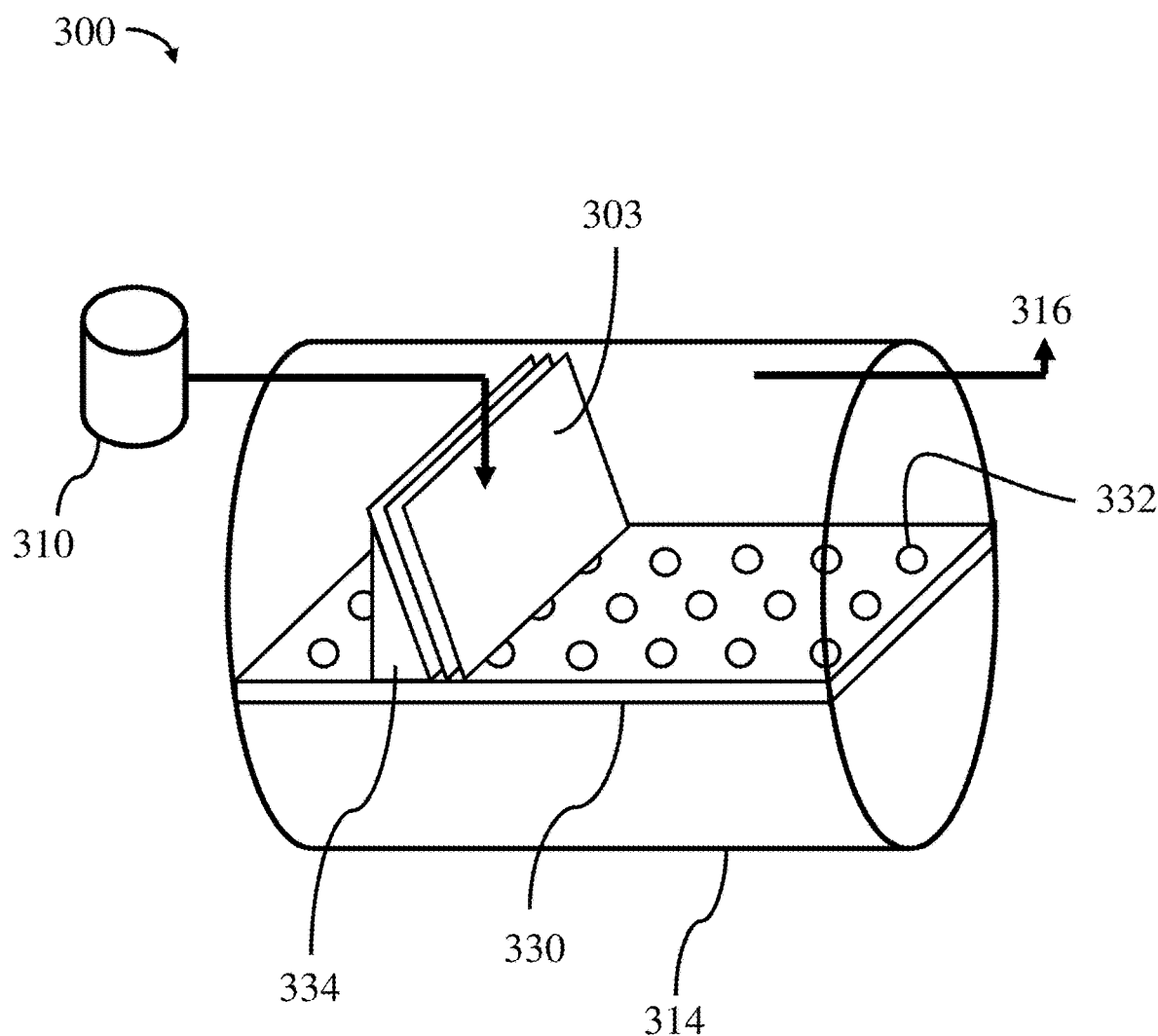
FIG. 9 depicts another embodiment of a reactor.

FIG. 9 depicts another embodiment of a reactor 300 for generating hydrogen gas with a configuration similar to the embodiment of FIG. 7. In this embodiment, a second support 334 controls an orientation of the first reactant 303. For example, if the first reactant 303 is formed into sheets, the second support 334 may comprise a block, a wedge, or another appropriate supporting surface or contact configured to angle the reactant sheets such that water applied to the reactant may flow down the surface of the reactant sheets. As the water flows down the reactant sheets, waste products and/or portions of reactant may be carried along with the water, thereby exposing a new, unreacted surface of the reactant which may be available for a subsequent reaction upon the application of additional water. When water is no longer supplied from the water source 310, the surface of the reactant 303 may dry and the reaction may stop. As described above, water, waste products, and/or portions of reactant may fall through holes 332 formed in a portion of a support 330 that is located vertically beneath the reactant and that may also elevate the reactant from the base of the reaction chamber 314, such that unreacted portions of the reactant that break off from the primary portions of the reactant contained in the reactor may continue reacting with water at the base of the reaction chamber. It should be appreciated that although only a single reactant is depicted in FIG. 9, any suitable number of reactants in either combined or separate reaction chambers as the disclosure is not so limited.

Figure 10B:
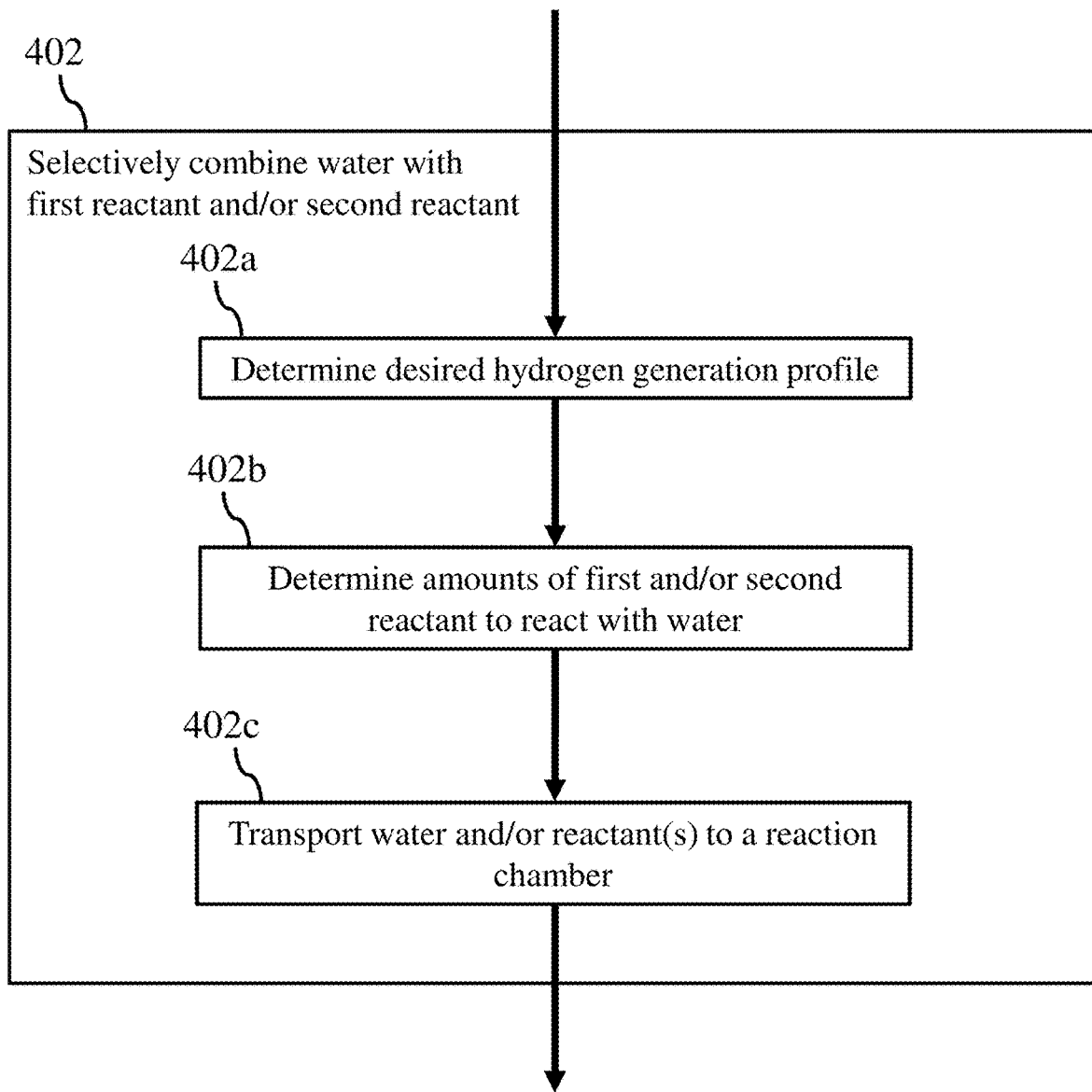
FIG. 10B depicts a portion of the flow diagram of FIG. 10A in greater detail.

FIG. 10A is a flow diagram of one embodiment of a method 400 for generating hydrogen gas. At 402, water is selectively combined with a first reactant and/or a second reactant. As described above, the reactants may be aluminum alloys, such as those comprising silicon and/or magnesium. Details of how water and reactant(s) may be selectively combined are described in reference to FIG. 10B below. At 404, hydrogen gas is generated from a reaction of the water and the reactant(s). It should be appreciated that different reactant compositions may be associated with different reaction rates and/or different rates of hydrogen generation. At 406, one or more parameters associated with the reaction are monitored. For example, a rate of hydrogen gas generation may be monitored, or a temperature of a reaction chamber may be monitored. Of course, other parameters associated with the reaction may be additionally or alternatively monitored, as the disclosure is not limited in this regard. As indicated in the figure, and as described in greater detail below, this method may be repeated iteratively.

FIG. 10B depicts step 402 of the method 400 in greater detail. As described above, step 402 comprises selectively combining water with a first reactant and/or a second reactant. At 402a, a desired hydrogen generation profile is determined. In some embodiments, a desired hydrogen generation profile may be a constant rate of hydrogen gas production. Of course, other desired hydrogen generation profiles may be appropriate, such as profiles that include step changes and/or steady increases or decreases in the hydrogen generation rate. In some embodiments, a desired hydrogen generation profile may be programmed or otherwise input by a user, while in some embodiments a desired hydrogen generation profile may be determined automatically based on sensed parameters of the reaction or of the reaction chamber. After a desired hydrogen generation profile is determined at 402a, proportions of water and reactant(s) are determined at 402b. The proportions of the water and the reactant(s) may be based at least in part on the desired hydrogen generation profile, the current hydrogen generation rate, an amount of water and/or reactants remaining in a water source and/or reactant reservoirs, and/or any other relevant parameter. For example, if the current hydrogen generation rate is below a desired hydrogen generation rate of the desired hydrogen generation profile, a greater proportion of a reactant with a high reaction rate for a given amount of reactant may be selected rather than a reactant with a low reaction rate. Thus, the proportion of a first faster rate reactant may be varied relative to a second slower rate reactant to control both the instantaneous as well as future predicted hydrogen generation rate of a reactor in order to provide a desired hydrogen generation profile as detailed further below. Of course, a desired hydrogen generation rate may change over time, even with a constant desired hydrogen generation profile. As such, the method 400 may be repeated iteratively in a continuous fashion, such that the proportions of water and reactant(s) may be adjusted continuously throughout the duration of the reaction(s).

After the proportions of water and reactant(s) are determined at 402b, the water and reactant(s) may be combined in any desired fashion as previously described depending on the particular type of reactor being used. For example, one or more water and/or reactant feeders may be used to transport the water and/or the two or more reactants to a desired location within the reactor to react a desired amount of the first and/or second reactants with a desired amount of water. Again, this may include transporting water to separate reactant reservoirs, transporting the reactants to a reservoir including water, transporting both reactants and water to a central reactant chamber, and/or any other appropriate method of combining water with the one or more reactants, as the disclosure is not limited in this regard.

Figure 11A:
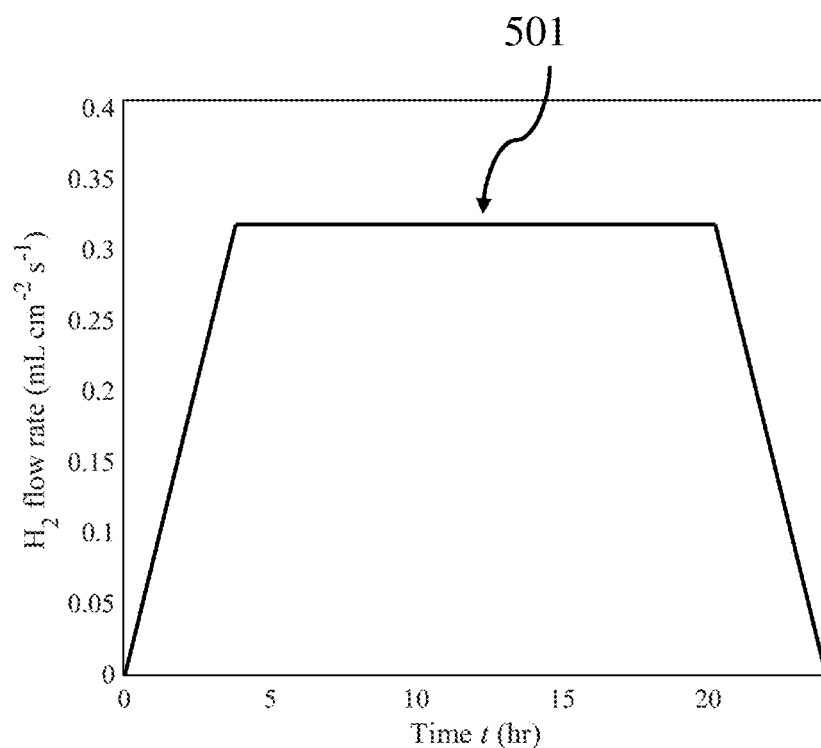
FIG. 11A depicts hydrogen gas generation over time from reacting a first reactant.

FIG. 11A depicts hydrogen generation over time from reacting a first reactant. After a reaction is initiated, a rate at which hydrogen gas is generated from the first reactant may increase during a "ramp up" period. After the ramp up period, the rate of hydrogen gas generation may level off and remain constant over time. After an amount of time, the rate of hydrogen gas generation may begin to decrease during a "ramp down" period, until the provided reactant and/or water no longer generates hydrogen gas. The hydrogen generation profile of the first reactant is indicated in FIG. 11A at 501. In some embodiments, there may be benefits associated with a hydrogen generation profile of a particular shape. For example, in some embodiments, it may be desirable to provide a constant rate of hydrogen generation, without significant ramp up or ramp down periods that may be associated with certain reactants. Without wishing to be bound by theory, different reactants may have different hydrogen generation profiles. For example, an alloy of aluminum and silicon may be associated with a shorter ramp up period and/or ramp down period than an alloy of aluminum and magnesium. The inventor has appreciated that reacting different reactants that are associated with different reaction rates may be used to control a shape of an overall hydrogen generation profile for a reactor.

Figure 11B:
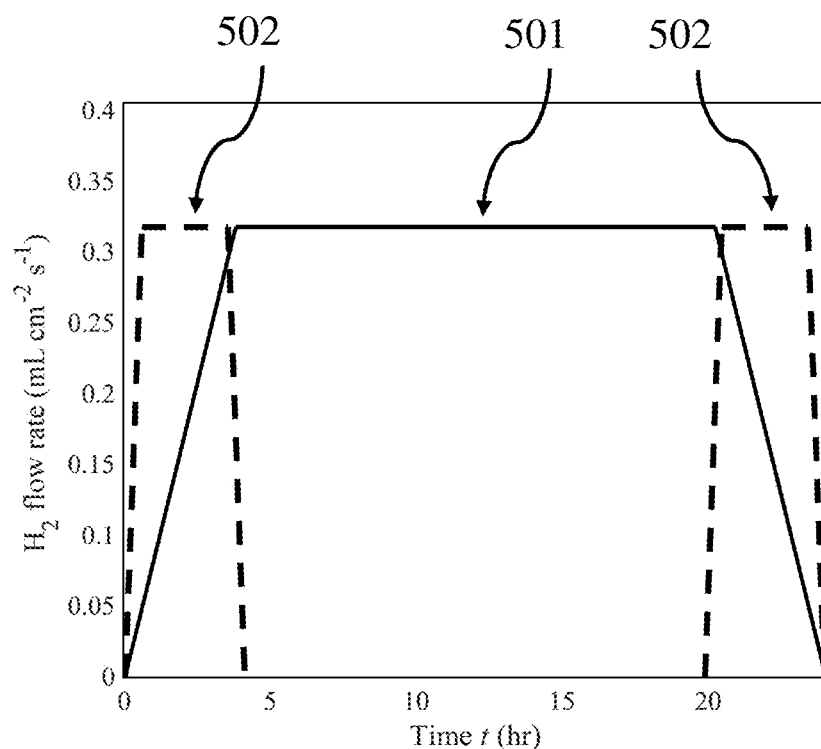
FIG. 11B depicts hydrogen gas generation over time from reacting first and second reactants.

FIG. 11B depicts hydrogen generation over time from reacting first and second reactants in various proportions throughout a reaction to provide a substantially constant amount of hydrogen generation during the beginning, middle, and end of a hydrogen generation process. As discussed above in relation to FIG. 11A, a first reactant may be associated with a first hydrogen generation profile 501 that may include lengthy ramp up and/or ramp down periods. If a constant rate of hydrogen generation is desired, a second reactant with a faster rate of reaction with water relative to the first reactant may be reacted with water during the ramp up period and/or the ramp down period of the first reactant to adjust the overall hydrogen generation rate. For instance, a constant amount of water and/or the first reactant may be combined during the initial ramp up period. This constant delivery of the water and reactant for the first reaction may correspond to the desired steady state hydrogen generation rate. However, to provide the desired hydrogen generation rate during the ramp up period of the first reactant, the second reactant may be combined with water at a desired initial rate to provide the desired hydrogen generation rate when starting hydrogen generation. Due to the reduced ramp up time for the second reactant, the amount of hydrogen generation may quickly reach the desired amount. The amount of the second reactant and water that are reacted with one another may then be reduced over the ramp up period of the first reactant as the amount of hydrogen generated by the first reaction approaches the desired steady-state hydrogen generation rate. Once the desired steady-state hydrogen generation rate using the first slower reactant is reached, the reaction of the second reactant and water may be ceased. Due to the long-term reaction of the first reactant with water, it may be desirable to reduce the rate of the first reactant and water that is being combined prior to ending hydrogen generation. For example, the amount of water in the first reactant being mixed together to generate hydrogen may be reduced over time until the first reactant and water are no longer being combined. Similar to the ramp up period, the amount of second reactant may be increased in proportion to the decrease of the first reactant to maintain a desired hydrogen generation rate through a combination of the hydrogen generation profile of the second reactant 502 and the hydrogen generation profile of the first reactant 501. Once it is desired to terminate hydrogen generation, the second reactant may then also be terminated.

It should be understood that the above embodiment of a hydrogen generation profile corresponding to a constant rate of hydrogen generation is only exemplary. For example, other appropriate types of hydrogen generation profiles including step profiles, instantaneous hydrogen generation demands, and other time varying hydrogen generation profiles, and/or any other appropriate type of hydrogen generation profile may be used. That said, the example illustrates how multiple reactants with different rates of reaction with water may be leveraged to adjust the overall hydrogen generation rate to accommodate both short duration changes in hydrogen generation rates as well as periods of steady hydrogen generation by varying an amount of each reactant that is reacted with water over a given time period.

The following examples are intended to illustrate certain embodiments of the present disclosure, but do not exemplify the full scope of the disclosure.

Example 1

The following example describes the materials and methods used to manufacture and evaluate the compositions described in Examples 2-5.

Samples were custom made by Novelis Inc. in their Spokane Research Center. Samples were tested as-cast, without heat treatment following solidification. All samples were cut from a 1 in. thick as-cast block into 0.032±0.002 in. thick pieces, with a length and width of 0.40 in. Samples were cut using a waterjet, rather than milling, to minimize material deformation and residual stress imposed through the preparation process.

Figure 12A:
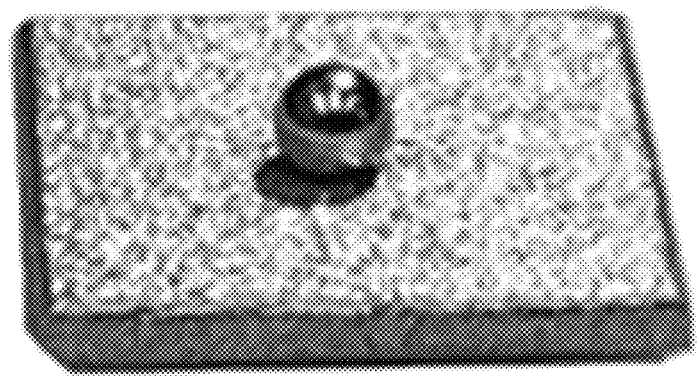
FIG. 12A shows, according to some embodiments, a drop of eGaIn on aluminum surface.
Figure 12B:
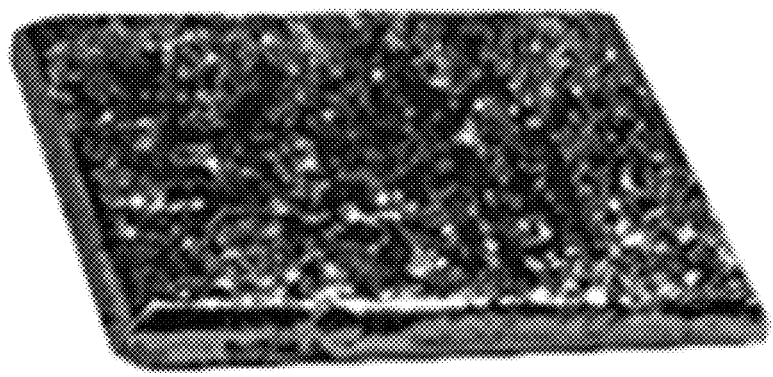
FIG. 12B shows, according to some embodiments, the resulting spread of eGaIn on aluminum surface.
Figure 13A:
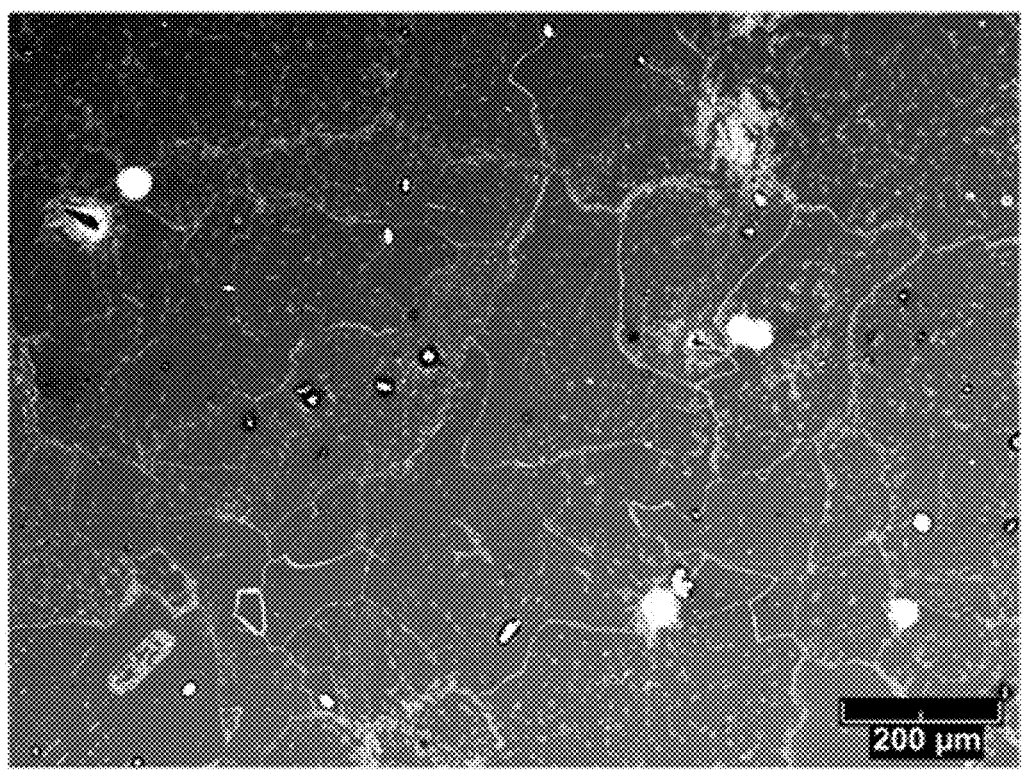
FIG. 13A shows, according to some embodiments, scanning electron microscopy-backscattered electron composition (SEM-BEC) mode imaging of the results of eGaIn-activated Al+Si at 100× magnification.
Figure 13B:
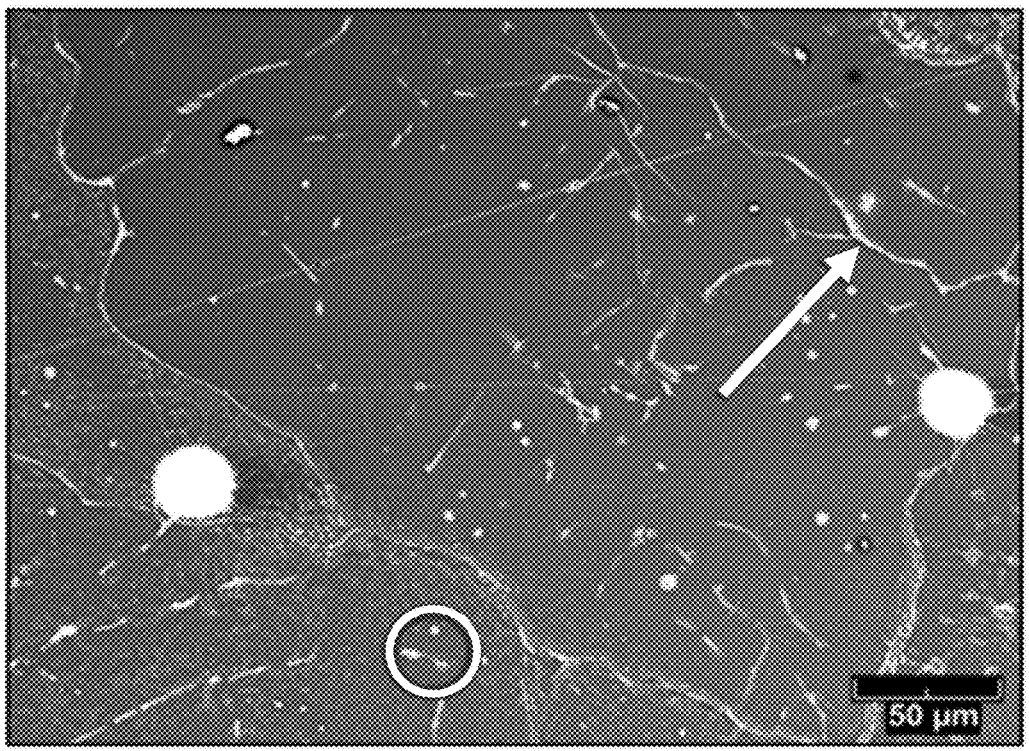
FIG. 13B shows, according to some embodiments, SEM-BEC imaging of the results of eGaIn-activated Al+Si at 370× magnification.
Figure 13C:
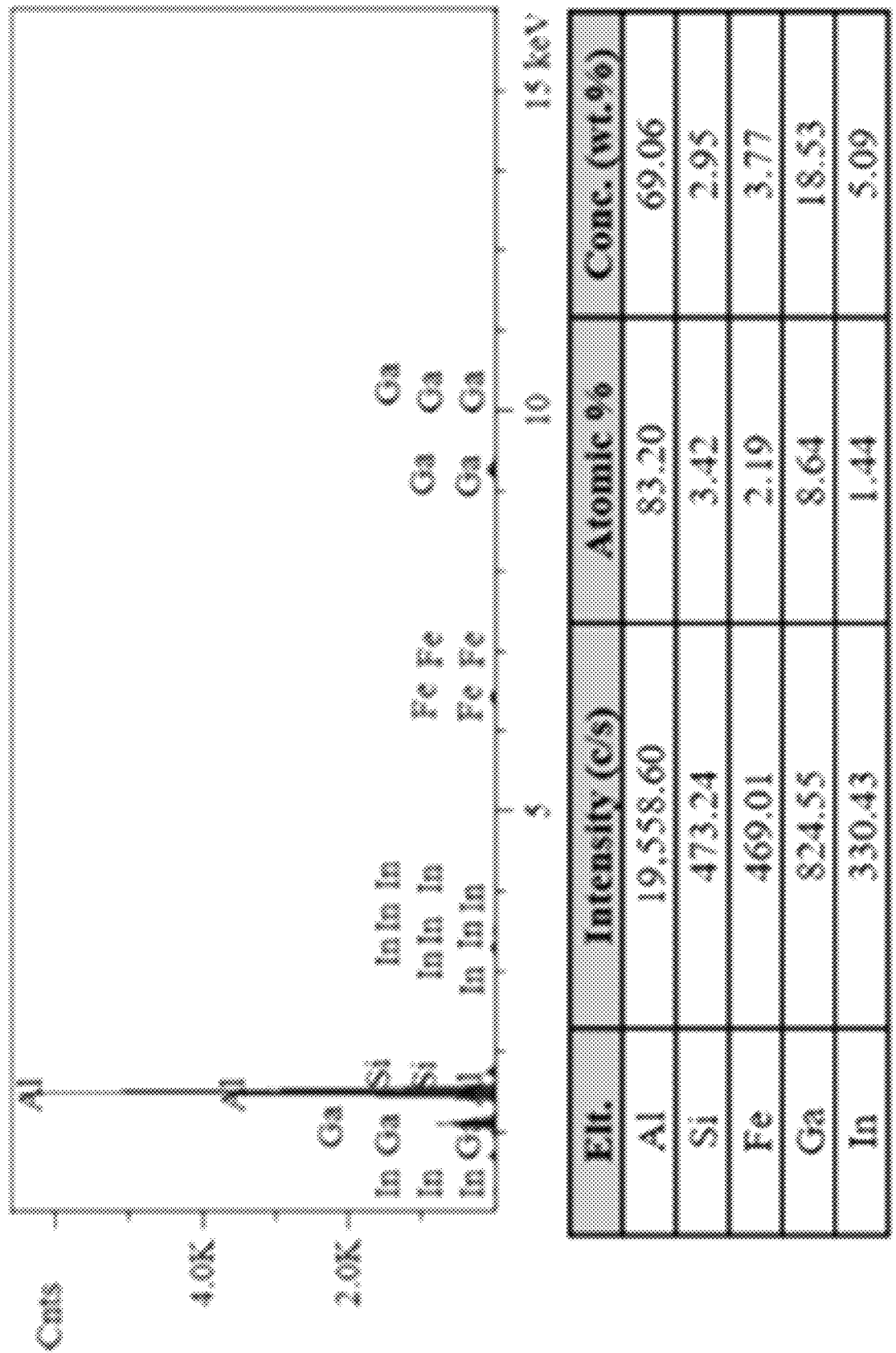
FIG. 13C shows, according to some embodiments, EDS analysis of grain boundary composition of the results of eGaIn-activated Al+Si at the point of the arrow in FIG. 13B.
Figure 13D:
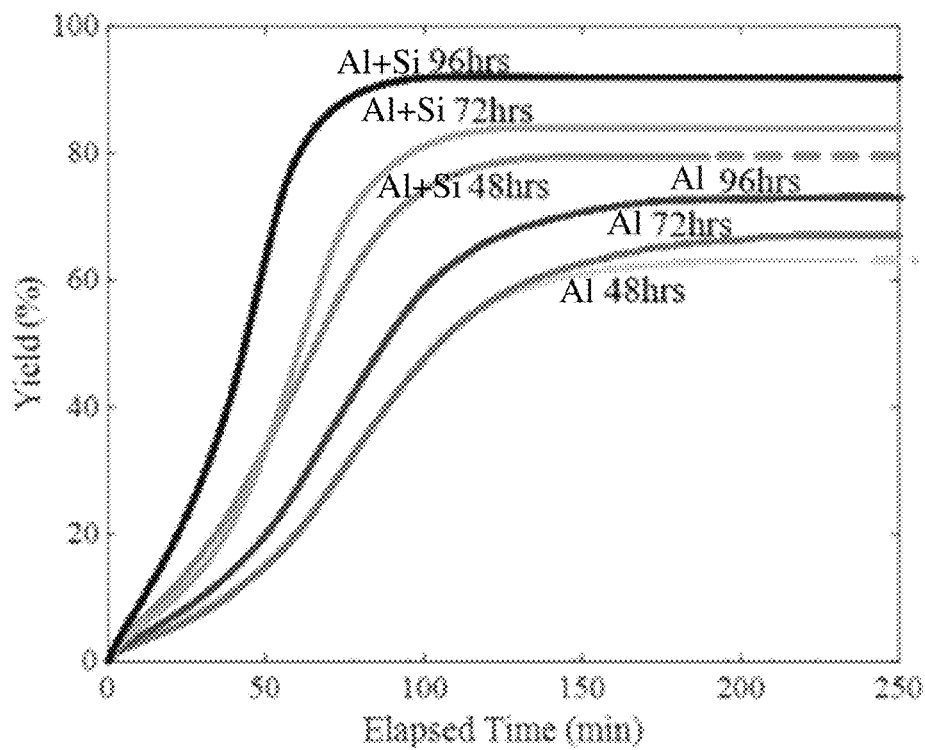
FIG. 13D shows, according to some embodiments, the hydrogen yield of the results of the eGaIn-activated Al+Si.
Figure 13E:
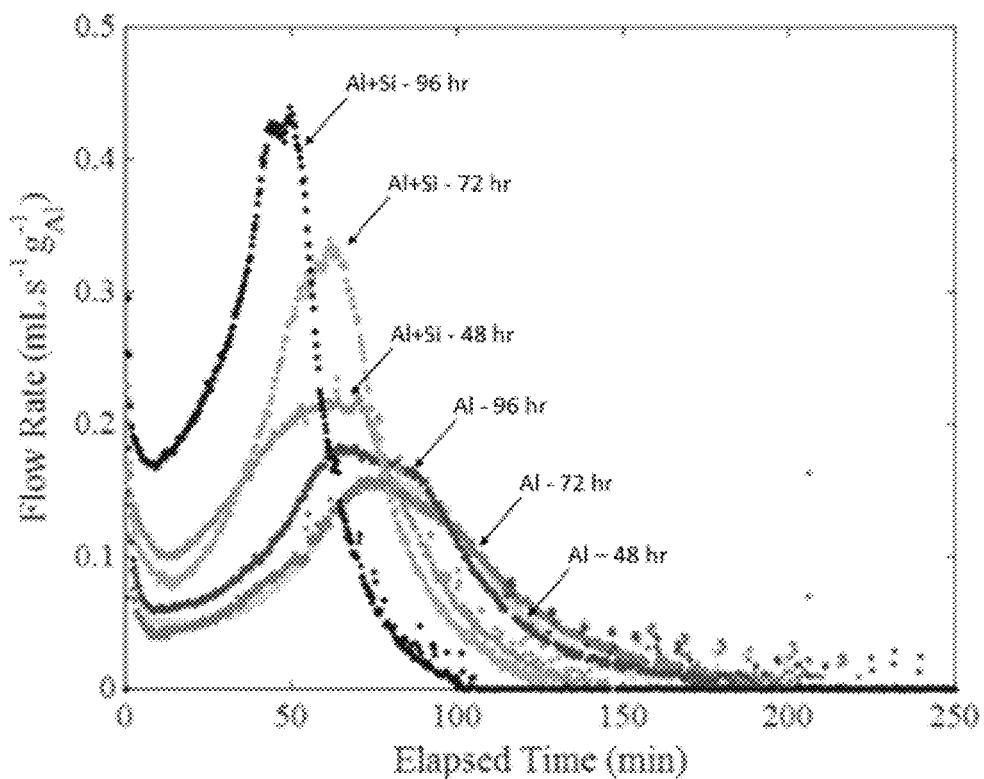
FIG. 13E shows, according to some embodiments, the hydrogen flow rate of the results of the eGaIn-activated Al+Si.
Figure 13F:
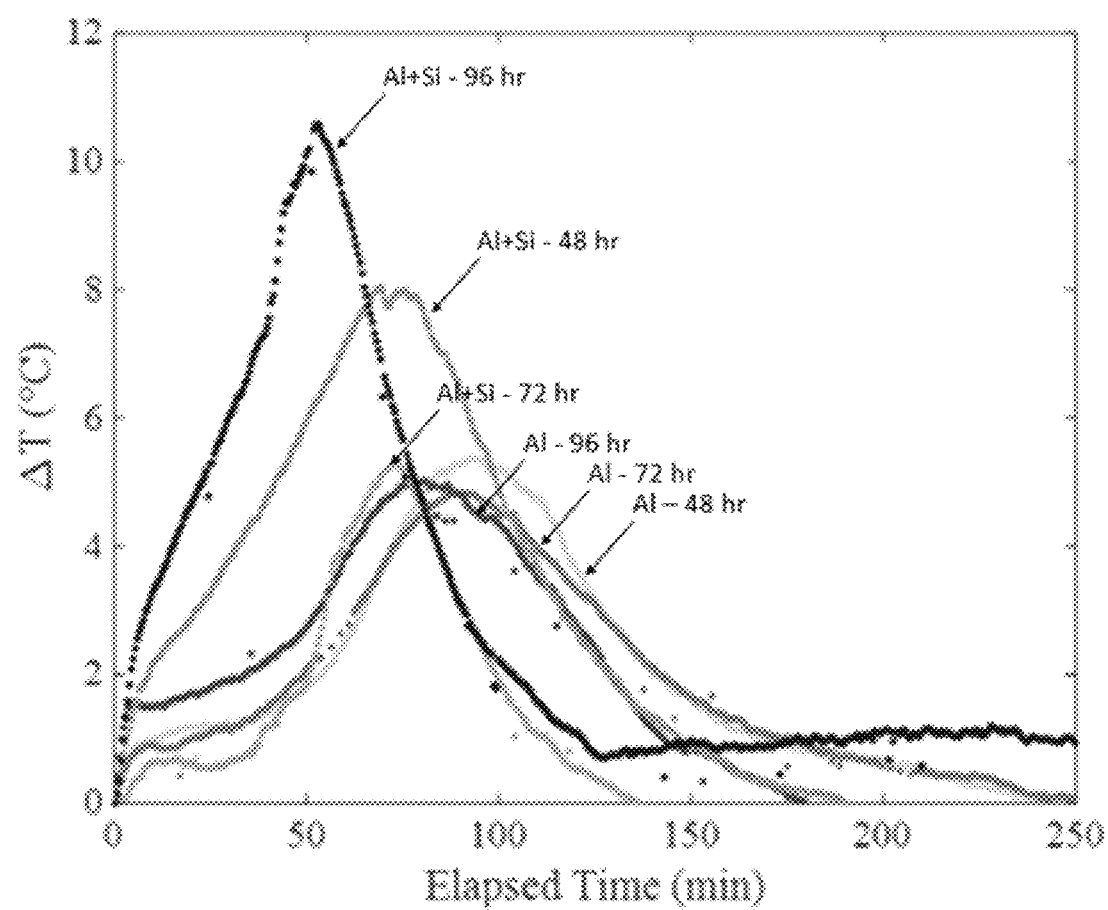
FIG. 13F shows, according to some embodiments, the reaction temperature with respect to time for Al+Si compared to Al.
Figure 14A:
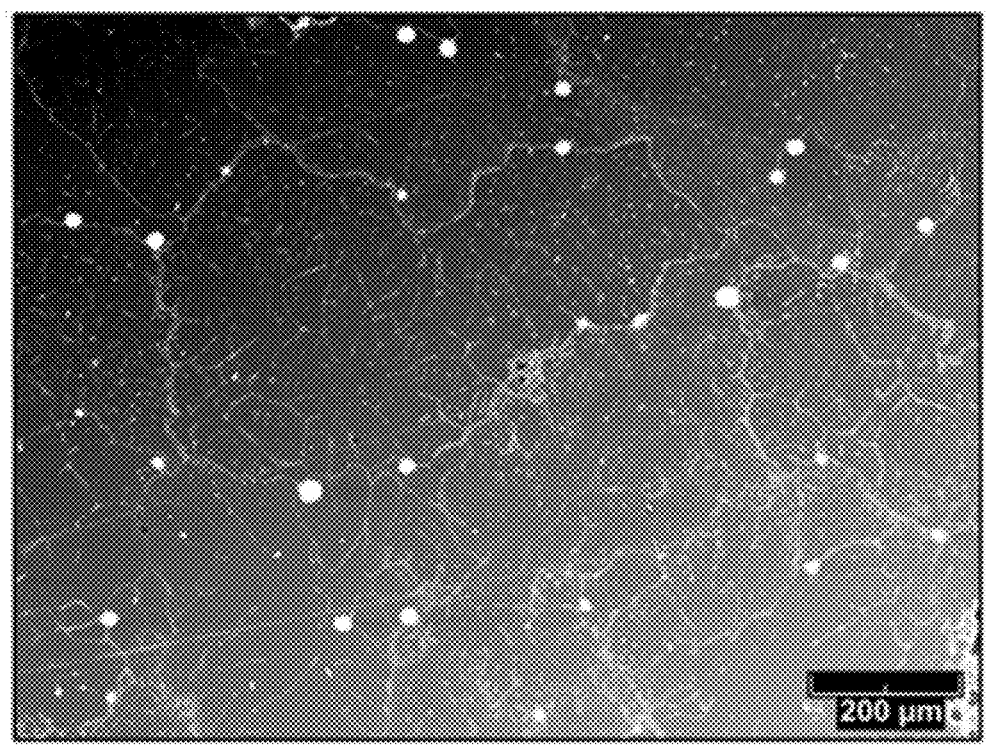
FIG. 14A shows, according to some embodiments, SEM-BEC mode imaging of the aluminum sample at 100× magnification.
Figure 14B:
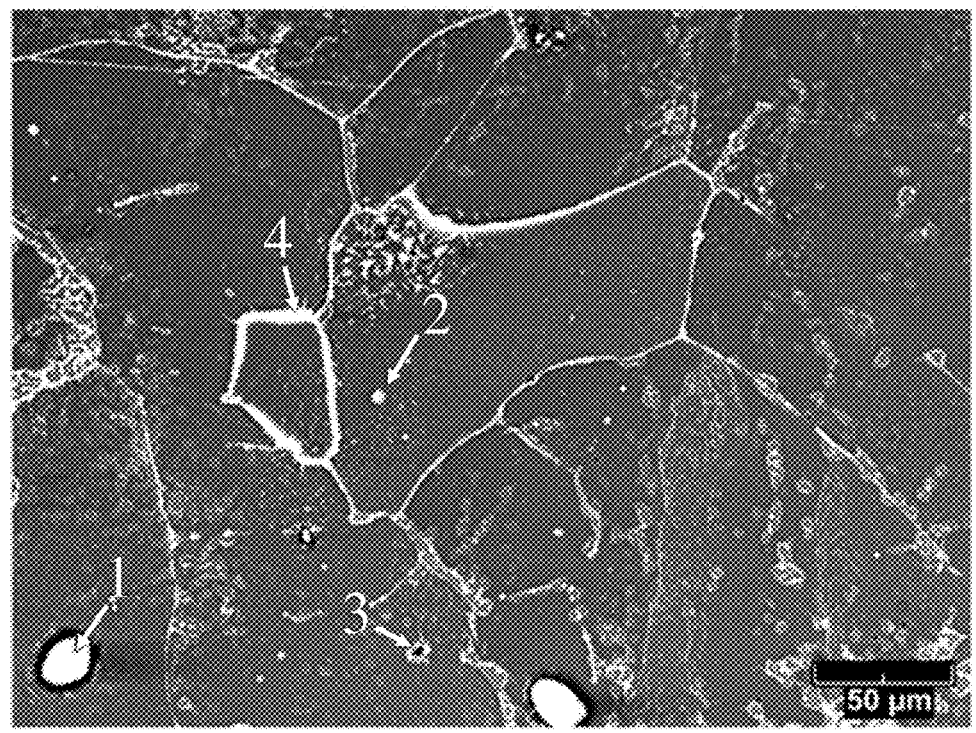
FIG. 14B shows, according to some embodiments, SEM-BEC imaging of the aluminum sample at 370× magnification.
Figure 14C:
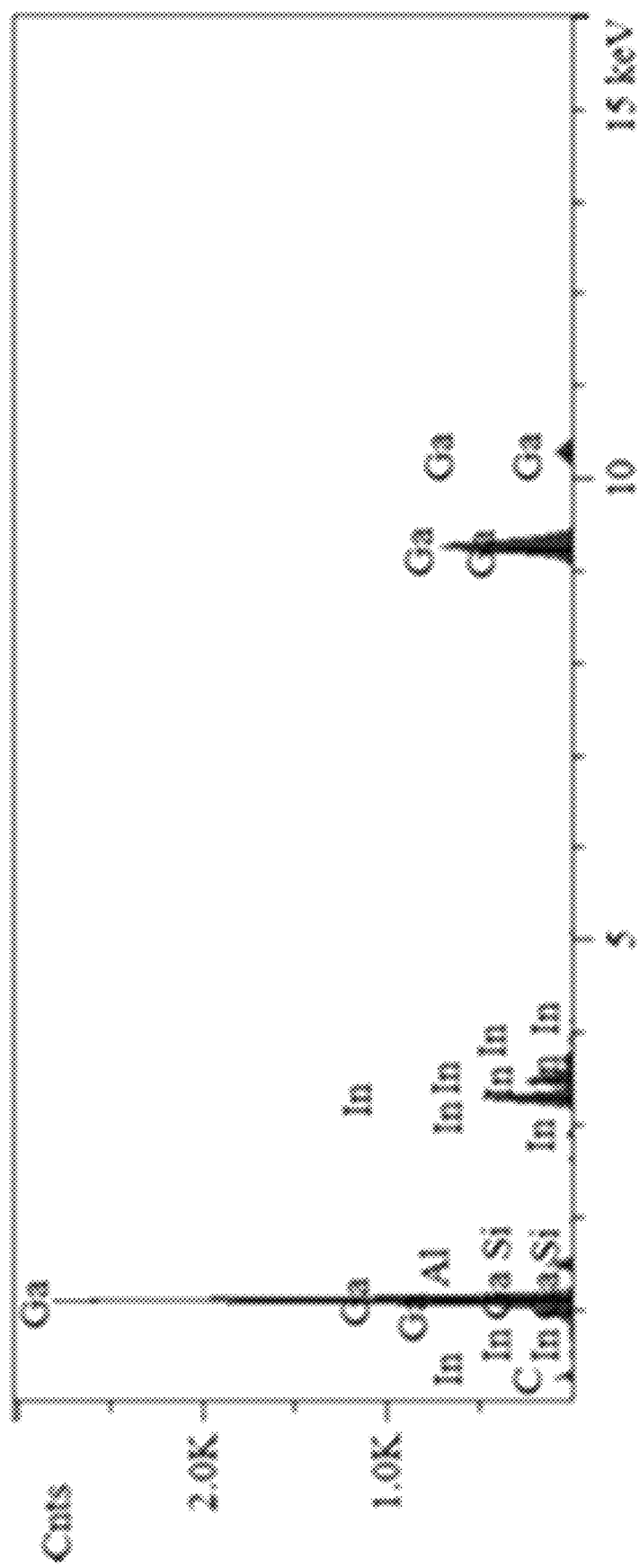
FIG. 14C shows, according to some embodiments, EDS analysis of grain boundary composition of the aluminum sample at point 1 in FIG. 14B.
Figure 14D:
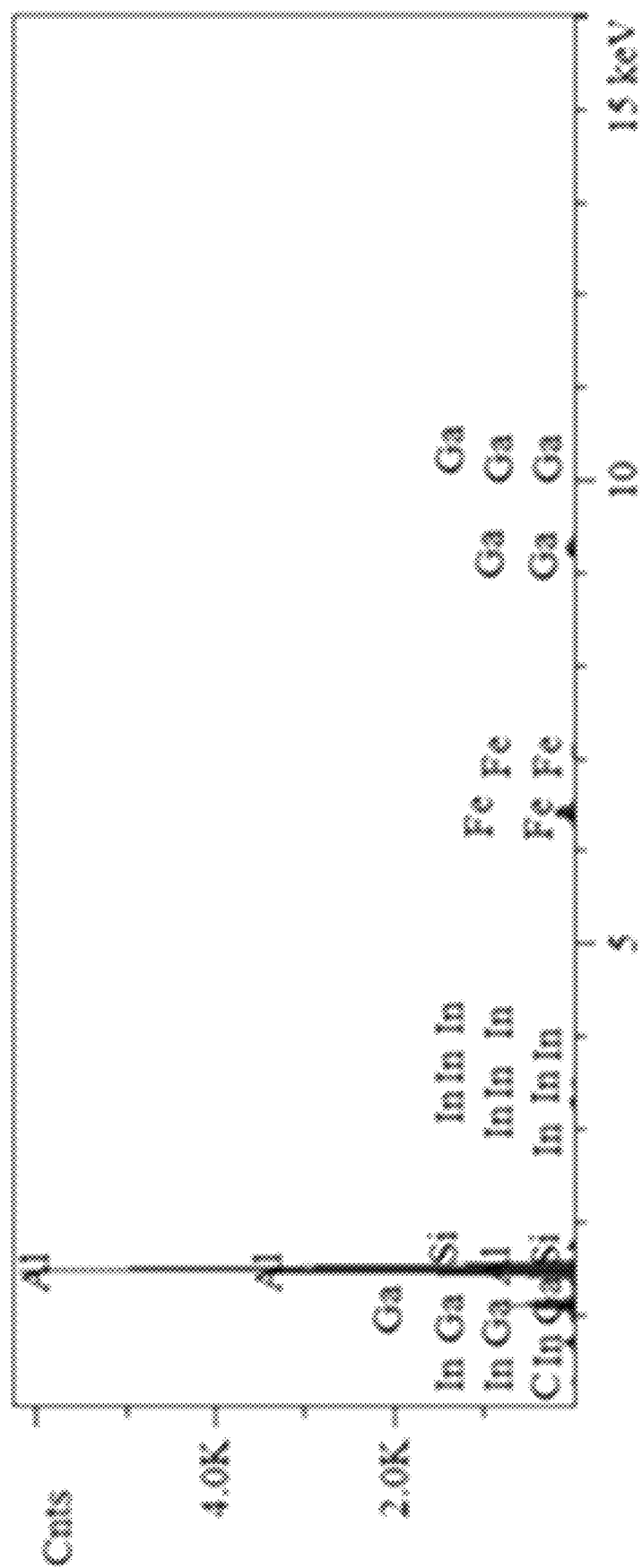
FIG. 14D shows, according to some embodiments, EDS analysis of grain boundary composition of the aluminum sample at point 2 in FIG. 14B.
Figure 14E:
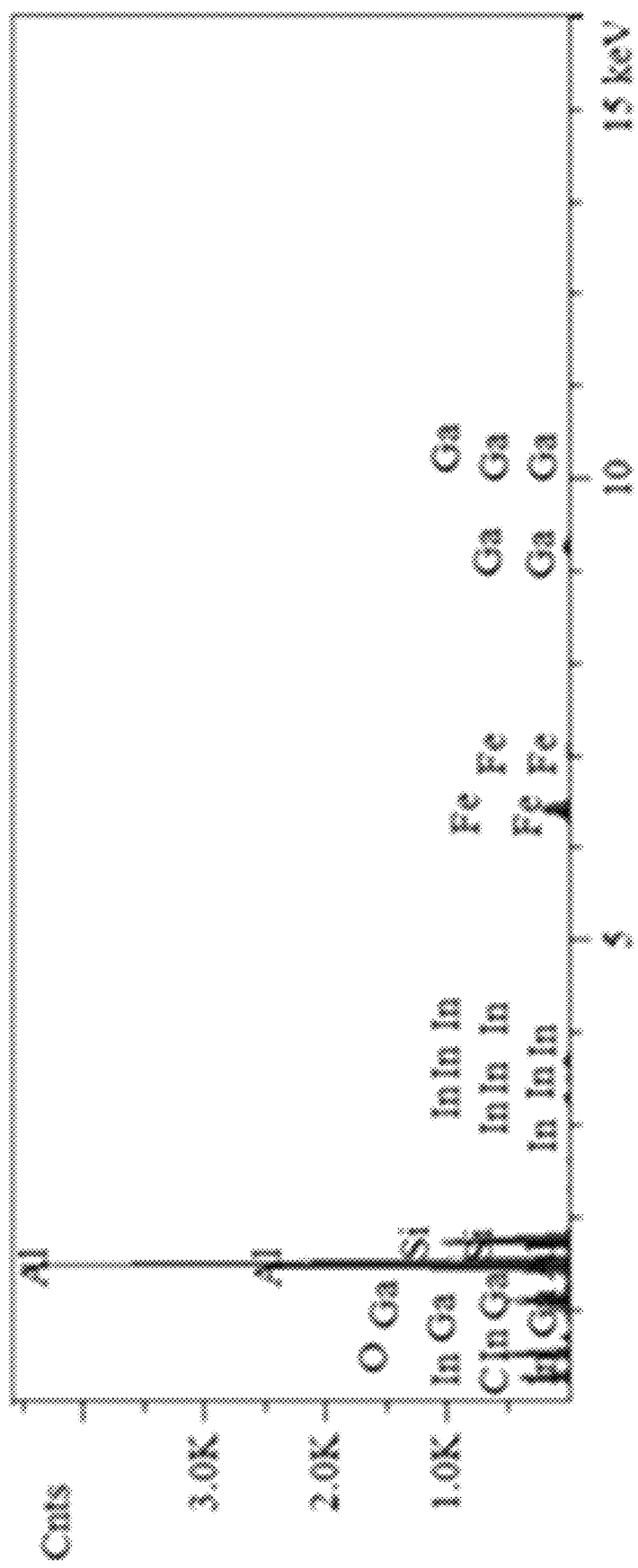
FIG. 14E shows, according to some embodiments, EDS analysis of grain boundary composition of the aluminum sample at point 3 in FIG. 14B.
Figure 14F:
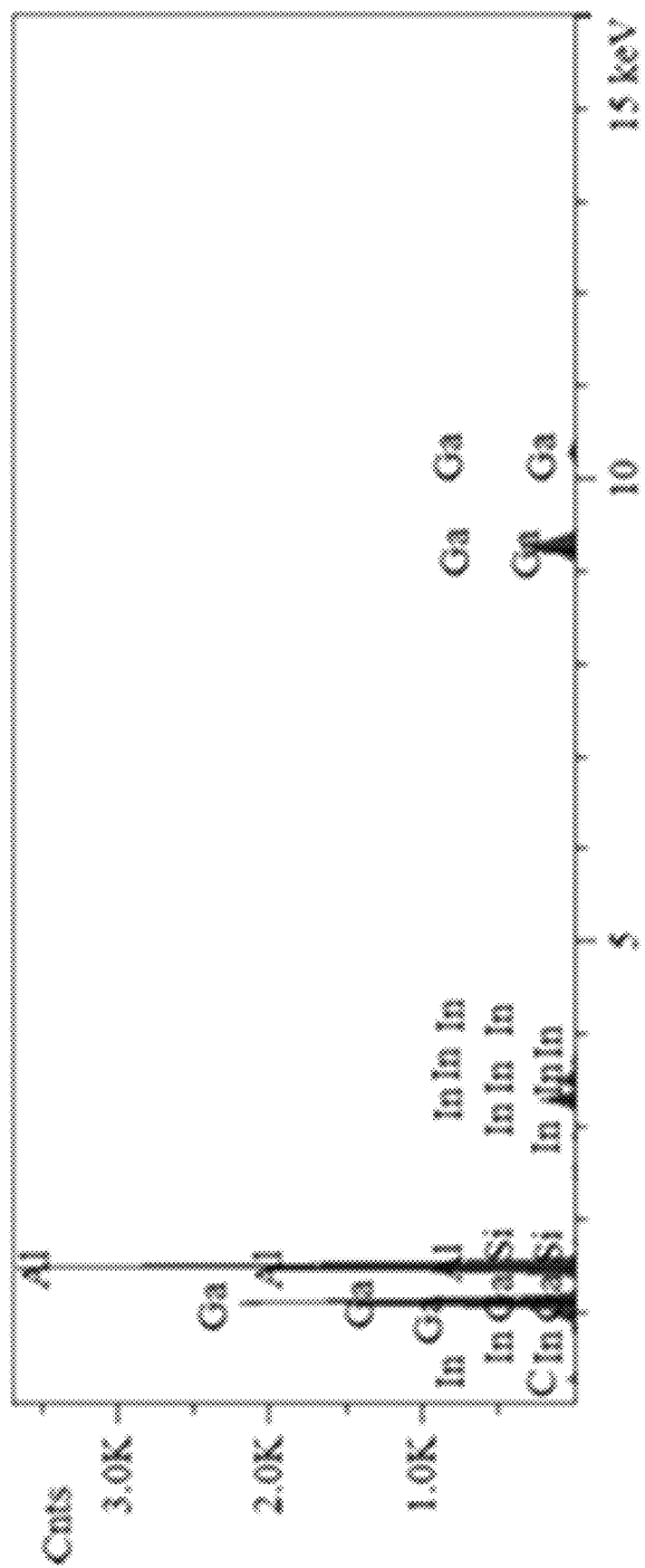
FIG. 14F shows, according to some embodiments, EDS analysis of grain boundary composition of the aluminum sample at point 4 in FIG. 14B.

The activation process consisted of heating the aluminum alloy samples to 100° C., and adding a drop of a eutectic of gallium and indium (eGaIn) to the aluminum alloy surface, as shown in FIG. 12A. Heating the eGaIn reduced the surface tension of the droplet, allowing the droplet to be spread on the aluminum alloy surface using a glass applicator until the eGaIn covered the entire top surface (FIG. 12B). The treated aluminum alloy samples remained on the hot plate for a total of 2 hours. Following this period of time, samples were placed in a desiccant chamber at room temperature until testing. The percent eGaIn applied to samples across all compositions was held as an experimental constant at approximately 5 wt. % that of the Al sample.

Hydrogen generation was measured through a water displacement method. The activated aluminum alloy sample was placed in a glass filtering flask with 6 mL of deionized water, representing the reactor. The initial temperature of the reactor was room temperature (20° C.). Because the aluminum-water reaction was exothermic, the temperature of the aluminum-water mixture increased according to the reaction kinetics and thermal properties of the reactor (i.e., insulated vs. non-insulated). The reactor in this setup was not insulated. Temperature of the Al-water solution was continuously monitored through a sheathed thermocouple in contact with the solution. Upon contact between the aluminum sample and water, hydrogen was generated which then flowed through a glass Graham condenser. Room temperature water was pumped through the condenser in a counter-flow arrangement. The hydrogen gas exited the condenser at room temperature (20° C.) and entered another filtering flask which was filled with deionized water. An additional thermocouple was in contact with the hydrogen gas in the filtering flask to ensure that the gas temperature did not exceed 20° C. The hydrogen gas displaced water from the flask and into a collection flask which was placed on a mass balance. Temperature from the thermocouple in the filtering flask, mass from the mass balance, and time were recorded every 0.5 seconds using a raspberry pi.

Raw data was processed using custom python scripts. Volumetric flow rate was calculated by taking the time derivative of volume displacement data. Experiments were repeated at least three times, and plots contain the average of individual data points. For all samples, the standard deviation in yield was less than 8%. Here, hydrogen yield was defined as the ratio between actual mols of hydrogen generated to the theoretical maximum predicted.

Due to the high sensitivity of the activated aluminum samples to moisture, samples were polished prior to activation. After a single 0.4 in. by 0.4 in. face of the sample was polished, eGaIn was applied to the opposite surface.

Samples were then stored in an argon environment. Following 48 hours of permeation time, grain boundaries were visible on the polished side under scanning electron microscopy (SEM). Grain size and grain boundary composition were characterized by SEM imaging in backscattered electron mode (BEC) and energy-dispersive x-ray spectroscopy (EDS) under high vacuum.

Example 2

The following example describes the evaluation of a composition comprising an aluminum alloy and an eutectic composition, wherein the aluminum alloy comprises silicon.

The base aluminum alloy was doped with silicon, and it was evaluated how the presence of silicon changed the behavior of the eGaIn permeation and the kinetics of the aluminum-water reaction. In FIGS. 13A-13F, the microstructure of as-cast Al+Si after 48 hours of permeation time is shown and the various aspects of the redox reaction involving Al+Si to that of commercially pure aluminum is compared. Due to the high absorption contrast between eGaIn and aluminum, grain boundaries of the aluminum were easily observed under BEC without surface etching with typical agents.

As expected, grain size of as-cast Al+Si was similar to that of as-cast aluminum, considering silicon did not serve as a nucleating agent during aluminum grain growth (see FIGS. 14A-14F for the microstructure of commercially pure aluminum). From FIG. 13A, the average grain size was 458 micrometers with a standard deviation of ~94 micrometers. Importantly, sub-boundaries (low angle dislocation boundaries) were also partially delineated by eGaIn in Al+Si. Gallium was shown to penetrate aluminum as a dislocation front, which would result in permeation through sub-boundaries. eGaIn was shown to also permeate through aluminum as a dislocation front, even in the presence of silicon. The average distance between sub-boundaries in Al+Si after 48 hours of permeation time was 47 micrometers with a standard deviation of 16 micrometers.

Another feature of the Al+Si microstructure was the grain and grain boundary composition. EDS analyses were performed at various points in the Al—Si grain and grain boundaries, which had similar results. Silicon was both in solution as well as at the grain boundaries. At most points in the grain boundary, detection of iron did not exceed about 0.3 wt. %. The grain boundaries were mostly composed of Al, Si, Ga and In. However, higher percentages were detected in some areas. An example, grain boundary point is denoted in FIG. 13B, and EDS results in FIG. 13C. The concentration of Si and Fe at the grain boundary was determined to be due to solute segregation. Solute segregation at grain boundaries is well known to affect metal embrittlement amongst other macroscopic properties. Enrichment of silicon at aluminum grain boundaries reduces the grain boundary surface energy, which could lead to two effects: decreasing penetration rate of eGaIn through grain boundaries due to lower driving force and/or increasing hydrogen generation due to enhanced grain boundary embrittlement. However, due to the low percentage of silicon in the system, it is unknown whether silicon would have such a significant effect on the grain boundary surface energy. Second-phase particles can also form at the grain boundaries, such as β- or α-AlFeSi intermetallics. Such intermetallics were clearly identified on the grain surface of Al+Si, one of which is circled in FIG. 13B, as well as in the commercially pure aluminum (shown in FIGS. 14A-14F).

Permeation rate was studied by reacting samples with water after 48 hours, 72 hours, and 96 hours of permeation time. Results are provided in FIG. 13D through FIG. 13F. Interestingly, the increase in hydrogen yield with permeation time was equivalent in the pure aluminum samples as in the Al+Si samples (+10%, FIG. 13D), indicating that the rate at which eGaIn permeated through Al—Al grain boundaries was similar to the rate at which eGaIn permeated through Al/Si—Al/Si grain boundaries. While the increase in hydrogen production with permeation time was similar between the two compositions, there was a significant difference in hydrogen yield (+20%), flow rates (FIG. 13E) and reaction temperature (FIG. 13F) observed for Al+Si samples than for aluminum, despite the low percentage of silicon (0.6 wt. %).

Corrosion of aluminum alloys have been extensively studied due to the various industrial applications in which aluminum is heavily employed. It is known that the lxxx series of aluminum alloys have a very high resistance to general corrosion, intergranular corrosion and localized corrosion. Generally, the corrosion resistance of aluminum decreases once alloying elements are introduced. Reports on the effects of silicon on aluminum corrosion vary in the conclusions. Silicon has been found to induce intergranular corrosion when segregated to the grain boundaries of aluminum due to silicon being cathodic to the Al-rich matrix, while other studies have found that the corrosion current density of silicon is too low to significantly affect aluminum corrosion due to silicon's polarized nature in aluminum. When eGaIn was also at the grain boundaries of aluminum, silicon enhanced the aluminum-water reaction, though the factors leading to this enhancement may differ than expected from corrosion theory. With only 0.6 wt. % silicon considered here, the effect of silicon on the chemical activity of aluminum would have been negligible.

Example 3

The following example describes the evaluation of a composition comprising an aluminum alloy and an eutectic composition, wherein the aluminum alloy comprises magnesium.

Figure 15A:
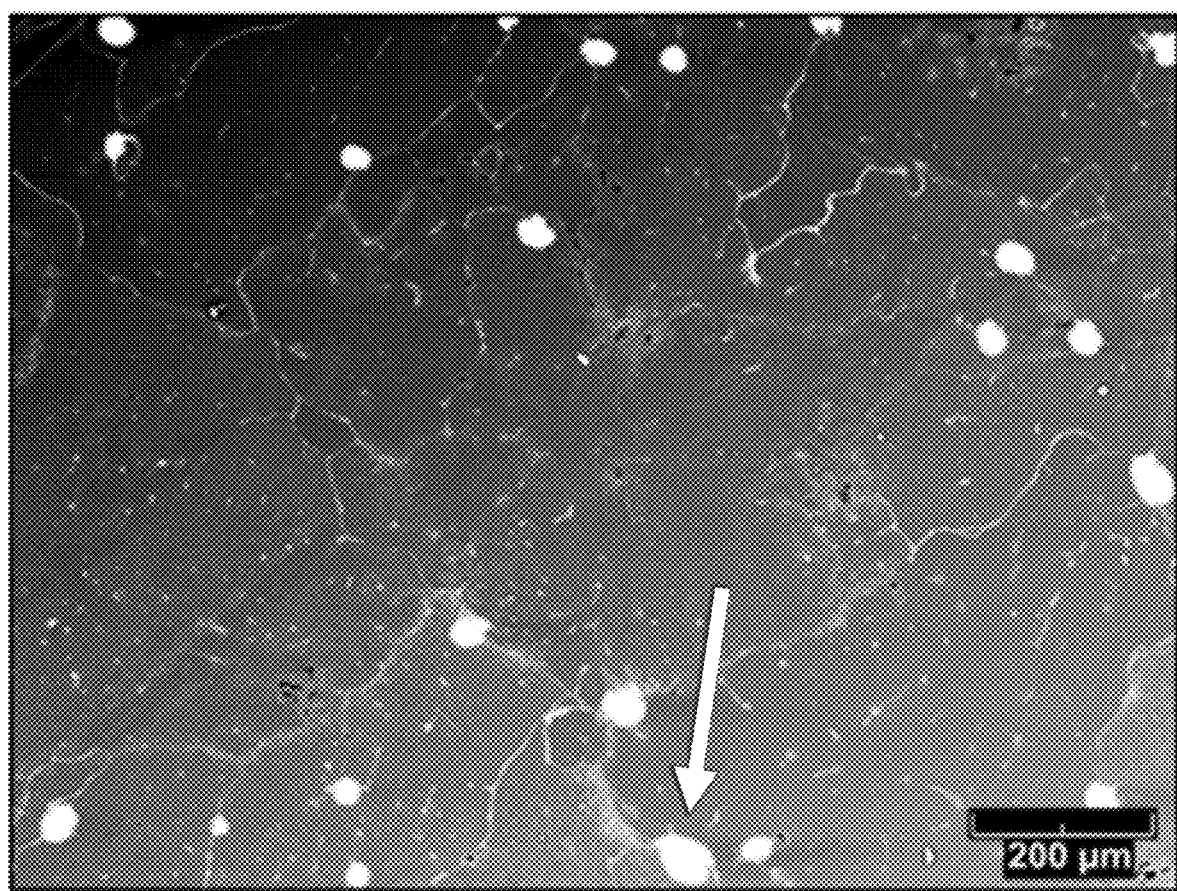
FIG. 15A shows, according to some embodiments, SEM-BEC mode imaging of the results of eGaIn-activated Al+Mg at 100× magnification.

The effects of magnesium doping were investigated, considering their presence in both the 5xxx and 6xxx aluminum alloys. Grain size distribution in Al+Mg also closely followed that of pure aluminum (FIG. 15A). However, sub-grains were not as commonly observed compared to samples of aluminum and Al+Si. This may indicate slower permeation times of eGaIn through the Al+Mg microstructure, or that it is energetically less favorable for the penetration front to move along sub-boundaries when magnesium is present in the Al-rich matrix. Results of the Al-water reaction for Al+Mg showed an increase in reaction rate between 48 hours and 72 hours of permeation time (FIG. 15D), indicating that permeation of eGaIn through the sample was incomplete at the time of imaging (after 48 hours). However, between 72 hours and 96 hours of permeation, the hydrogen yield in Al+Mg dropped by 5%. The reasoning behind this reduction in hydrogen production is currently unknown and requires future investigation.

Figure 15B:
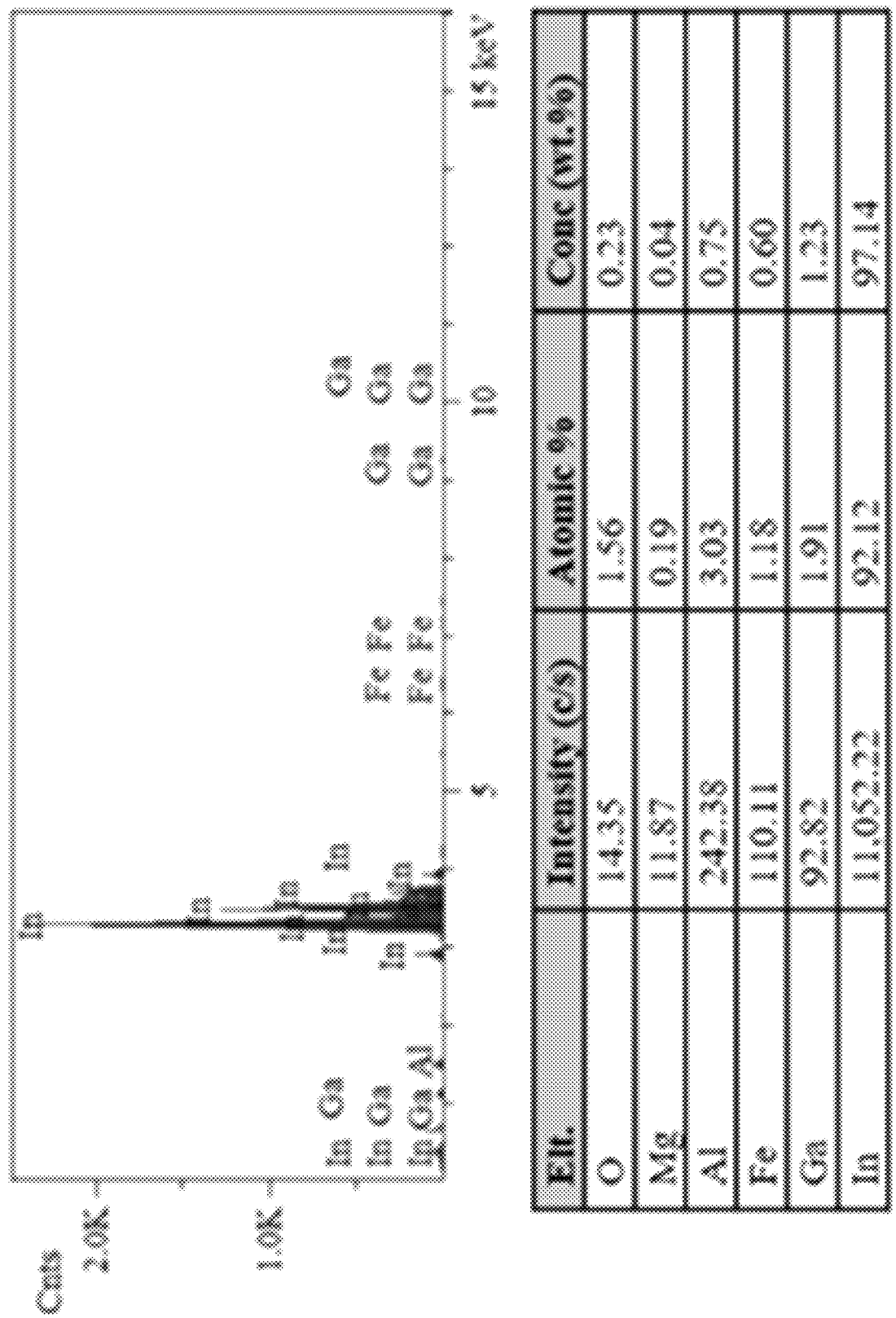
FIG. 15B shows, according to some embodiments, EDS analysis of grain boundary composition of the results of eGaIn-activated Al+Mg at the point of the arrow in FIG. 15A.
Figure 15C:
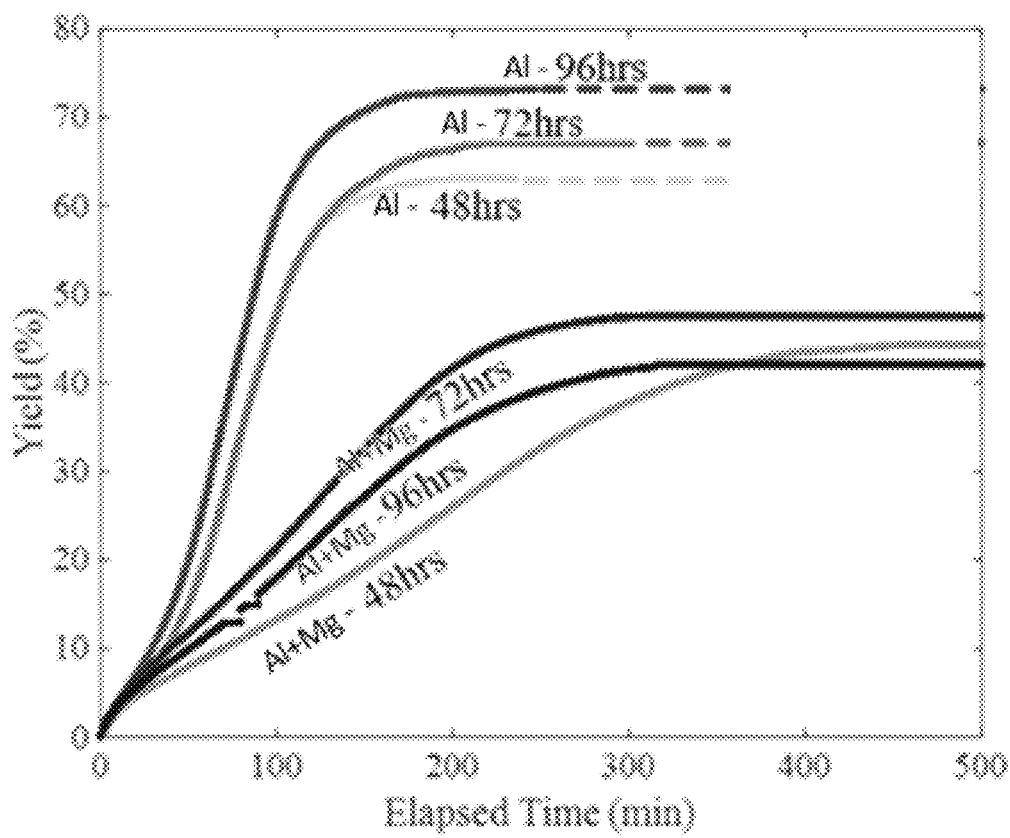
FIG. 15C shows, according to some embodiments, the hydrogen yield of the results of eGaIn-activated Al+Mg.

Compositional analyses show that magnesium was in solution as well as at the grain boundaries, in percentages of less than 2%. An additional observation was made from BEC analysis, related to the segregation of gallium from indium and subsequent accumulation of indium at the sample surface. The segregation of indium from the gallium phase was also observed by others in pure aluminum. Compared to aluminum and Al+Si, larger volumes of segregated indium were found at the grain surface in samples of Al+Mg. BEC and EDS analyses show large spherical patches of In at grain boundaries (~60 µm white patches, with arrow pointing at one in FIG. 15A), analysis of which is provided in FIG. 15B. Enhanced segregation of indium from gallium in Al+Mg samples may be one of the causes behind the reduced hydrogen production in Al—Mg samples, as shown in FIG. 15C. Smaller white particles (~6 µm in width) on the surface of Al+Mg consisted of the eGaIn.

Figure 15D:
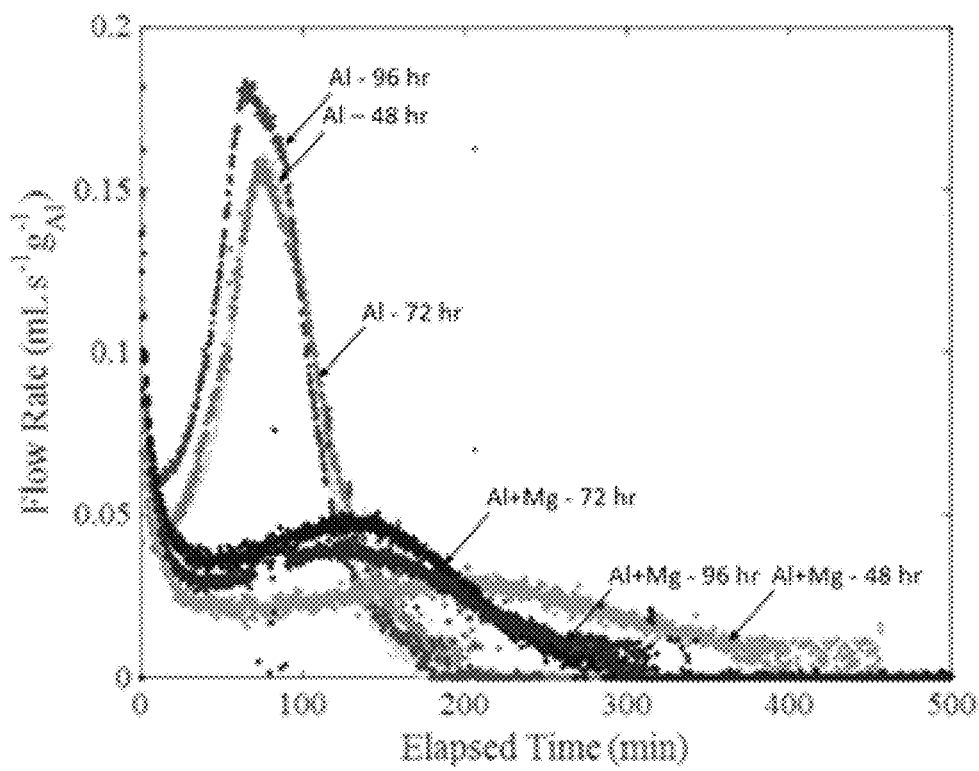
FIG. 15D shows, according to some embodiments, the hydrogen flow rate of the results of eGaIn-activated Al+Mg.
Figure 15E:
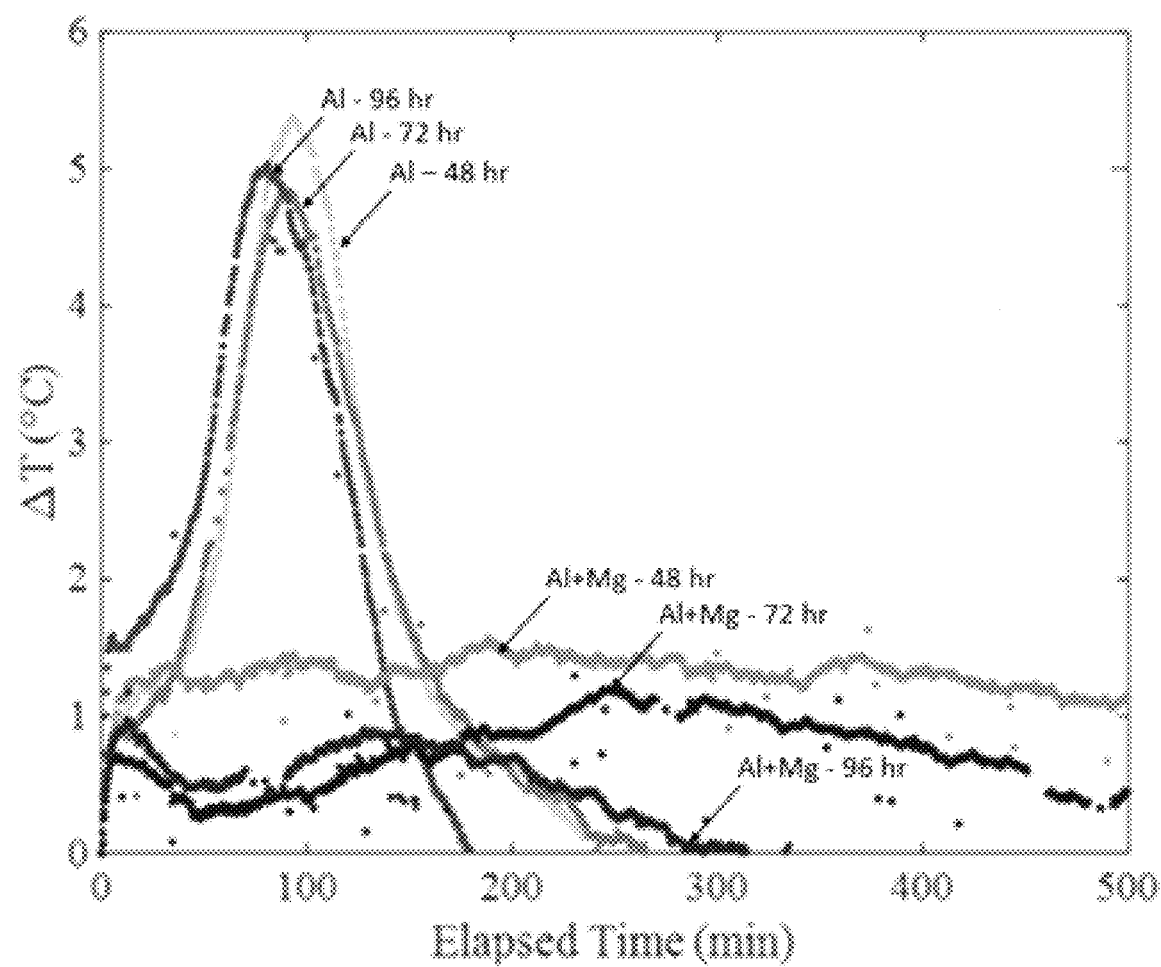
FIG. 15E shows, according to some embodiments, the reaction temperature with respect to time for Al+Mg compared to Al.

From FIGS. 15C-15E, magnesium clearly had a retarding effect on the Al-water reaction, in terms of yield, reaction rate, and reaction temperature. This may be partially explained by the fact that magnesium has a low exchange current density compared to aluminum, and thus decreases the cathodic reaction rate when in solid solution of aluminum. However, the Al-water reaction rate in the presence of magnesium and eGaIn was substantially lower than that without magnesium, beyond which is generally observed when comparing the corrosion resistance of commercially pure aluminum to that of Mg-doped aluminum. Another factor that may have contributed to the reduced rate of the oxidation-reduction reaction concerns the lack of eGaIn at sub-boundaries in Al+Mg, as previously noted. The lack of eGaIn at sub-boundaries would reduce the surface area for the aluminum-water reaction to occur.

Example 4

The following example describes the evaluation of a composition comprising an aluminum alloy and an eutectic composition, wherein the aluminum alloy comprises silicon and magnesium.

Figure 16A:
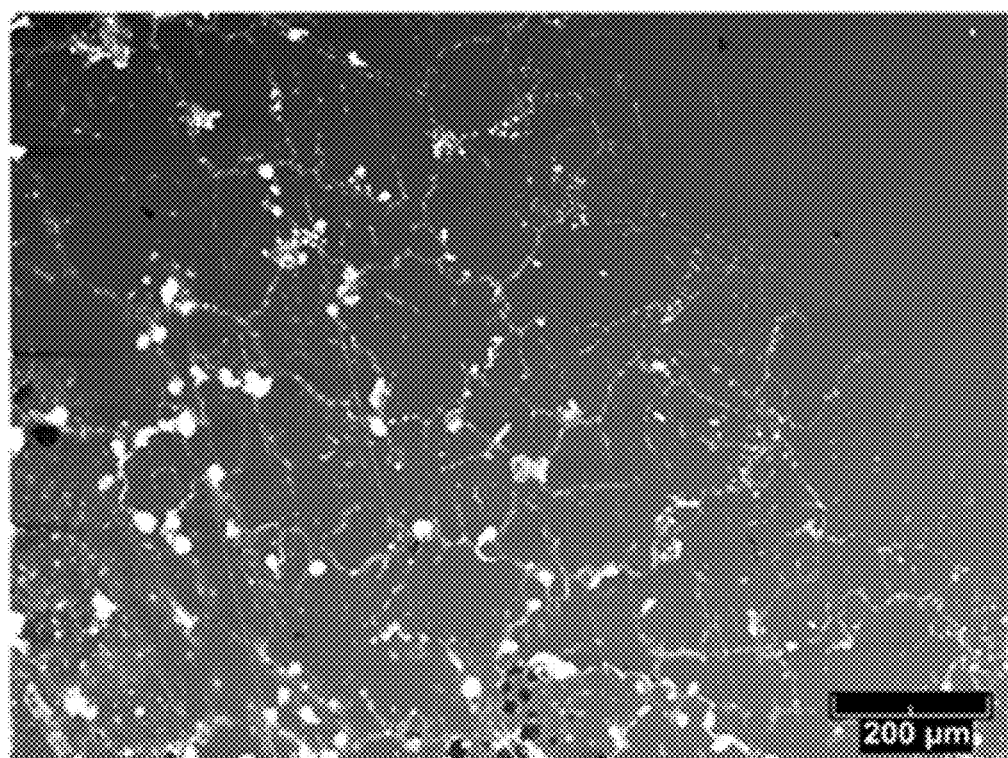
FIG. 16A shows, according to some embodiments, SEM-BEC mode imaging of the results of eGaIn-activated Al+Mg,Si at 100× magnification.

Samples of Al+Mg,Si were investigated to understand the effects of both magnesium and silicon together, considering their combined presence in the 6xxx commercial aluminum alloy series. SEM analyses (FIG. 16A) indicated that eGaIn permeation through grain boundaries was not complete at the time of imaging (after 48 hrs of pretreatment). Nonetheless, sub-boundaries were still delineated wherever grain boundaries were apparent. Grains were smaller in samples of Al+Mg,Si compared to other samples, with an average diameter of ~200 micrometers and a standard deviation of 48 micrometers. Subgrains were also slightly smaller than those in previous samples, having an average diameter of 33 micrometers with a standard deviation of 8 micrometers. This may have been due to potential pinning of $Mg_2Si$ at the grain boundaries in samples of Al+Mg,Si.

Figure 16B:
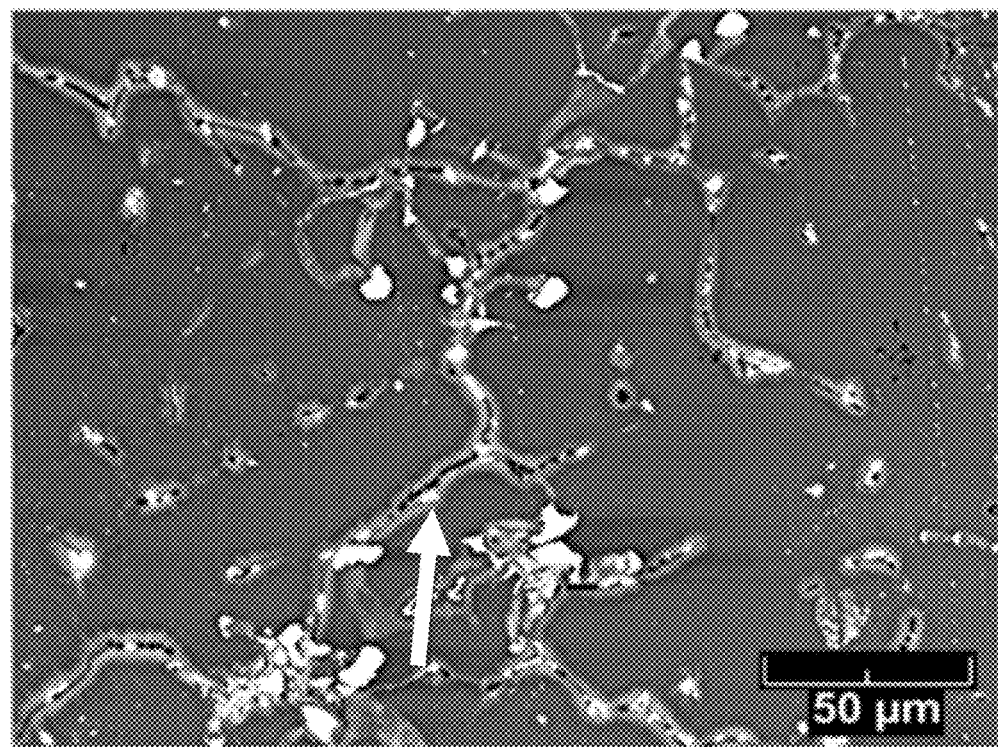
FIG. 16B shows, according to some embodiments, SEM-BEC imaging of the results of eGaIn-activated Al+Mg,Si at 370× magnification.
Figure 16C:
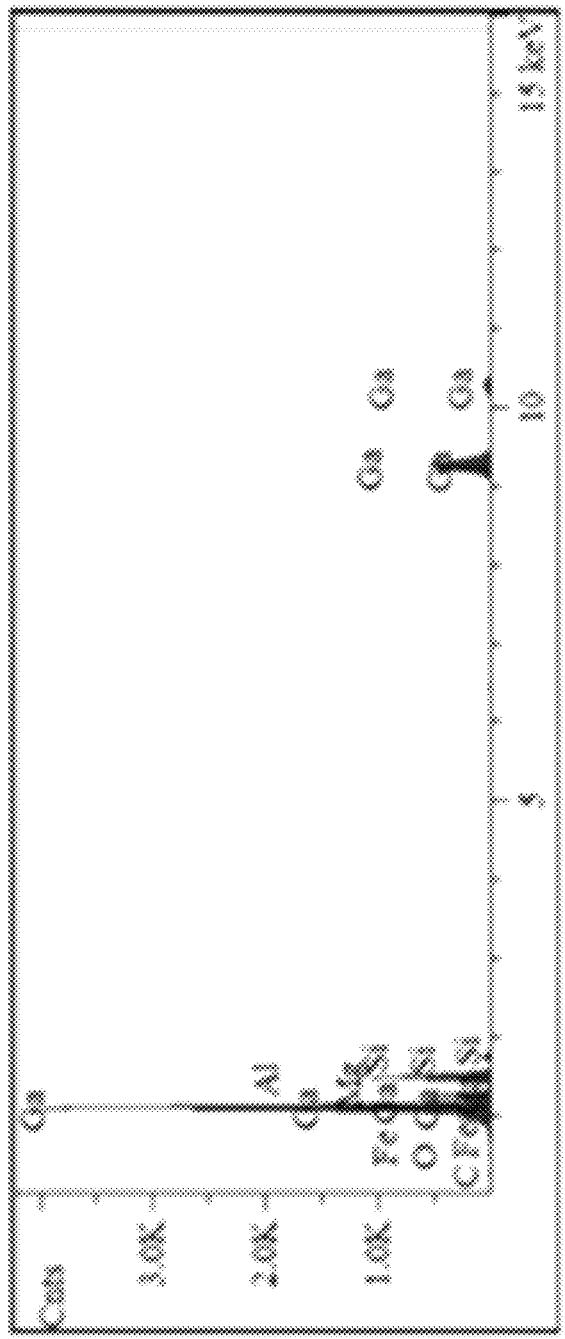
FIG. 16C shows, according to some embodiments, EDS analysis of grain boundary composition of the results of eGaIn-activated Al+Mg,Si at the point of the arrow in FIG. 16B.
Figure 17A:
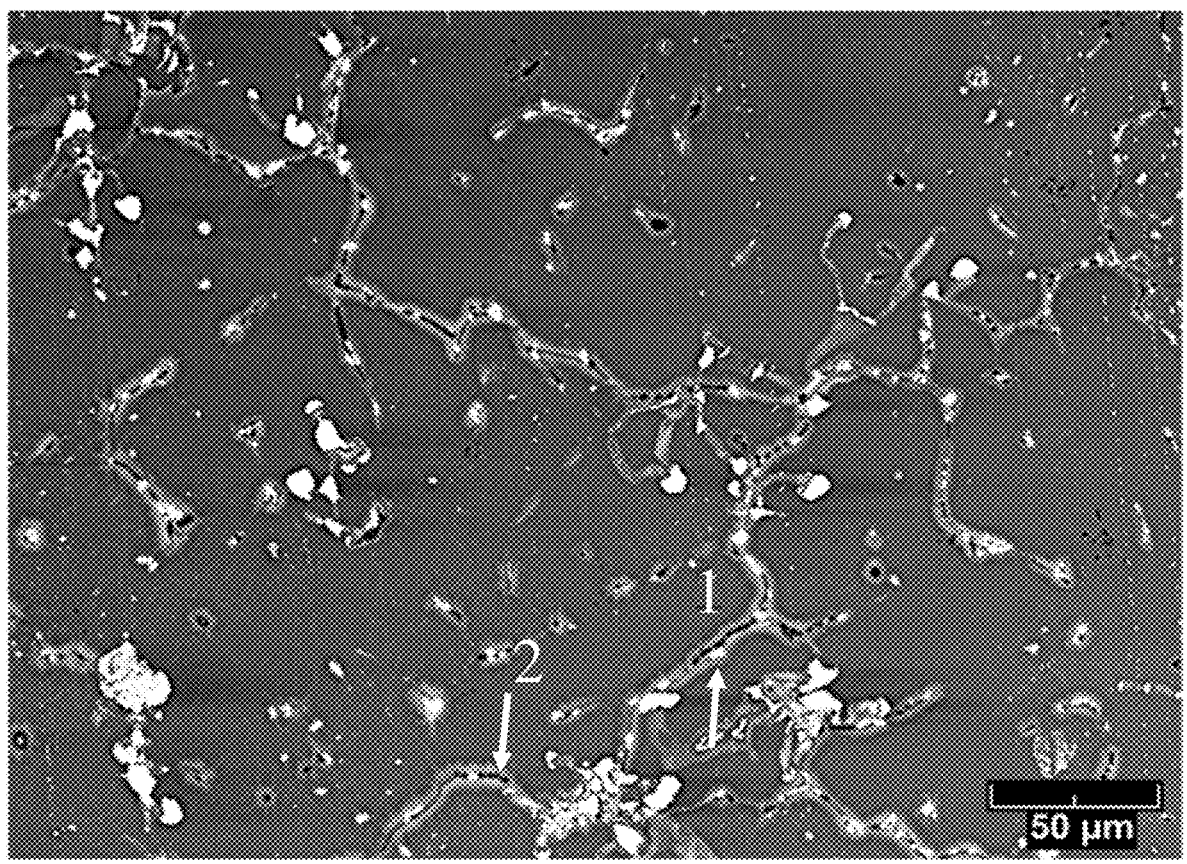
FIG. 17A shows, according to some embodiments, SEM-BEC imaging of the results of eGaIn-activated Al+Mg,Si at 370× magnification.
Figure 17B:
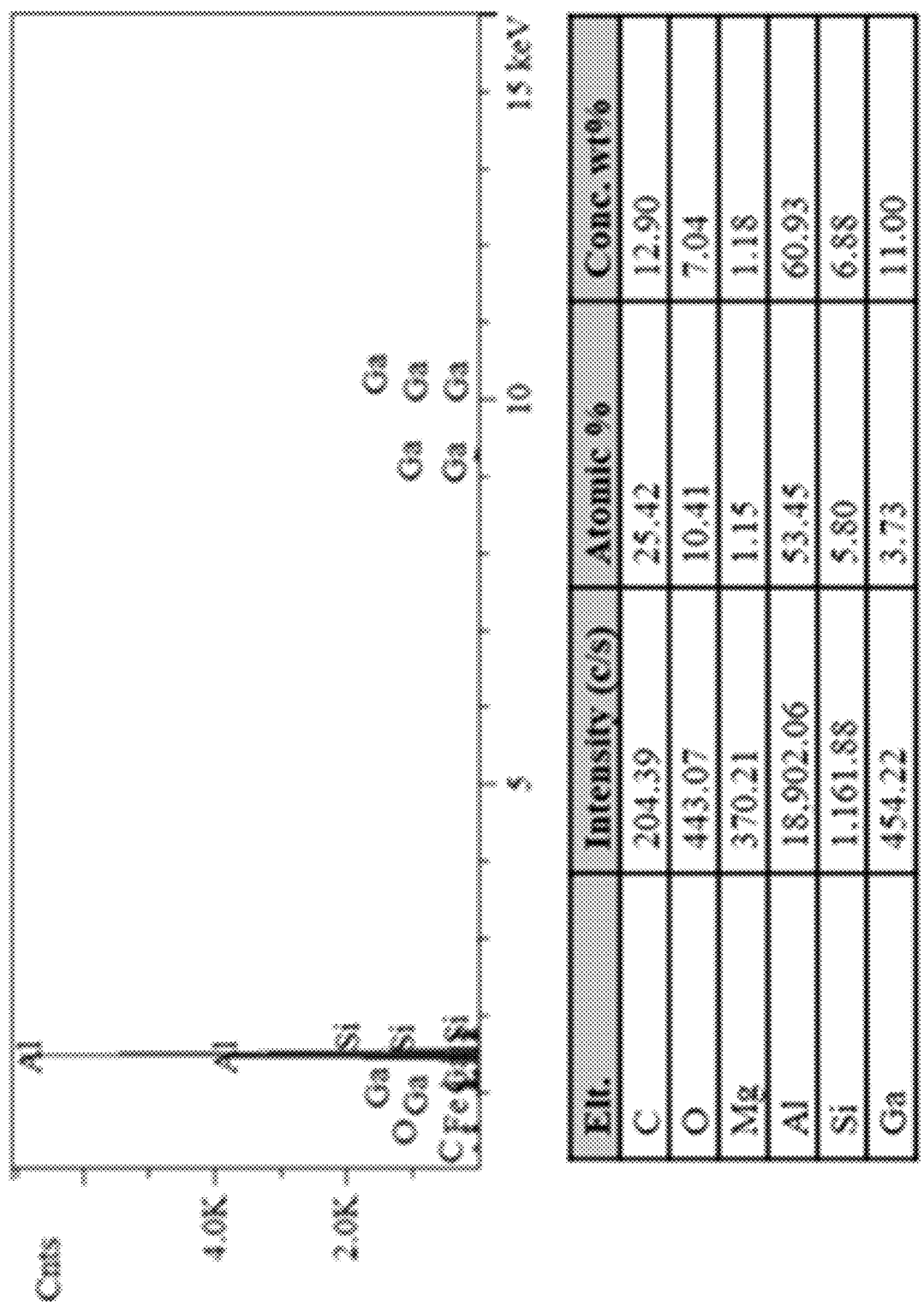
FIG. 17B shows, according to some embodiments, EDS analysis of grain boundary composition of the results of eGaIn-activated Al+Mg,Si at point 2 in FIG. 17A.

Magnesium was found in solution as well as at the grain boundaries, while silicon was primarily concentrated at the grain boundaries forming various intermetallic precipitates such as $Mg_2Si$. An additional SEM and EDS analysis at the grain boundaries of Al+Mg,Si is provided in FIGS. 17A-17B. Near and inside the grain boundaries, Mg—Si—Al—Ga compounds were identified. This could indicate that gallium formed a compound with Al—Mg—Si intermetallics, or that the liquid metal was simply coating the intermetallic. Although silicon forms a eutectic with gallium at 20° C., this occurs at a very small atomic percentage of silicon (1.2 at. %). An example of the compound is indicated by (1) in FIG. 16B, and corresponding composition in FIG. 16C. The more frequent darker regions within the grain boundaries indicated the greater percentage of silicon (~6 wt. %) and lower percentage of Ga (<11 wt. %). Similar to Al+Si and Al+Mg, precipitates were also found on the surface of Al+Mg,Si, which is typical for as-cast aluminum alloys containing Mg and/or Si, as well as Fe impurities.

Figure 16D:
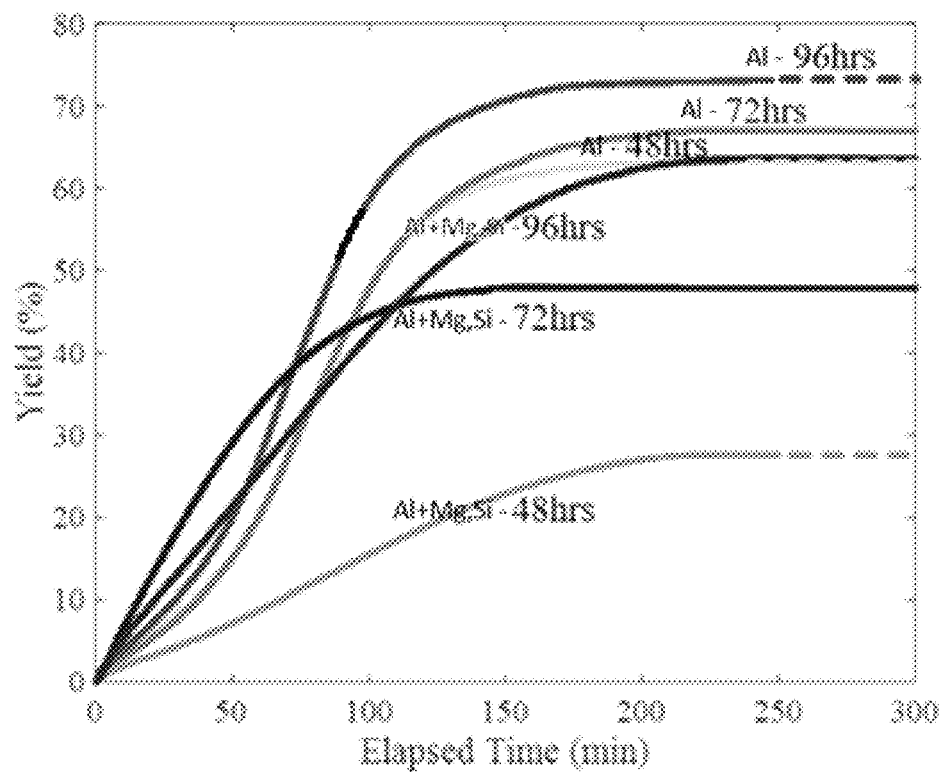
FIG. 16D shows, according to some embodiments, the hydrogen yield of the results of eGaIn-activated Al+Mg,Si.
Figure 16E:
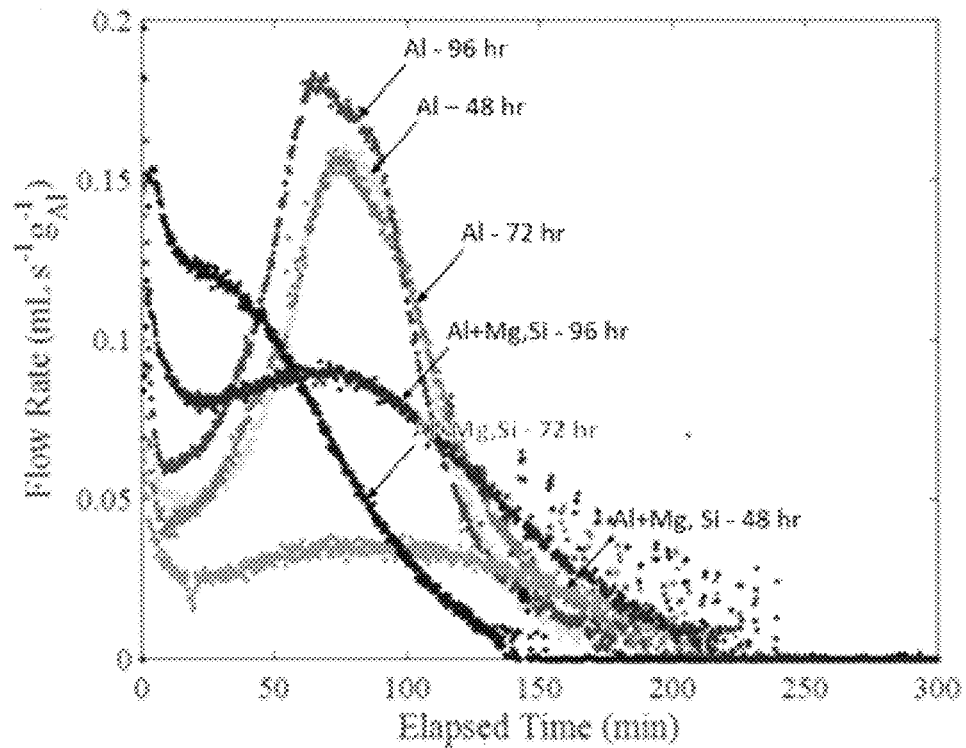
FIG. 16E shows, according to some embodiments, the hydrogen flow rate of the results of eGaIn-activated Al+Mg,Si.
Figure 16F:
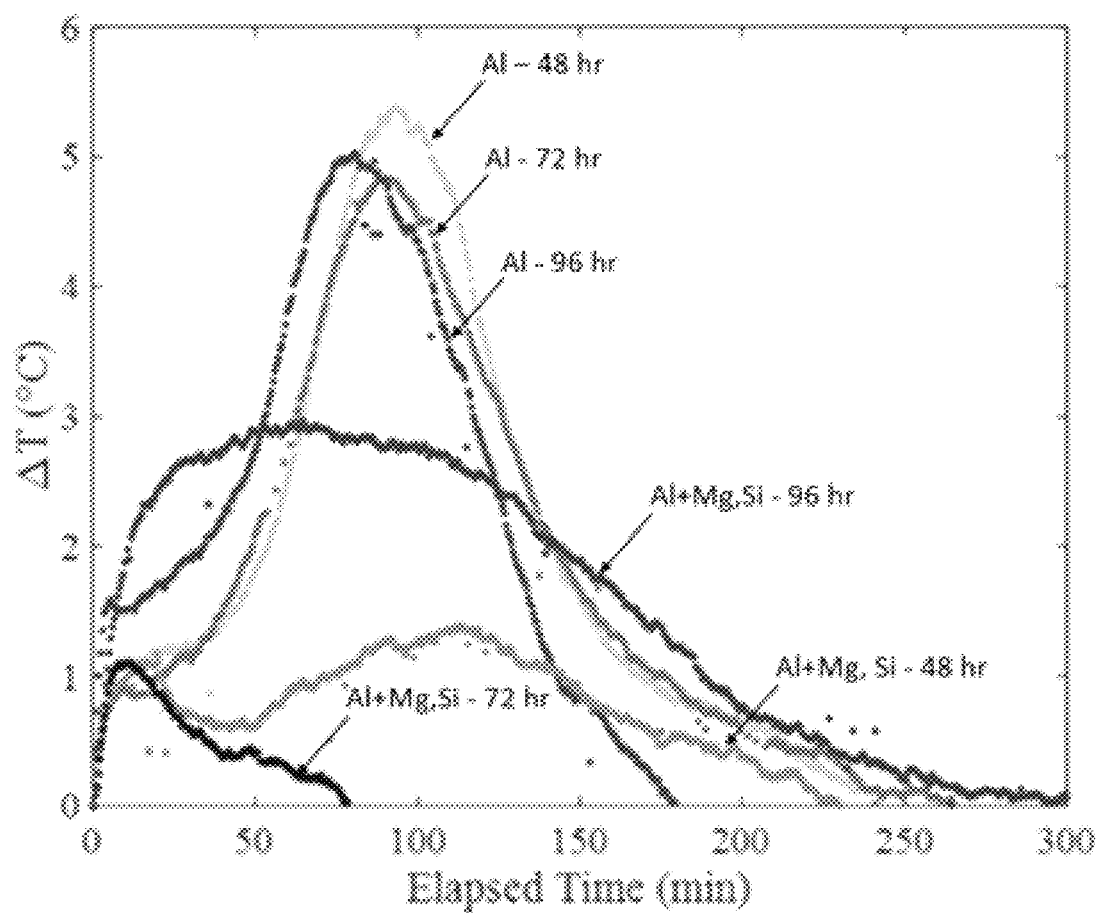
FIG. 16F shows, according to some embodiments, the reaction temperature with respect to time for Al+Mg,Si compared to Al.

Unlike the hydrogen flow rates produced by samples of pure aluminum, Al+Si or Al+Mg, the flow rates produced by samples of Al+Mg,Si were less predictable, as seen in FIG. 16E. Although hydrogen yield after 72 hours of permeation time was less than that after 96 hours of permeation time (FIG. 16D), the hydrogen flow rate for the first 55 minutes of reaction was higher in samples that were permeated for 72 hours by eGaIn. Furthermore, such a peak in flow rate at initiation of the reaction has not been observed in any other activated aluminum samples, nor in literature. Lastly, it is clear from FIGS. 16D-16F that the performance of Al+Mg, Si was most strongly dependent on permeation time of eGaIn. An increase of hydrogen yield by ~36% was noticed between samples permeated by eGaIn for 48 hrs and samples permeated by eGaIn for 96 hrs. This was most likely due to the various grain boundary precipitates found in Al+Mg,Si which, as previously mentioned, form dislocation barriers, hence reducing the permeation rate of the eGaIn dislocation front.

The presence of $Mg_2Si$ precipitates in aluminum increased the susceptibility of the aluminum alloy to various forms of corrosion, such as pitting corrosion or intergranular corrosion. $Mg_2Si$ precipitates are anodic to the aluminum matrix and tend to form micro corrosion cells. When there is an excess of silicon, compared to what is stoichiometrically required for the formation of $Mg_2Si$, silicon segregates to the grain boundaries. The silicon particles may lead to local dissolution of the adjacent aluminum matrix. These factors result in larger corrosion current densities in aluminum 6061 alloys than in commercially pure aluminum or aluminum from the 5xxx series. Yet, when eGaIn was also at the grain boundaries of Al+Mg,Si, lower Al-water reaction rates were observed in Al+Mg,Si than in commercially pure aluminum.

Example 5

The following example describes the effects of doping an aluminum alloy with various alloying metals.

When eGaIn was at the grain boundaries of aluminum, the Al-water reaction may have proceeded differently than expected when compared to the results obtained through corrosion of aluminum without eGaIn. After 96 hours of permeation time, a summary of the samples investigated herein is provided in FIGS. 18A-18C. From FIG. 18A, the sample containing 0.6% Si generated more hydrogen per unit weight of aluminum than other samples. A significantly higher peak in volumetric flow rate was also achieved by Al+Si, as well as a reduced reaction duration (FIG. 18B). With similar experimental methods in the activation process, an increased reaction rate in Al—Si samples was observed in previous work (11.04 wt. %). A significant increase in extent of and rate of the oxidation-reduction reaction was observed in Si-doped aluminum containing eGaIn.

Figure 18A:
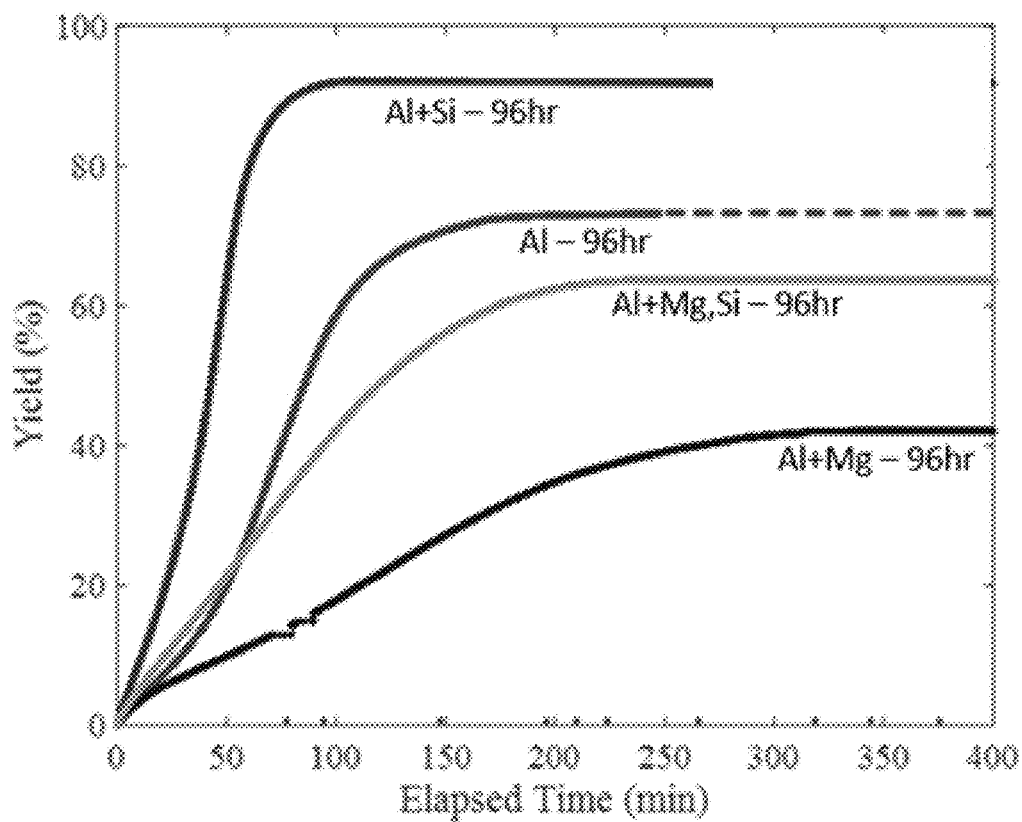
FIG. 18A shows, according to some embodiments, the comparison of hydrogen yield between tested compositions following 96 hours of permeation time.
Figure 18B:
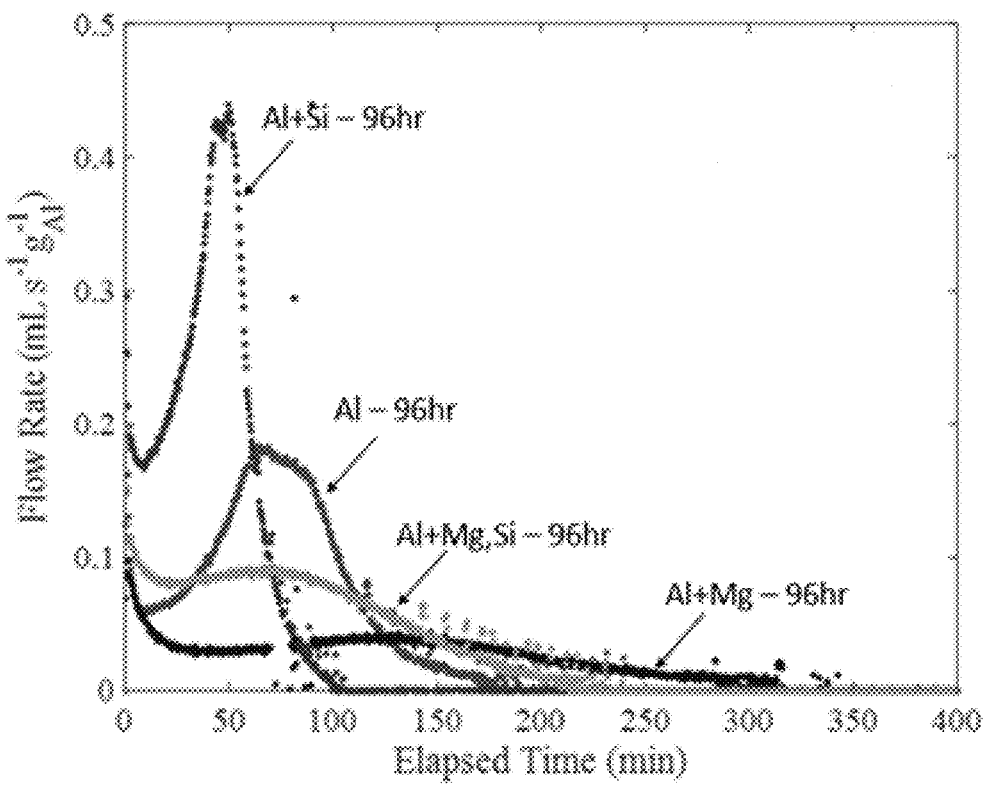
FIG. 18B shows, according to some embodiments, the comparison of hydrogen volumetric flow rate between tested compositions following 96 hours of permeation time.
Figure 18C:
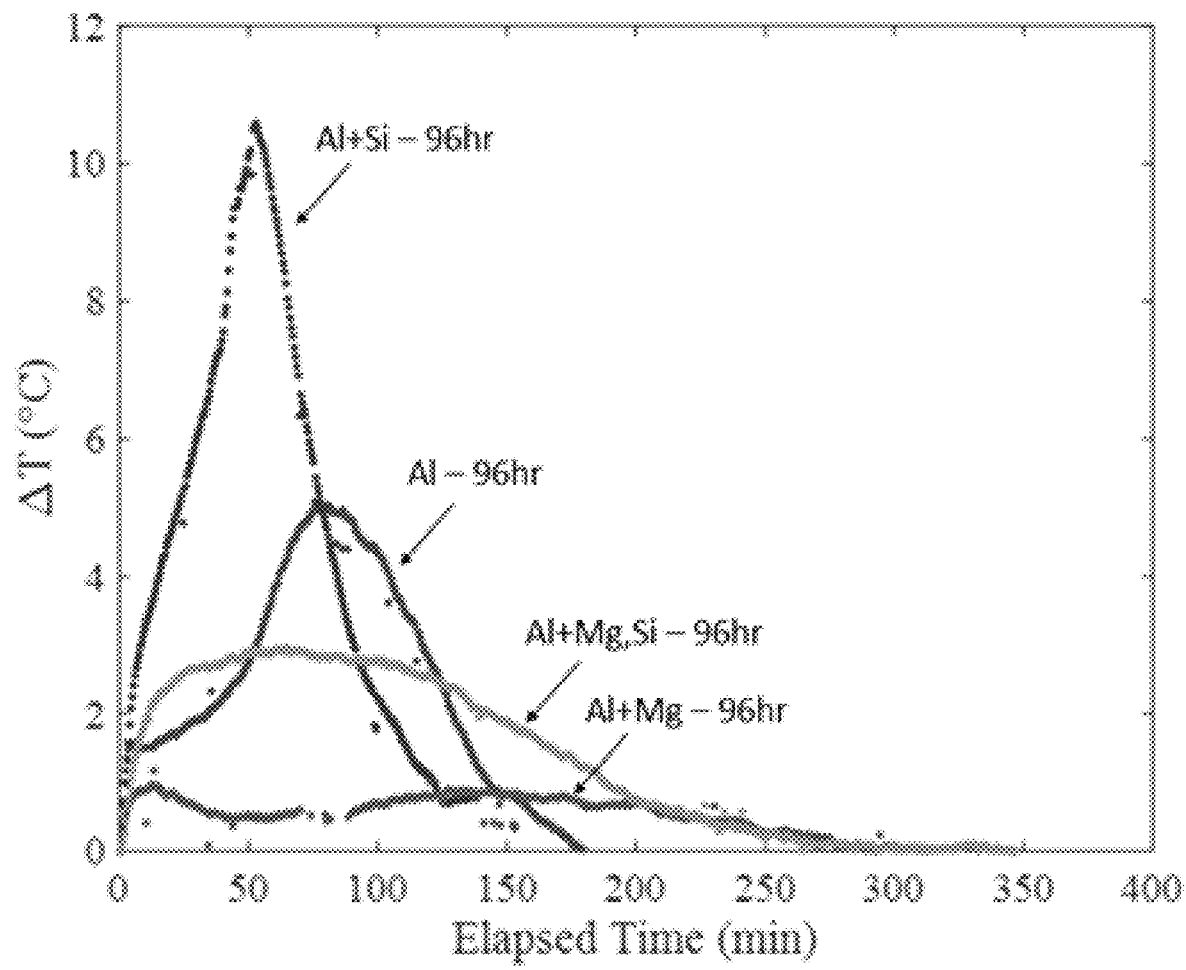
FIG. 18C shows, according to some embodiments, the comparison of reaction temperature between tested compositions following 96 hours of permeation time.

Magnesium had a significantly retarding effect on the overall aluminum-water reaction when eGaIn was at the grain boundaries (FIGS. 18A-18C). Of the four compositions, Al+Mg produced the least amount of hydrogen and had the lowest hydrogen flow rates. Additionally, the reaction temperature was close to room temperature throughout the entirety of the reaction. This seemed to indicate that magnesium's reduction of aluminum's cathodic activity was more pronounced when there was eGaIn at the aluminum grain boundaries, compared to general corrosion of aluminum. Susceptibility to corrosion in Mg-doped aluminum without eGaIn was typically only slightly lower than pure aluminum, noticeably in alkaline environments.

The most significant dependency of the aluminum-water reaction on permeation time was observed in aluminum doped with both magnesium and silicon. After 96 hours of permeation time, Al+Mg,Si produced more hydrogen than produced by Al+Mg, and less than that produced by Al or Al+Si. Due to the identified intermetallic precipitates (e.g., $Mg_2Si$) at the grain boundaries of Al+Mg,Si, reaction rates were expected to be higher in Al+Mg,Si than in aluminum if the pure corrosion framework were applicable here. A separate factor that may have affected the reaction rates is the nonuniformity of eGaIn at the grain boundaries in Al+Mg,Si.

Example 6

The following example describes the materials and methods used to manufacture and evaluate the compositions described in Examples 7-9.

Figure 19A:
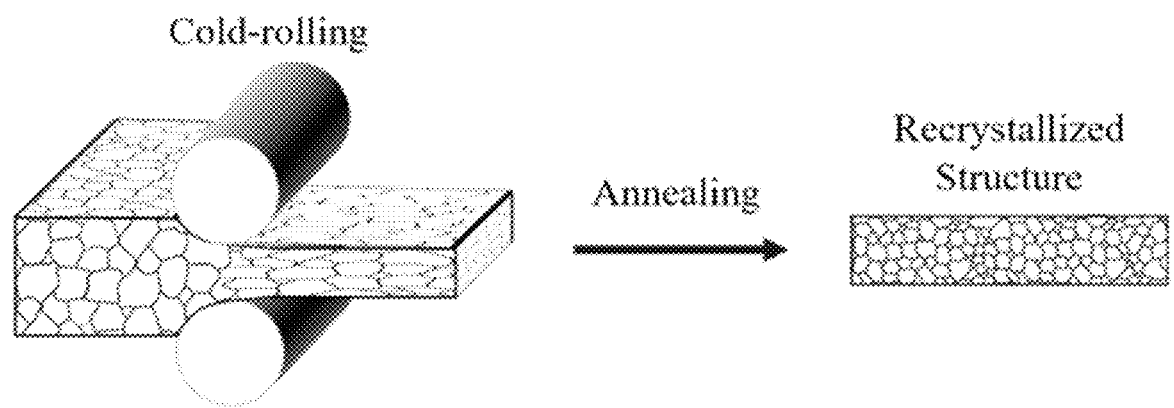
FIG. 19A shows, according to some embodiments, the experimental method of cold-rolling and heat treatment for grain size reductions.

Samples were custom-made by Novelis Inc. in their Spokane Research Center. Commercially pure aluminum was used as the base alloy, having very low percentages of impurities. The composition of the samples is provided in Table 1. To reduce grain size, cold-rolling was performed to various degrees on as-cast aluminum and as-cast doped aluminum. Ingots began as 25.4 mm (1 in.) in thickness, comprised of the largest grains tested. Ingots were also cold-rolled by 50% reduction increments in thickness, resulting in sheets of 12.7 mm and 3.17 mm thickness. Following cold-rolling, all samples were annealed at 400° C. for 2 hours, with a 50° C./hr ramp rate. Annealing was performed to minimize internal stresses that were imposed during the cold work process. The second stage of annealing was recrystallization, during which new, unstrained grains grew until the material was quenched or grains impinged upon one another. A depiction of the microstructural transformation in the cold-rolling and annealing process is provided in FIG. 19A.

Transient hydrogen generation rates were measured using the experimental setup described above.

An additional thermocouple was placed in the flask filled with deionized water above the water line. The temperature $T_x$ was the temperature of a gas mixture composed of hydrogen and water vapor. Using the combined gas law and Dalton's law of partial pressures, the mass of displaced water was converted to volume of generated hydrogen ($V_{H_2}$) through $$V_{H_2}(t) = m(t)\rho_w \frac{[p_{atm} - p_v]T_{STP}}{T_x(t)P_{STP}}$$

where $\rho_w$ was the density of water, $p_{atm}$ was atmospheric pressure, $p_v$ was the vapor pressure of water at temperature $T_x$, and $T_{STP}$ and $P_{STP}$ were the temperature and pressure at standard conditions, respectively. Hydrogen flow rates were determined by differentiating $V_{H_2}(t)$ with respect to time.

Sample microstructure images were collecting using Scanning Electron Microscopy (SEM) in backscattered electron mode. In conjunction with SEM, chemical analyses of the microstructures were performed through energy dispersive x-ray spectroscopy. Samples were imaged after 48 hrs to 96 hrs of eGaIn permeation. In aluminum and aluminum alloys, distinguishing between grains and sub-grains was difficult. Therefore, the average distance between grain boundaries (including subboundaries), d, was used to describe the microstructure. To estimate the rate of hydrogen generation per unit surface area (hydrogen flux), the surface area was taken as that of a sphere with diameter equal to the average distance between grain boundaries.

Example 7

The following example describes the effects of grain size on the permeation of the eutectic composition through an aluminum alloy.

TABLE 1

Composition (in wt. %) of aluminum samples

| | Al | Si | Mg | Fe | Cu | Mn | Cr | Zn | Ti | Na | Ca |
|---|---|---|---|---|---|---|---|---|---|---|---|
| Al | ~99.7 | 0.08 ± 0.02 | 0.005 | 0.20 ± 0.02 | 0.005 | 0.005 | 0.005 | 0.005 | 0.005 | 0.005 | 0.005 |
| $AlMg_1$ | ~98.7 | 0.08 ± 0.02 | 1.00 ± 0.02 | | | | | | | | |
| $AlSi_{0.6}$ | ~99.2 | 0.60 ± 0.02 | 0.005 | | | | | | | | |
| $AlMg_1Si_{0.6}$ | ~98.2 | 0.60 ± 0.02 | 1.00 ± 0.02 | | | | | | | | |

Figure 19B:
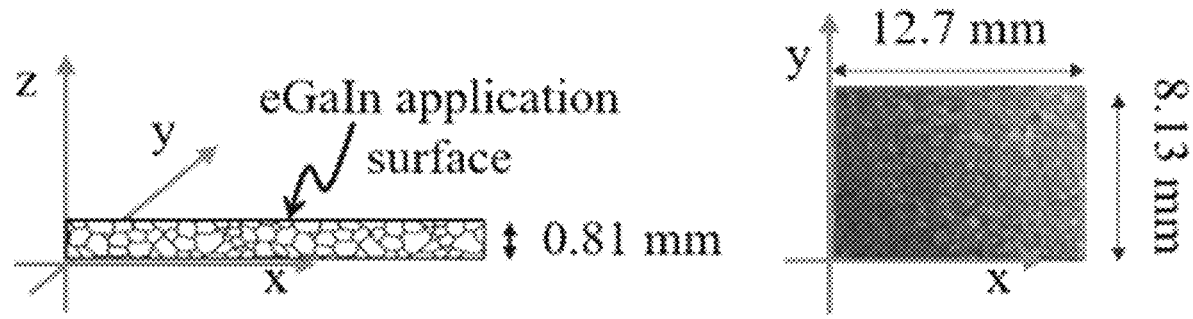
FIG. 19B shows, according to some embodiments, the experimental method of eGaIn application to a sample surface.
Figure 20A:
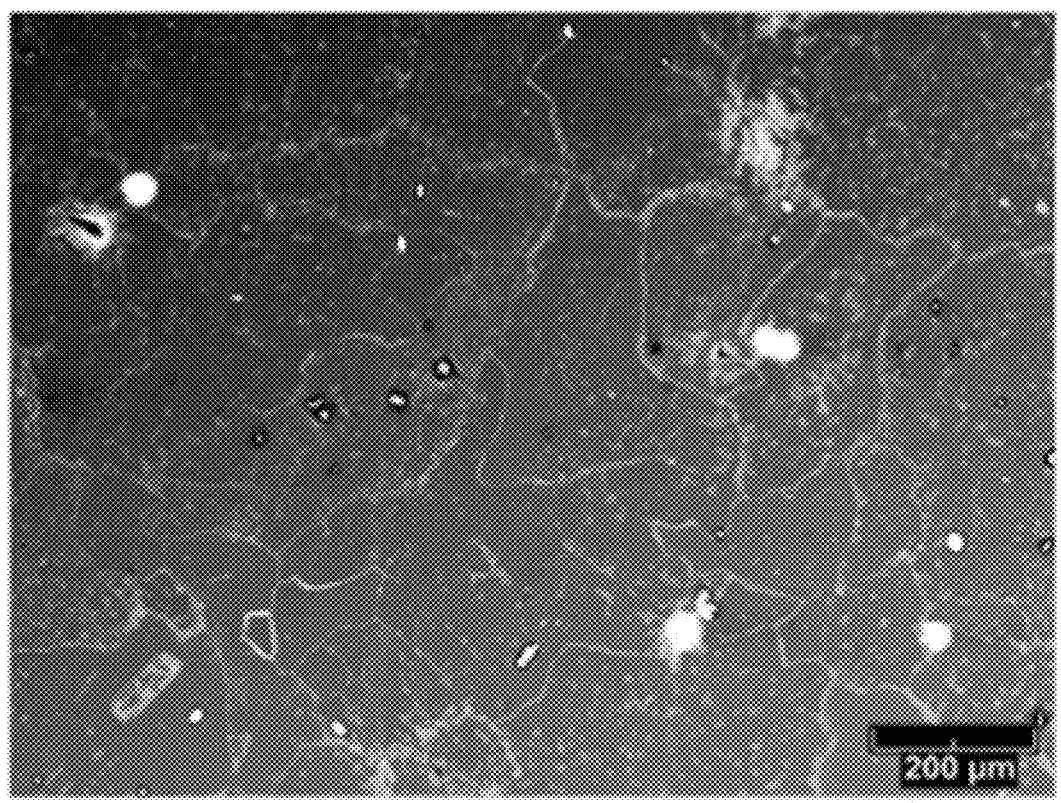
FIGS. 20A-20C show, according to some embodiments, microstructural imaging and analyses of as-cast commercially pure aluminum.
Figure 20B:
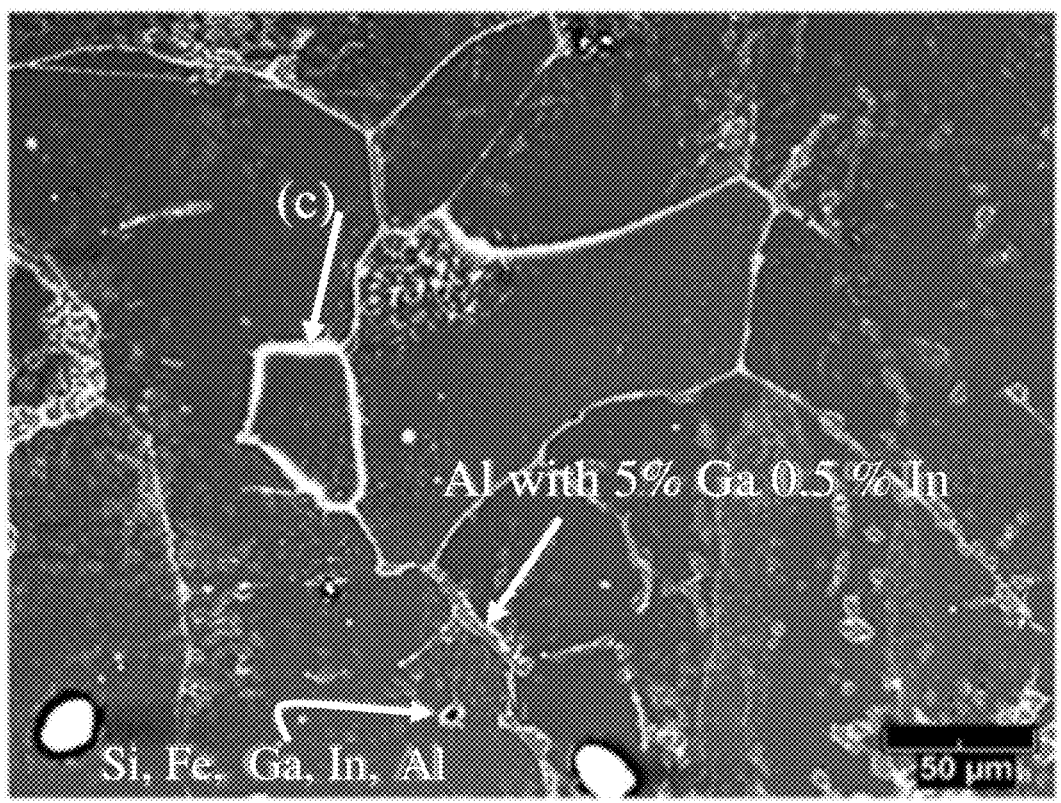
Figure 20C:
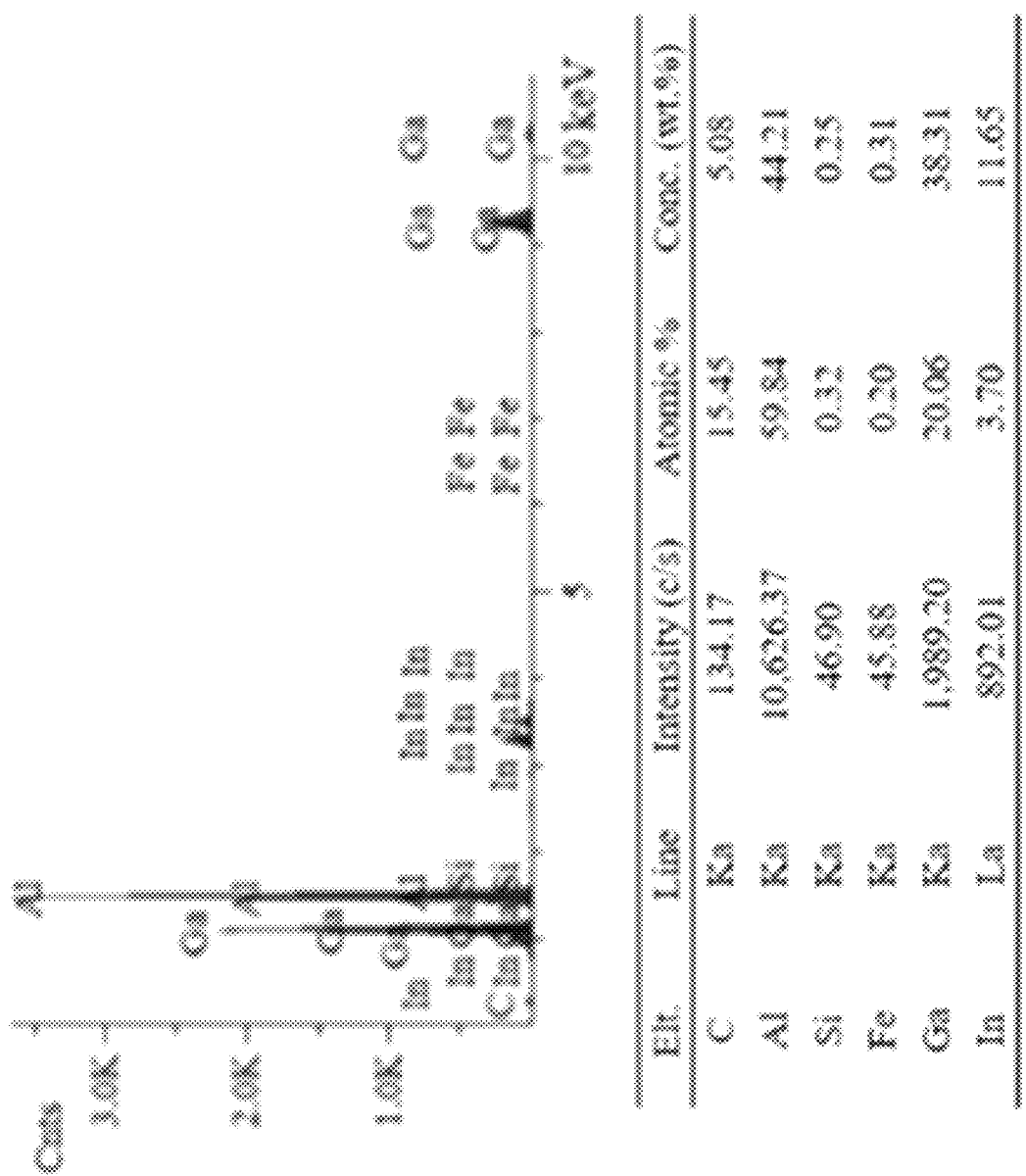
Figure 20D:
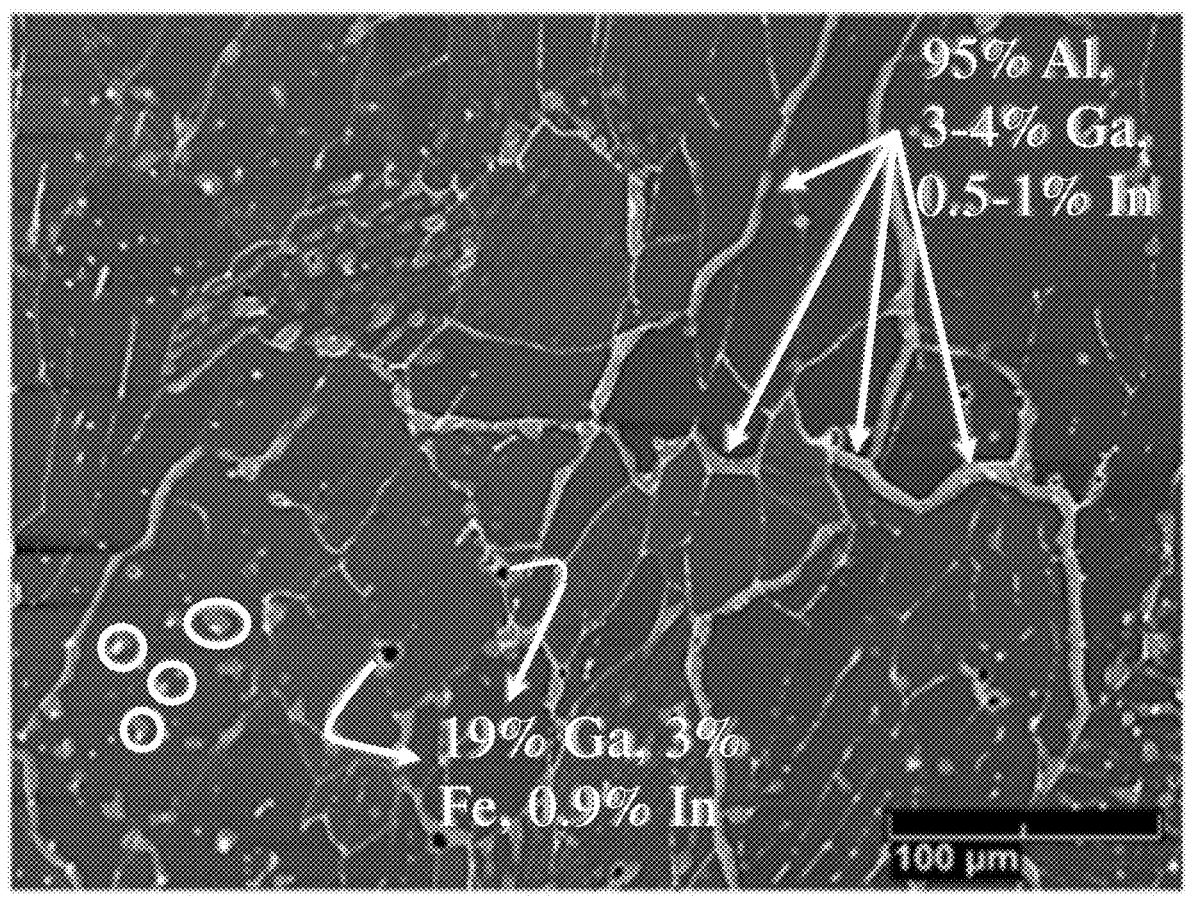
FIG. 20D shows, according to some embodiments, microstructural imaging and analysis of half roll aluminum.
Figure 20E:
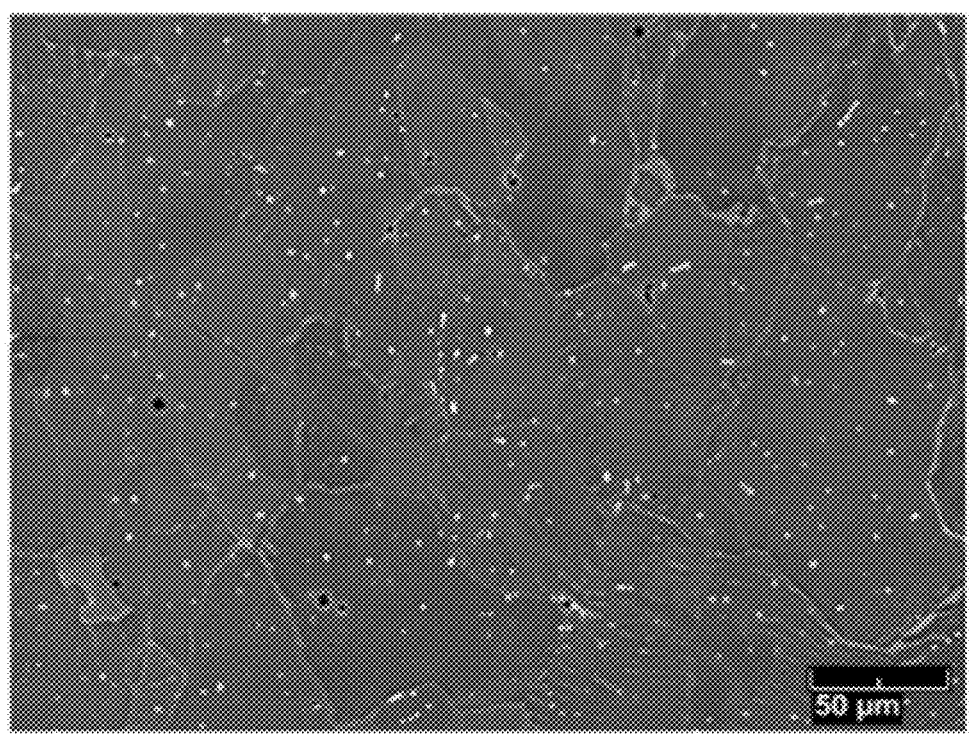
FIGS. 20E-20F show, according to some embodiments, microstructural analyses of commercially pure aluminum $1/8^{th}$ rolled condition.
Figure 20F:
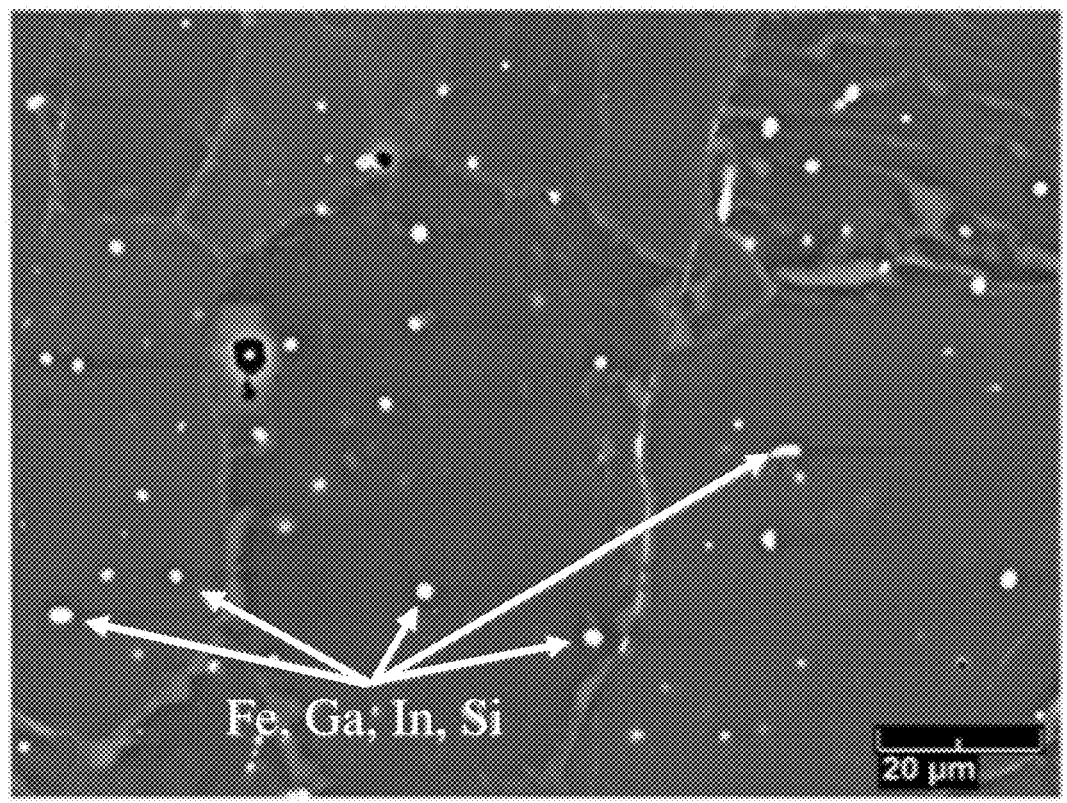
Figure 20G:
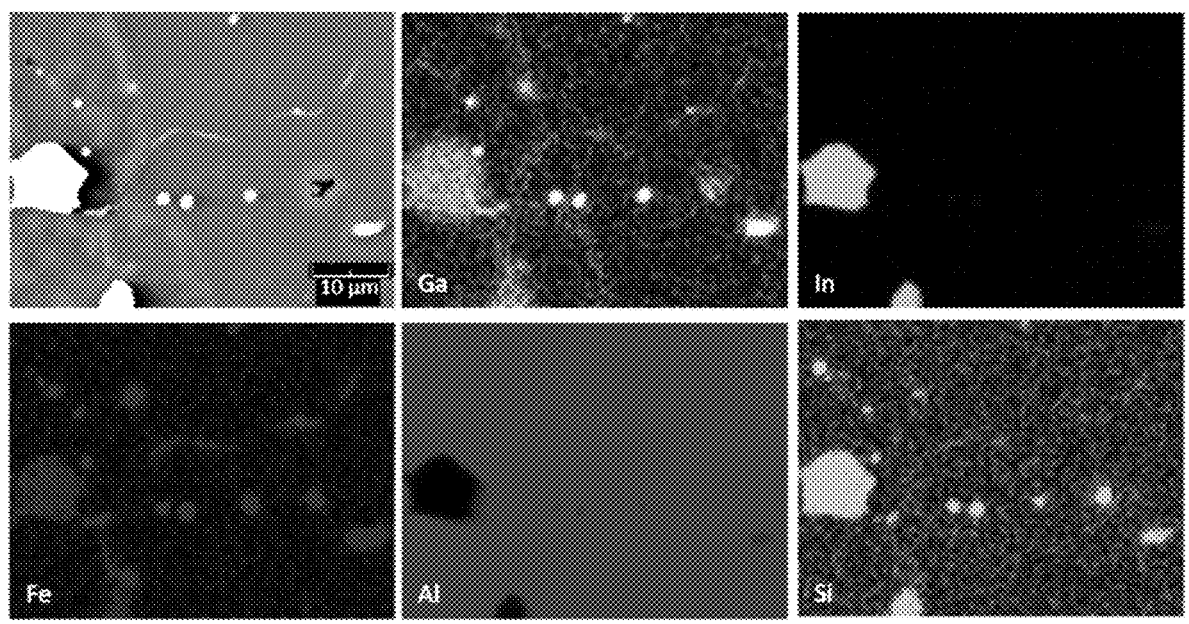
FIG. 20G shows, according to some embodiments, an x-ray overlay, in which Si and iron are present in less than 0.2 wt. % in indium conglomerates and in solution.

Individual samples were cut using a waterjet from ingots and annealed cold-rolled sheets. The sample thickness (in z-direction of FIG. 19B) across compositions and processing states was 0.81±0.025 mm. A constant sample thickness across sample compositions and mechanical processing treatments was necessary to accurately compare eGaIn permeation rates with respect to grain size. Additionally, sample surface area (x-y-dimensions) was held constant at 4 $mm^2$. An example of sample dimensions is provided in FIG. 19B for commercially pure aluminum that underwent 50% reduction, resulting in a sample length of 12.7 mm.

The process of depassivating aluminum with eGaIn consisted of applying 5 wt. % eGaIn to the aluminum alloy sample surface at 100° C. Elevated temperatures reduced the surface tension and cohesive forces of eGaIn, allowing the liquid metal to be spread across the sample surface using a glass applicator. Samples were kept on a hot plate at 100° C. for a total of 2 hours, then transferred to a desiccant chamber until tested.

The permeation of gallium through aluminum grain boundaries can be modeled as a line dislocation front. Driven by a reduction in interfacial energy, gallium penetrates aluminum grain boundaries and, in some cases, subboundaries. As the gallium permeates through the grain boundary, monolayer(s) of gallium remain locally, the thickness of which depends on grain boundary angle. It has also been shown that eGaIn also permeates through aluminum grain boundaries as a line dislocation front and that doping elements can affect the permeation of eGaIn through aluminum grain boundaries in as-cast microstructures. Similar to the permeation of gallium through aluminum, it was found that the speed at which eGaIn permeates through aluminum grain boundaries is a function of grain boundary chemistry, stress state and grain boundary structure.

Figure 21A:
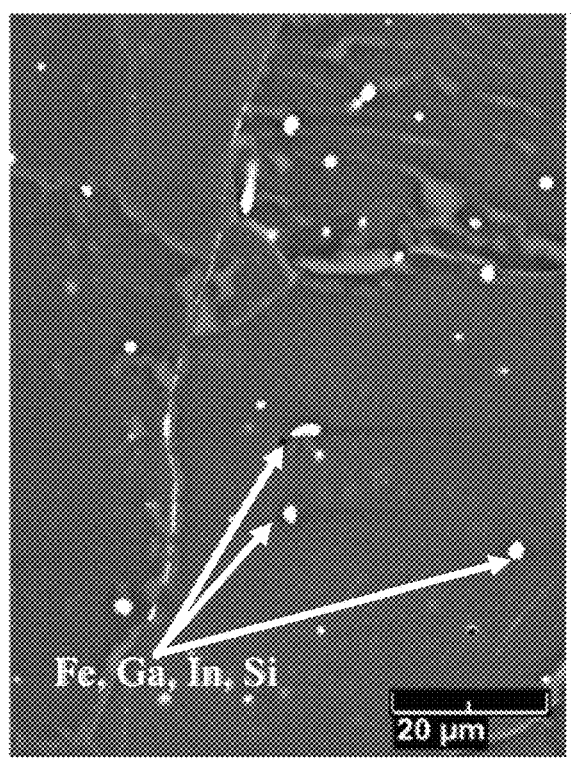
FIG. 21A shows, according to some embodiments, the effects of small grain size on eGaIn permeation in commercially pure aluminum.
Figure 21B:
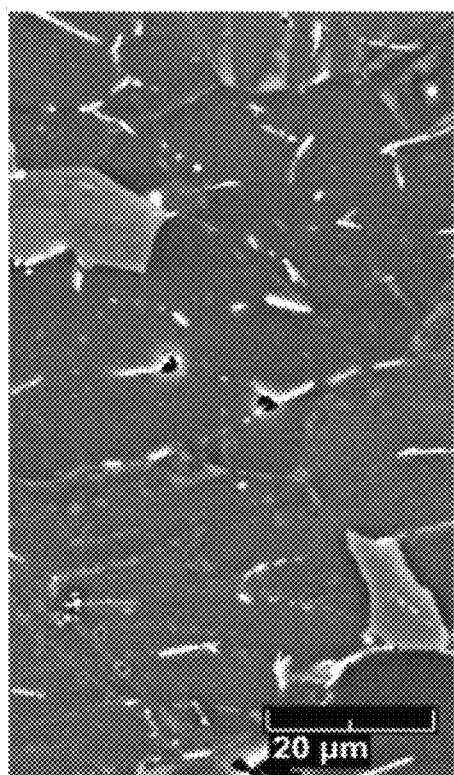
FIGS. 21B-21C show, according to some embodiments, the effects of small grain size on eGaIn permeation in 0.6 wt. % Si-doped aluminum.
Figure 21C:
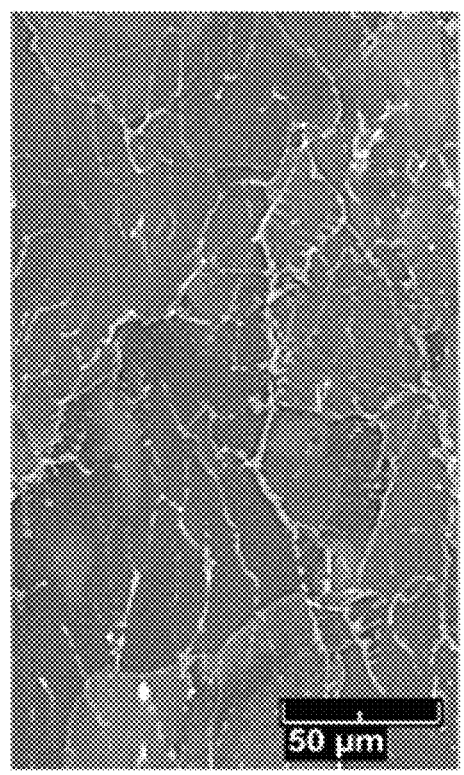

As such, grain size was expected to affect the time it takes for eGaIn to permeate through the grain boundary network. Grain boundary precipitate density also varies with grain size, further affecting the permeation of eGaIn. Microchemical analyses of samples were performed after 96 hours of permeation time for each composition and grain size distribution. In as-cast commercially pure aluminum, precipitates composed of silicon, iron, gallium, indium and aluminum were identified, though the precipitate density was relatively low compared to that in samples that were processed to reduce grain size (see FIGS. 20A-20G). The microstructure of as-cast aluminum had an average d of 140 micrometers and had grain boundaries that were primarily comprised of aluminum nanoparticles embedded in 3-5 wt. % gallium and 0.5-1 wt. % indium. As grain size decreased in aluminum from d of 140 micrometers to d of 52 micrometers and 39 micrometers (due to the cold-rolling and recrystallization process), increasing amounts of iron had segregated to the grain boundaries and created surface precipitates such as $AlFe_3$. This was most noticeable aluminum with a d of 39 micrometers, as shown in FIG. 21A. Similar to commercially pure aluminum, the density of iron precipitates also increased with decreasing grain size in $AlSi_{0.6}$ (see FIGS. 22A-22F). In as-cast $AlSi_{0.6}$ (d=150 micrometers), the grain boundary contained at most 0.3 wt. % silicon. As grain/subgrain size decreased to 47 micrometers on average, the percentage of iron, silicon, gallium and indium increased at the grain boundaries. Further reduction to d of 34 micrometers led to less uniform coating of some grain boundaries with eGaIn in $AlSi_{0.6}$, as shown in FIG. 21B, while much of the microstructure appeared more uniformly coated as shown in FIG. 21C. Additional imaging of the $AlSi_{0.6}$ microstructure is provided in FIGS. 22A-22F and FIGS. 23A-23D.

The effects of permeation time on hydrogen generation rates were investigated by reacting aluminum and doped aluminum with water following 48 hours, 72 hours and 96 hours of eGaIn surface application. Previously, permeation time was shown to affect hydrogen generation in as-cast aluminum alloys and permeation time mostly affected the final reaction efficiency achieved rather reaction rates. Here, it was found that as the distance between grain boundaries decreased in aluminum and Si-doped aluminum, permeation time began to affect hydrogen flow rates rather reaction efficiencies. This was most notably observed in microstructures with an average grain/subgrain size of less than 40 μm, shown in FIG. 21D for aluminum and FIG. 21E for Si-doped aluminum.

Figure 21D:
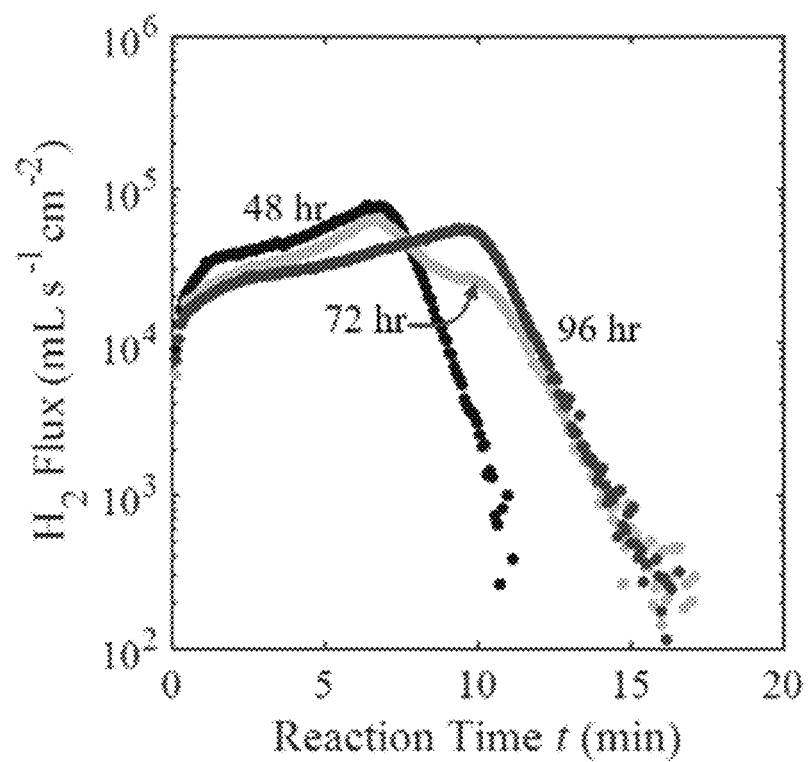
FIG. 21D shows, according to some embodiments, the effects of permeation time on hydrogen flux in aluminum shown in FIG. 21A.
Figure 21E:
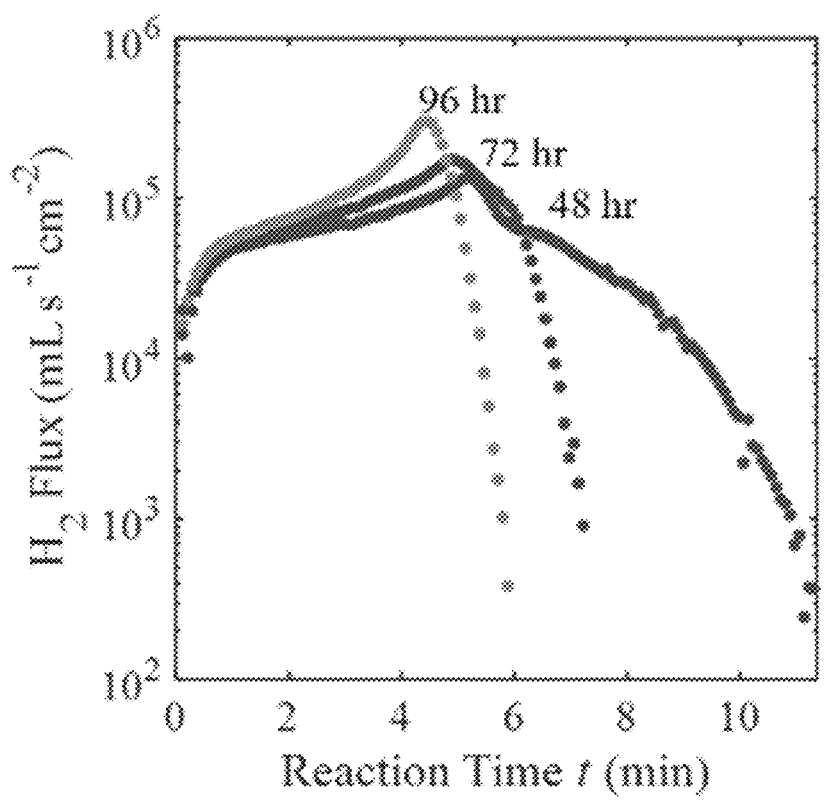
FIG. 21E shows, according to some embodiments, the effects of permeation time on hydrogen flux in Si-doped aluminum shown in FIGS. 21B-21C.
Figure 22A:
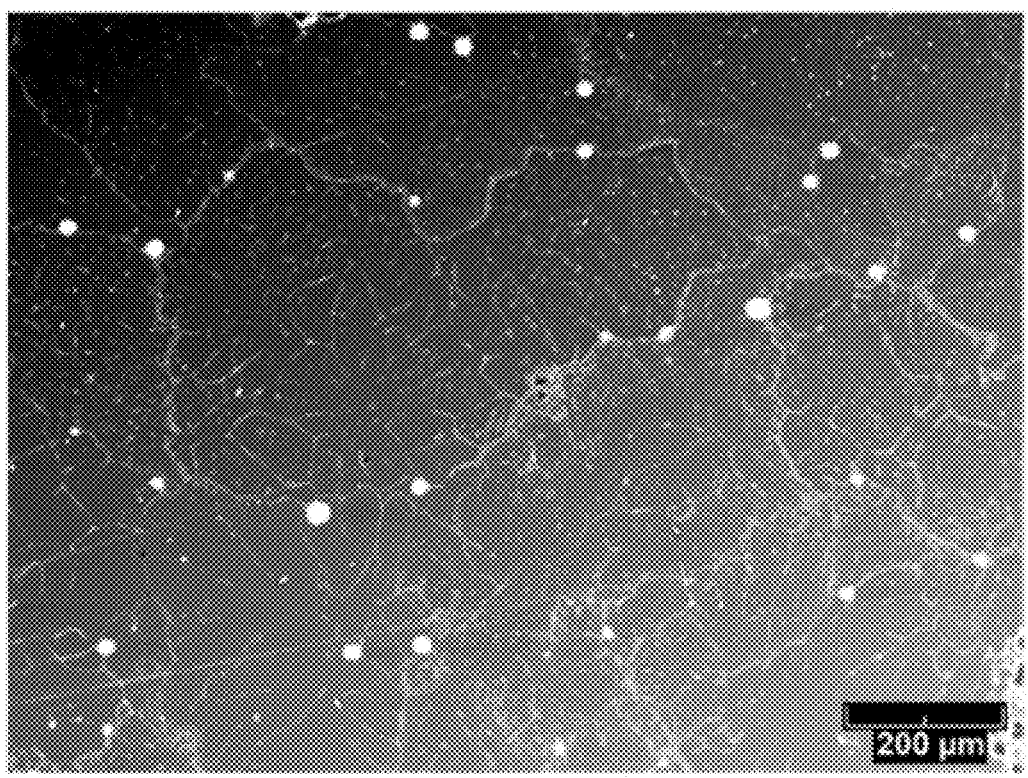
FIGS. 22A-22C show, according to some embodiments, microstructural analyses of as cast $AlSi_{0.6}$.
Figure 22B:
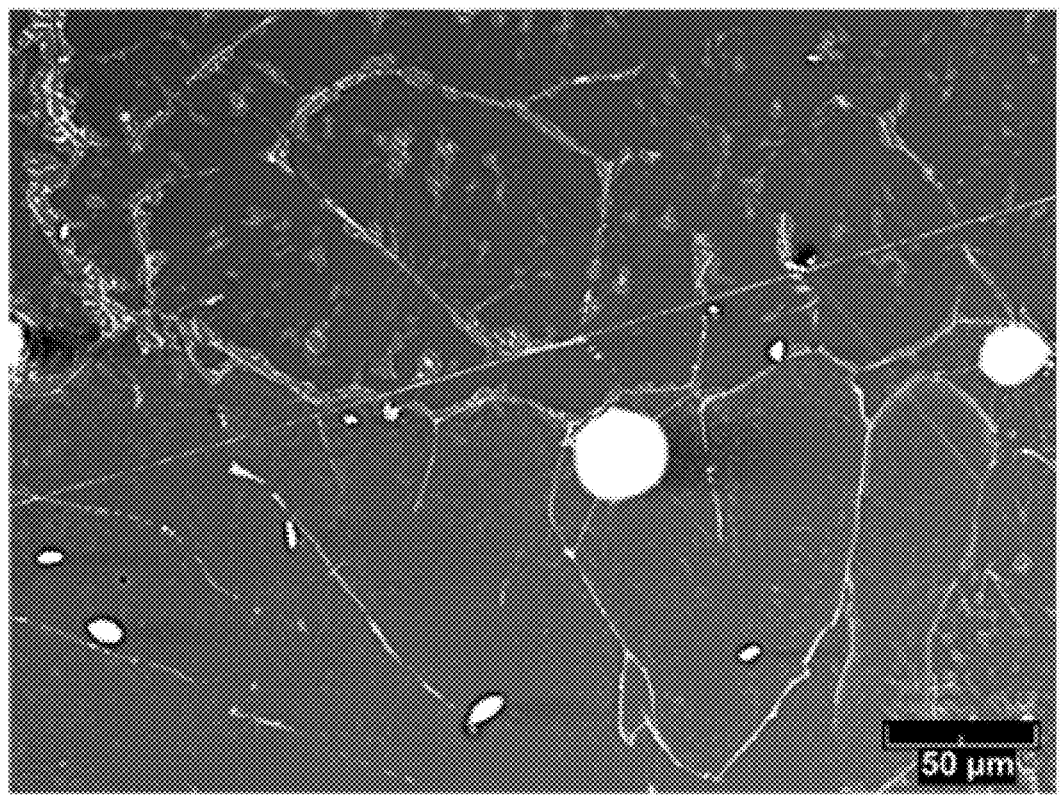
Figure 22C:
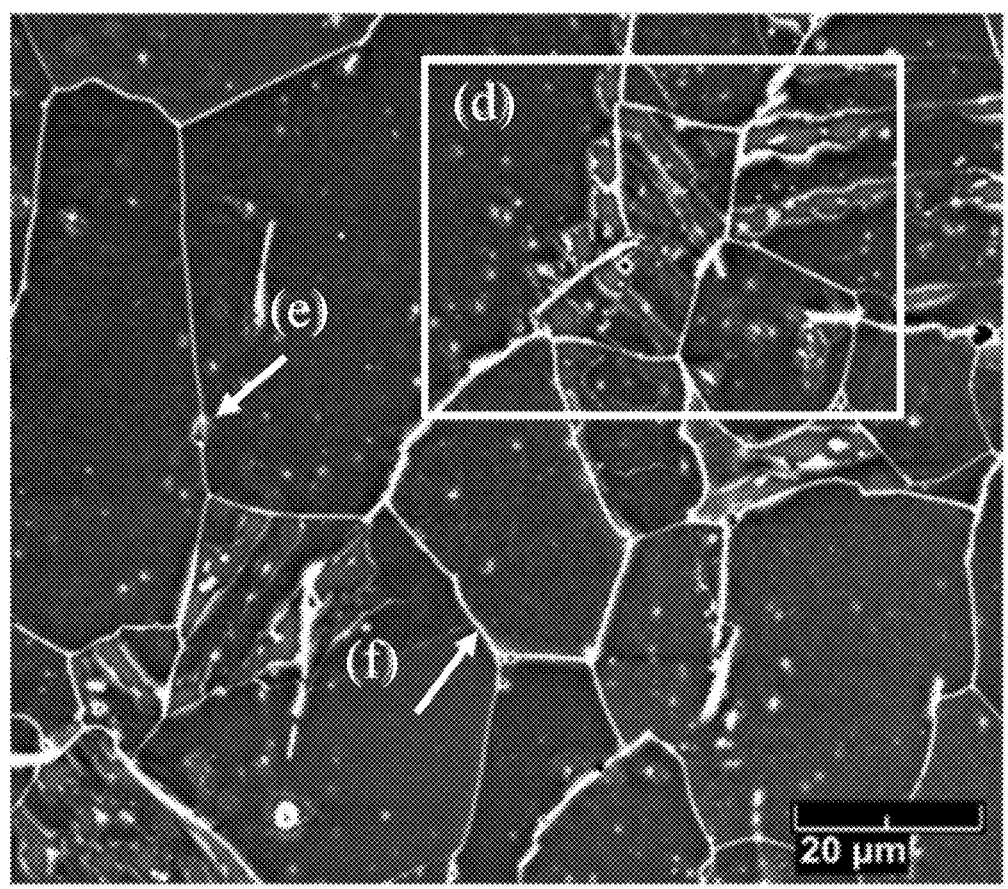
Figure 22D:
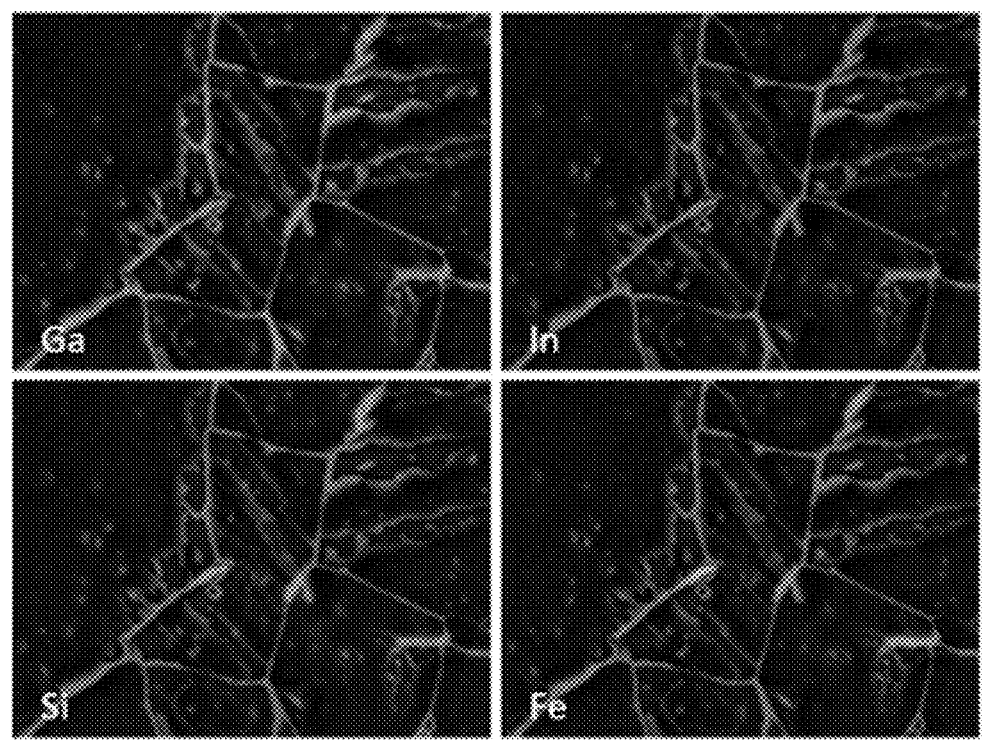
FIG. 22D shows, according to some embodiments, an x-ray overall of element intensities for a section of the SEM in FIG. 22C.
Figure 22E:
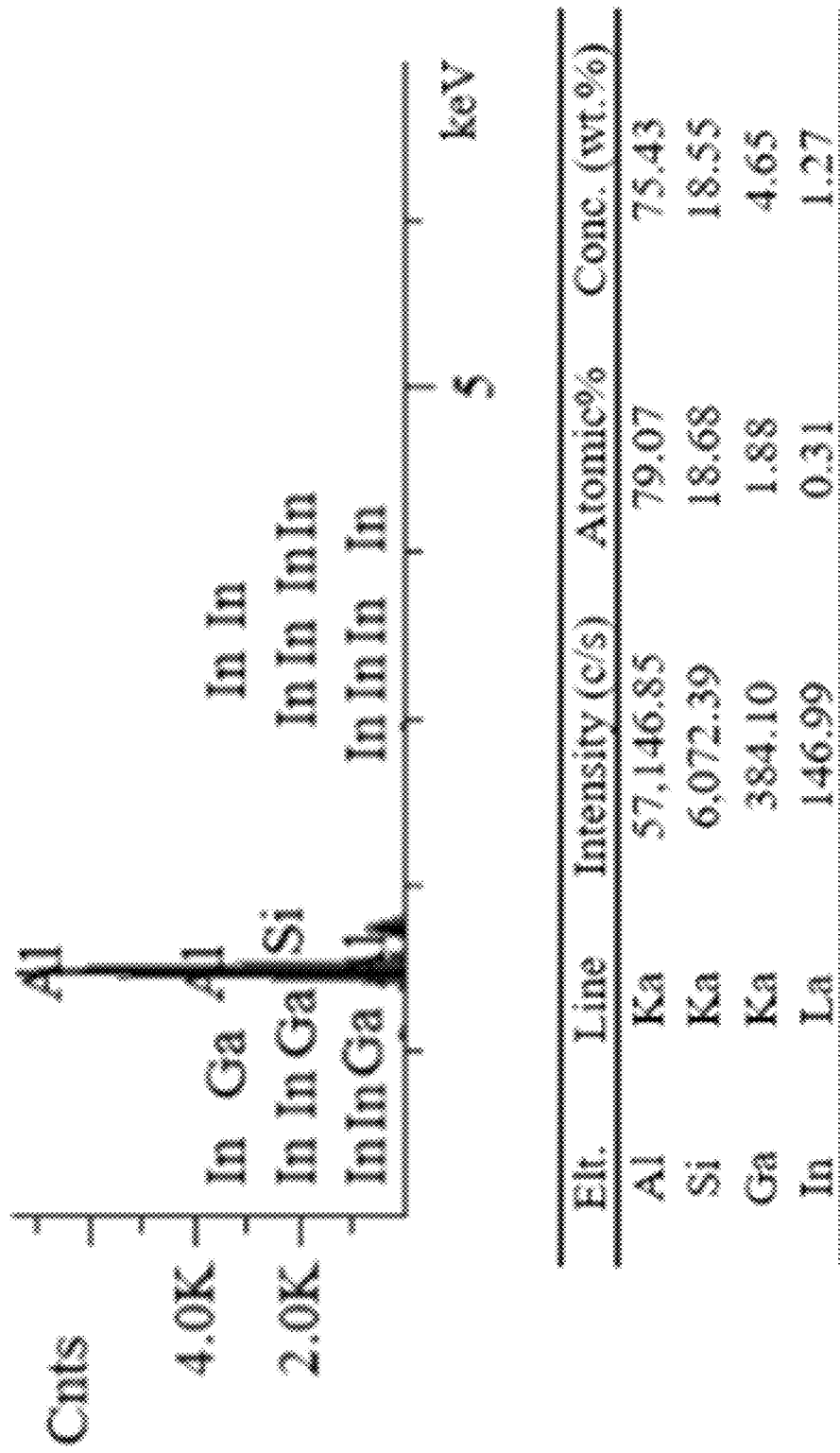
FIG. 22E shows, according to some embodiments, the elemental analysis of point e in FIG. 22C.
Figure 22F:
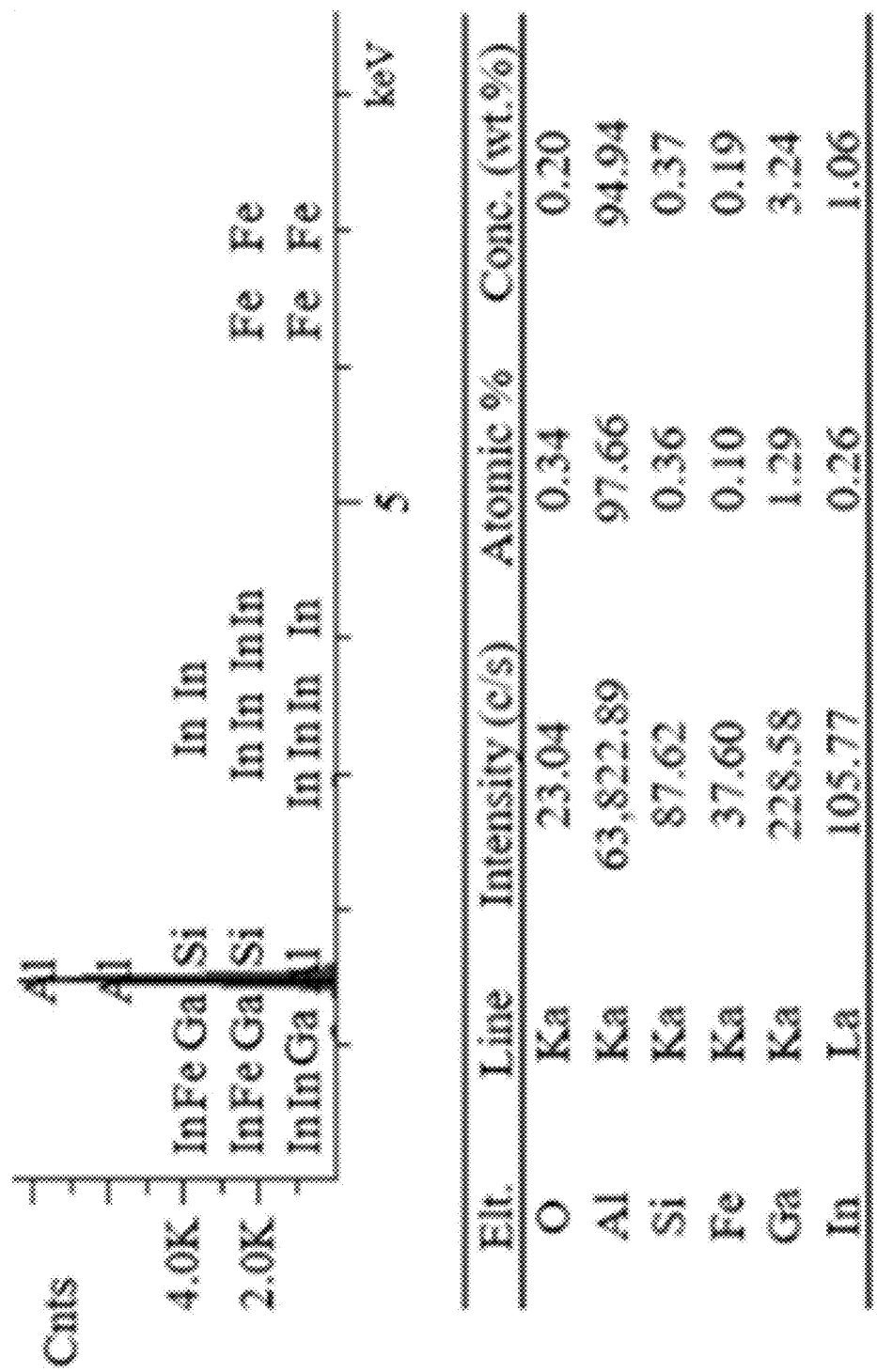
FIG. 22F shows, according to some embodiments, the elemental analysis of point f in FIG. 22C.
Figure 23A:
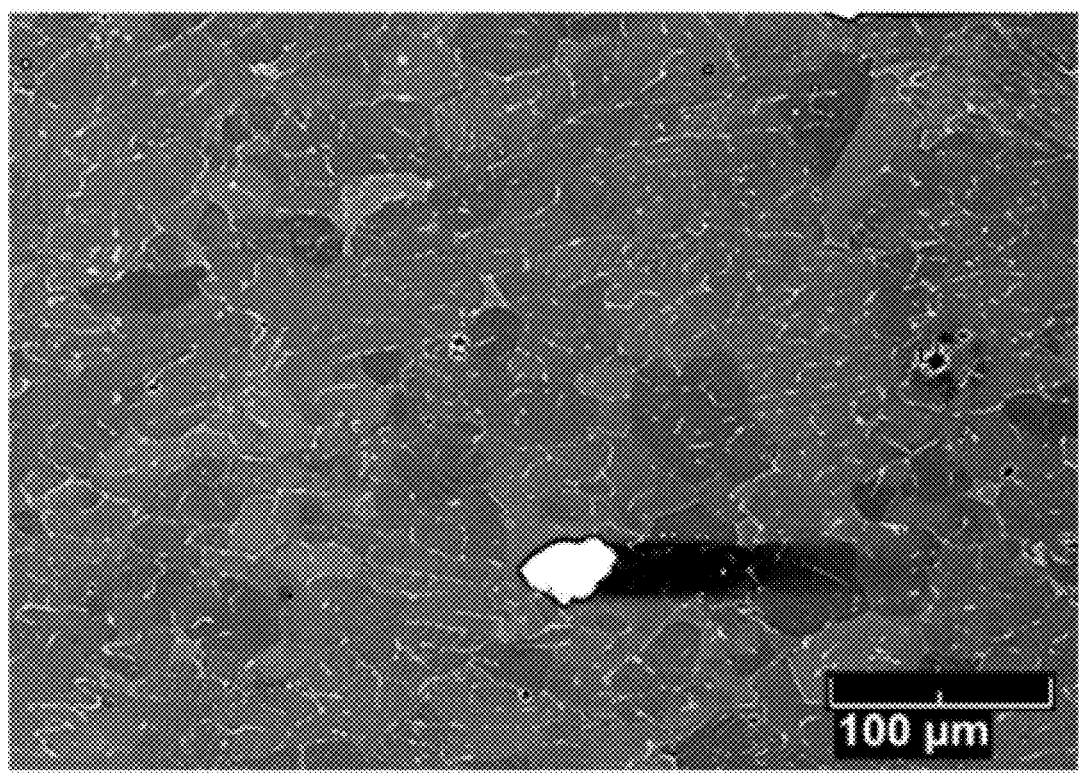
FIGS. 23A-23C show, according to some embodiments, microstructural analyses of Al+Si.
Figure 23B:
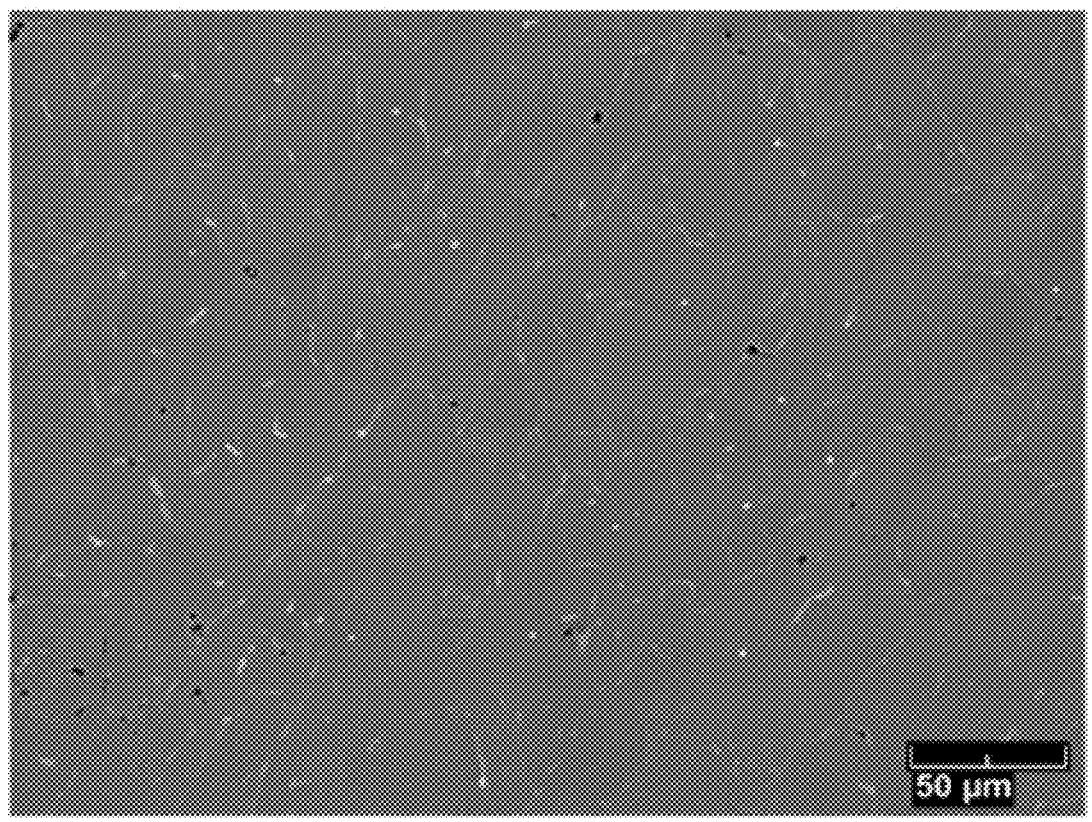
Figure 23C:
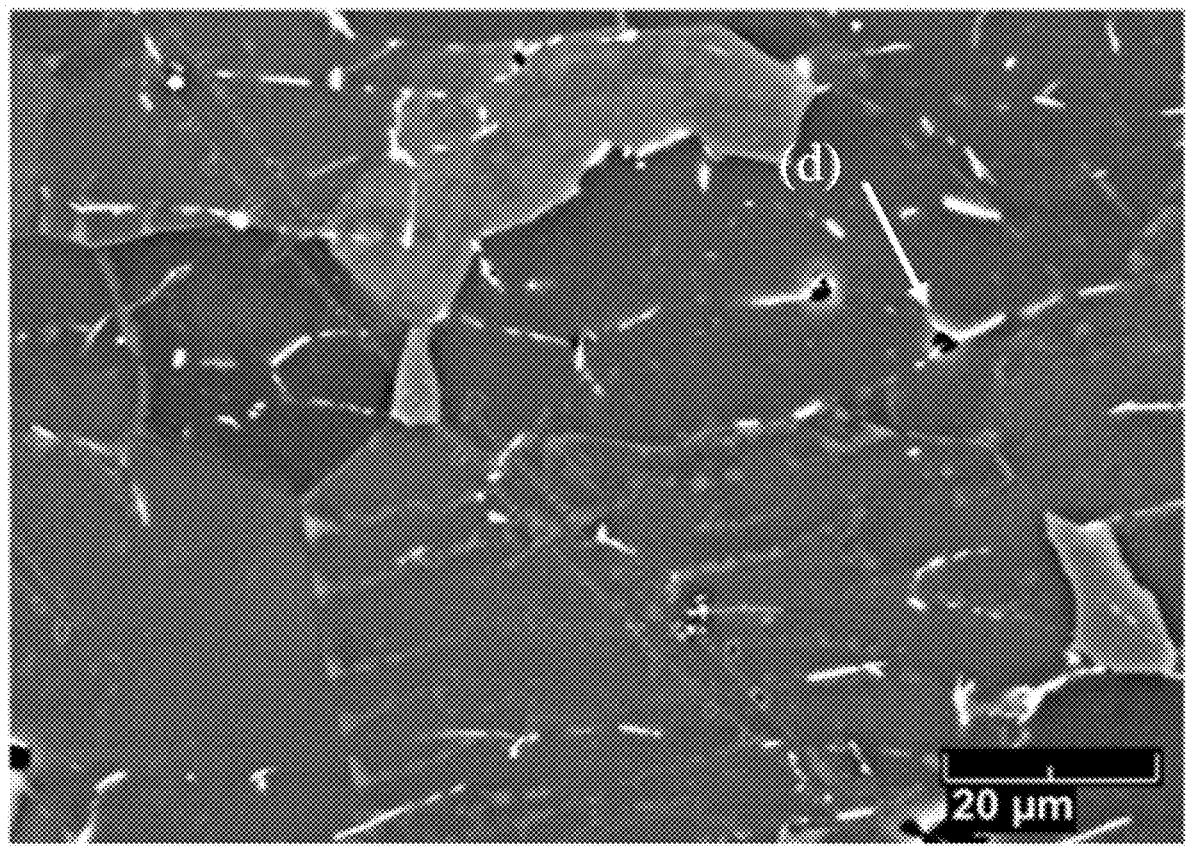
Figure 23D:
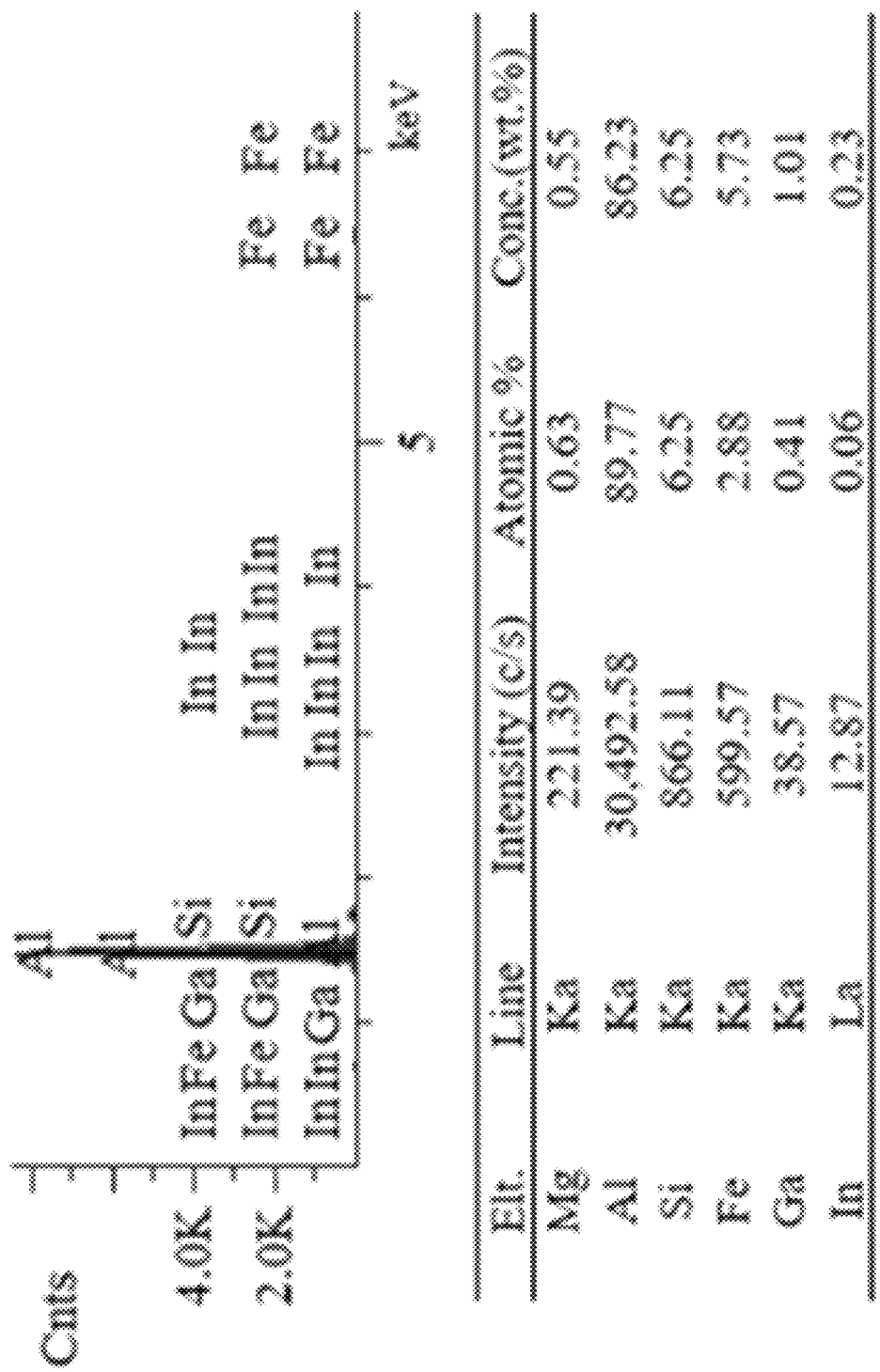
FIG. 23D shows, according to some embodiments, an example of intermetallic compounds composed of silicon, iron and gallium, detailed in FIG. 23C.

Although silicon in Si-doped aluminum segregated to the grain boundaries, eGaIn appeared to permeate through $AlSi_{0.6}$ grain boundaries as uniformly as eGaIn permeated through aluminum grain boundaries for grain sizes above ~40 micrometer. This was inferred by the relatively homogenous distribution of eGaIn imaged through BEC (see FIGS. 20A-20G and FIGS. 22A-22F). Yet, the effects of permeation time on hydrogen flux differed between the two compositions. In commercially pure aluminum for d<140 micrometers, a longer permeation time increased the reaction duration and delayed the point at which peak flux rates were achieved (FIG. 21D). In Si-doped aluminum, a longer permeation time increased the hydrogen flux while decreasing the reaction duration and the time it took for peak hydrogen flux rates to occur (FIG. 21E). Permeation time did not have an effect on the final reaction efficiency.

Figure 24A:
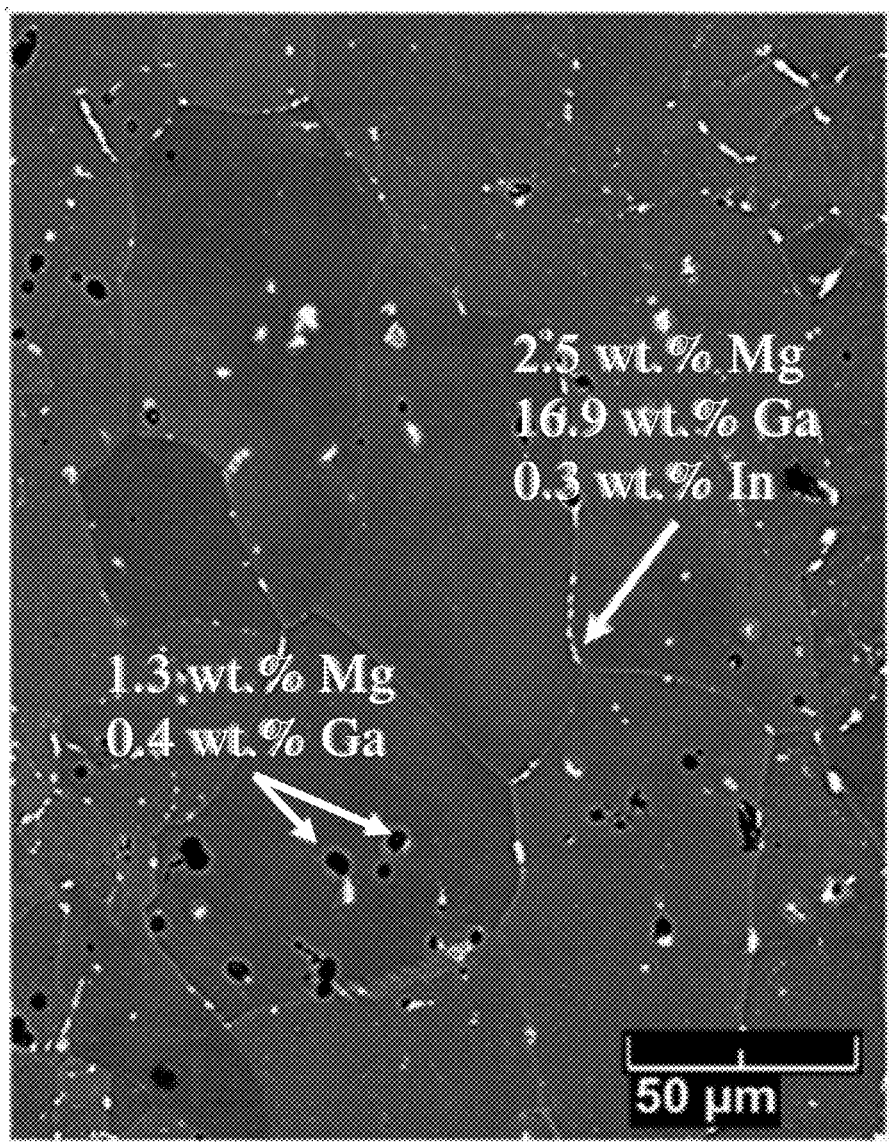
FIG. 24A shows, according to some embodiments, a backscattered SEM image of permeated $AlMg_1$.
Figure 24B:
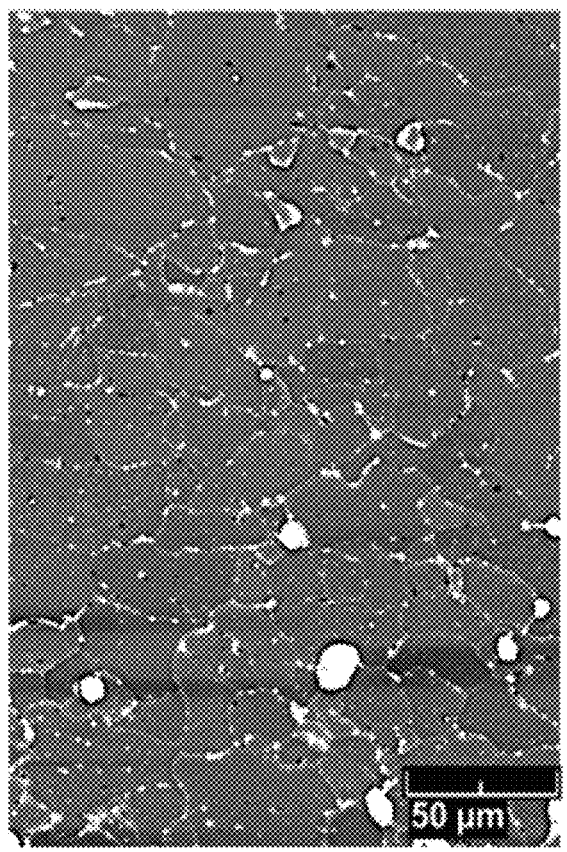
FIG. 24B shows, according to some embodiments, a backscattered SEM image of permeated $AlMg_1Si_{0.6}$.
Figure 24C:
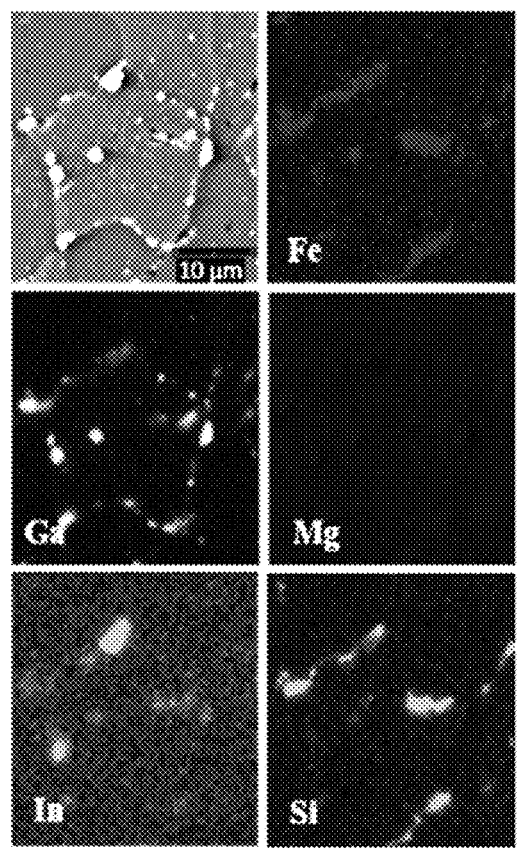
FIG. 24C shows, according to some embodiments, an x-ray intensity map overlay of an example grain boundary composition in $AlMg_1Si_{0.6}$.
Figure 25A:
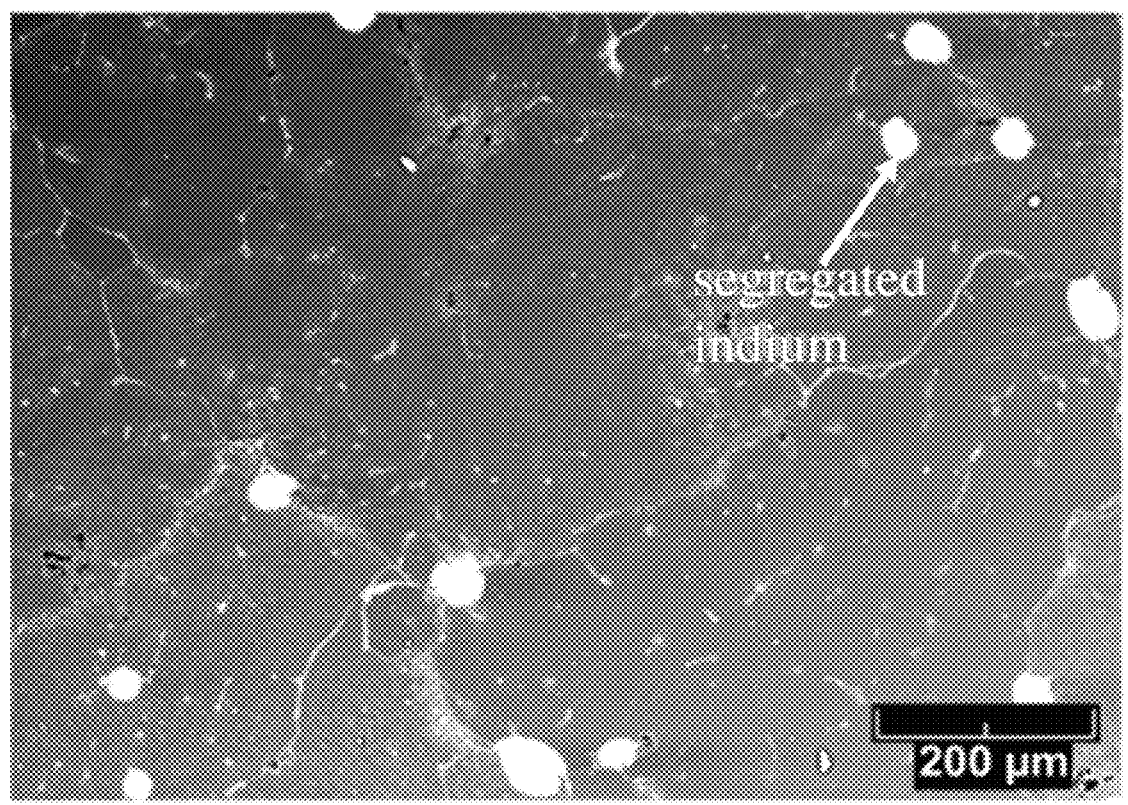
FIGS. 25A-25G show, according to some embodiments, microstructural analyses of Al+Mg as-cast.
Figure 25B:
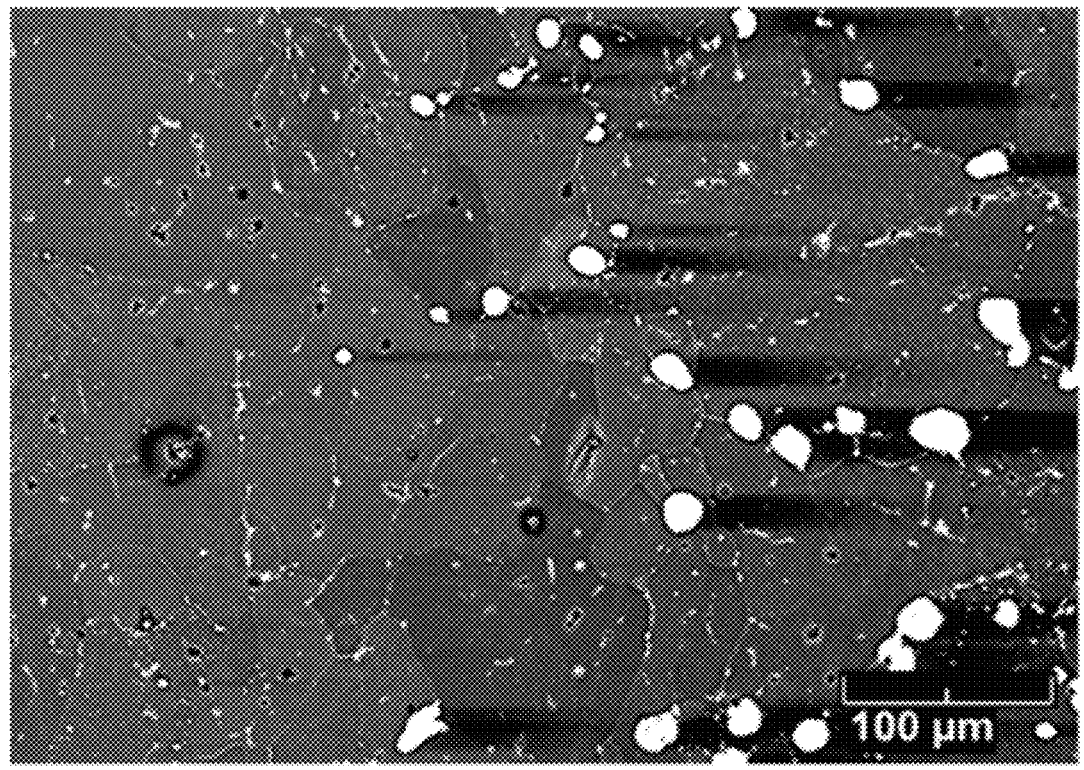
Figure 25C:
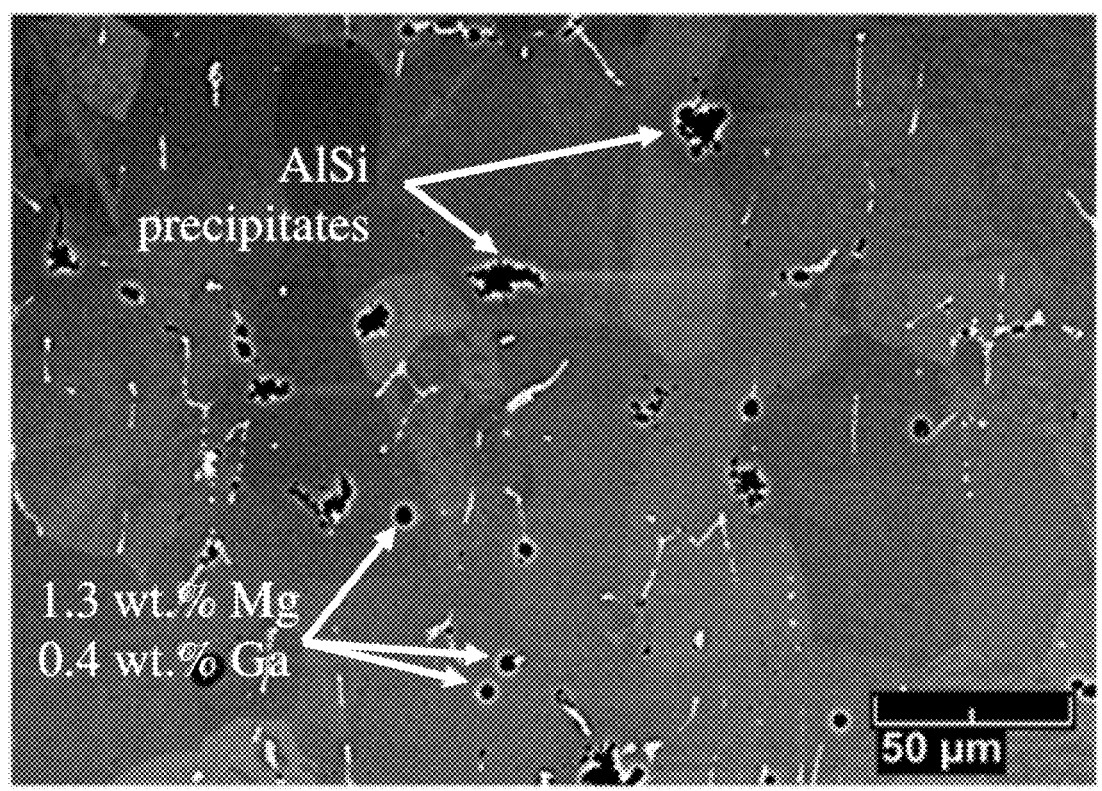
Figure 25D:
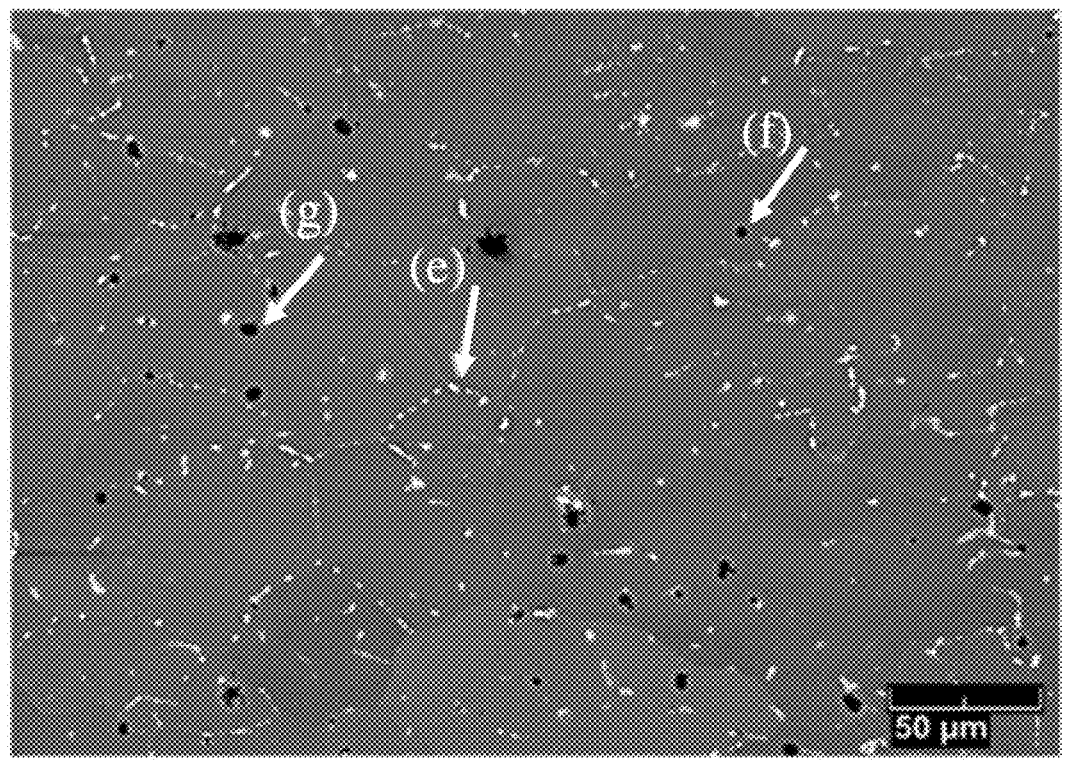
Figure 25E:
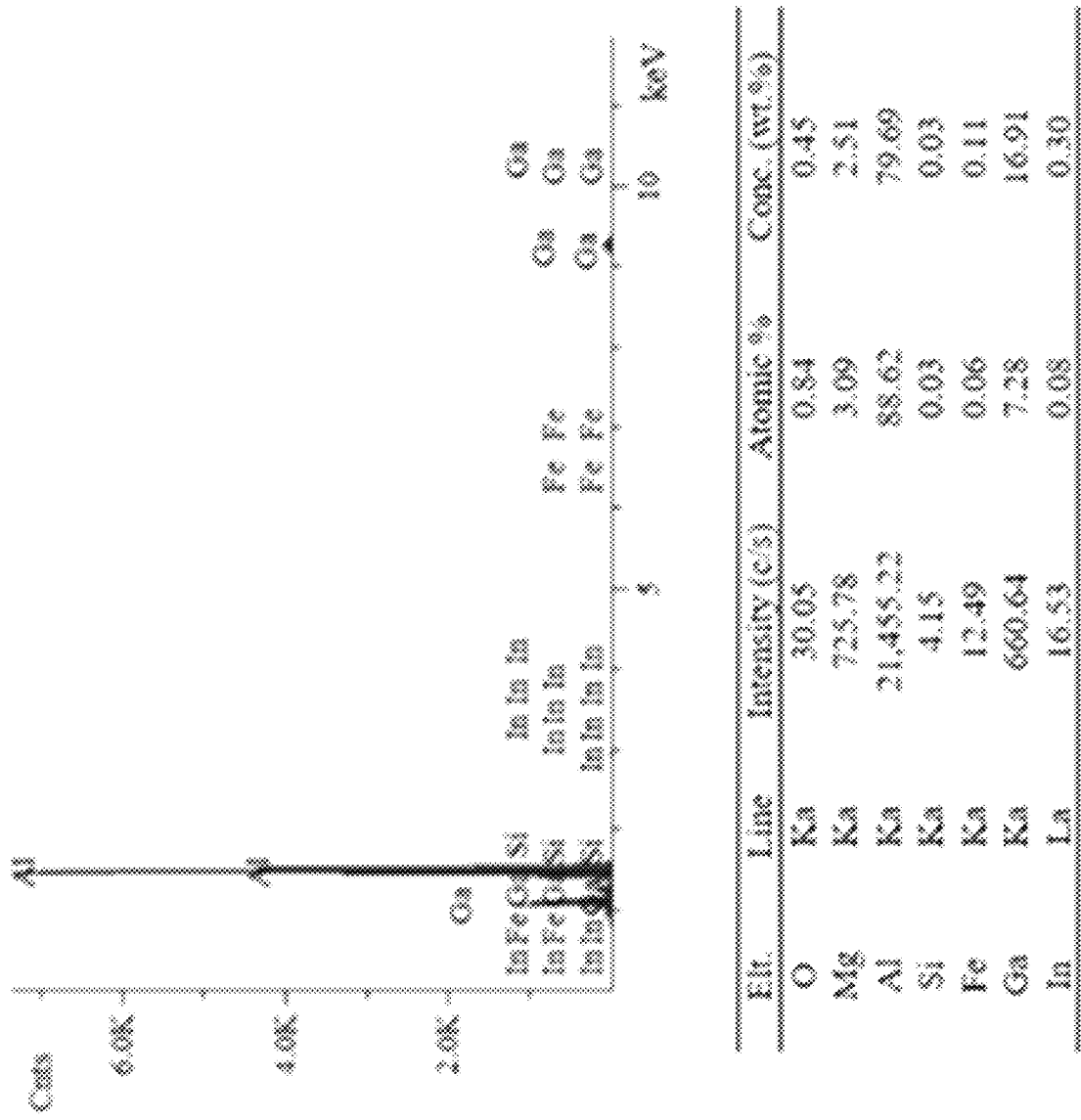
Figure 25F:
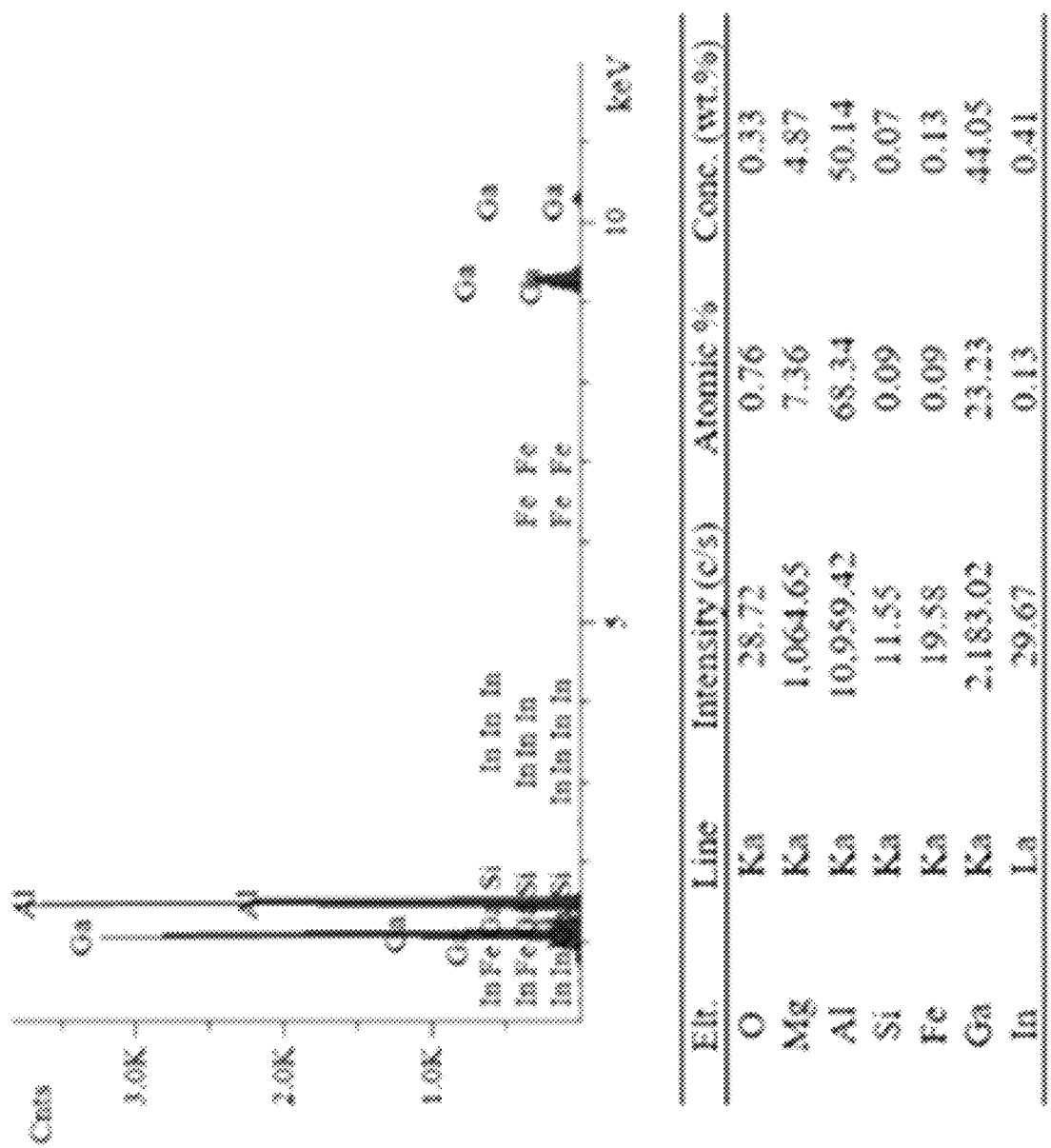
Figures 25G, 26A:
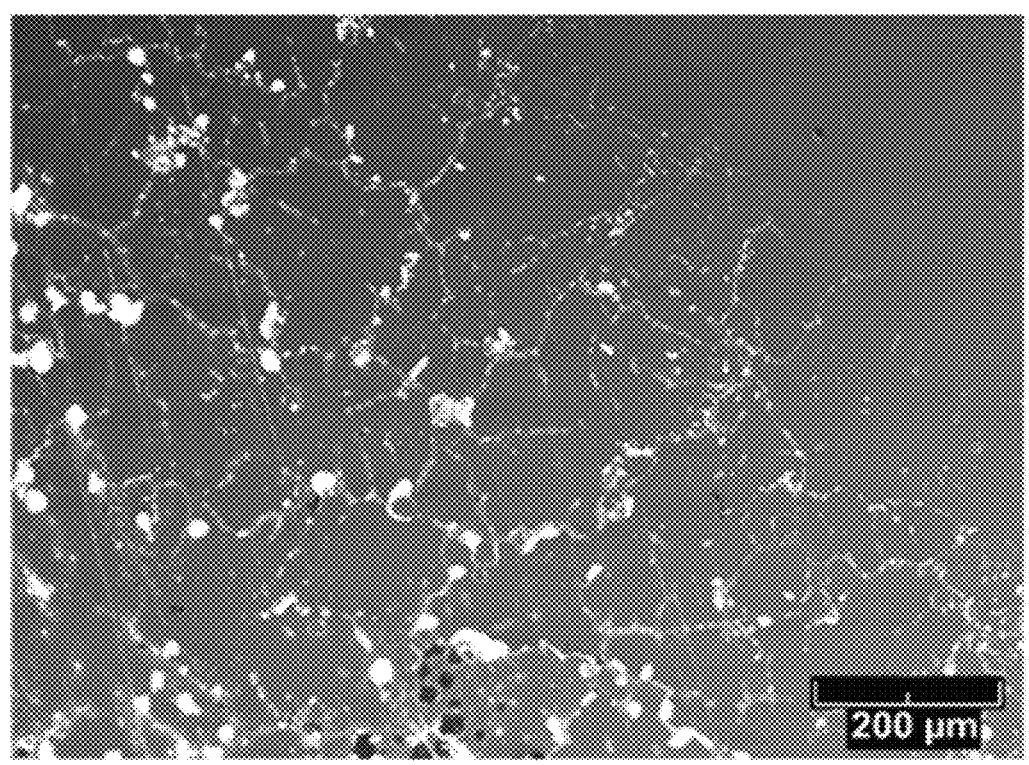
FIG. 26A-26G show, according to some embodiments, microstructural analyses of Al+Mg,Si as-cast.
Figure 26B:
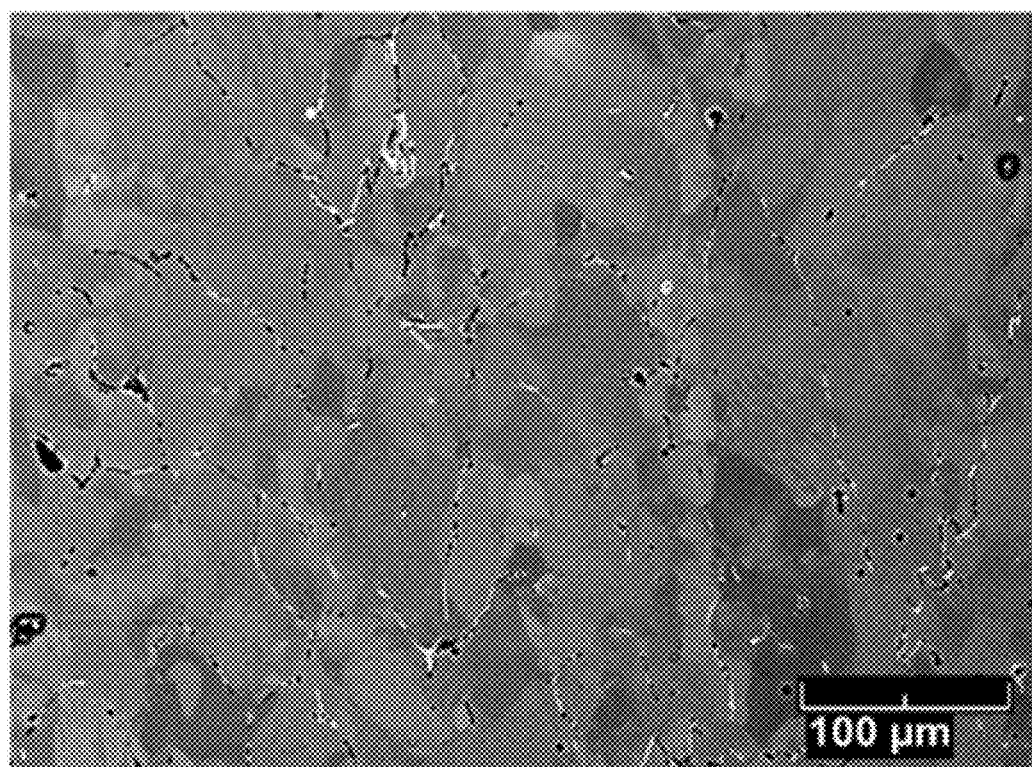
Figure 26C:
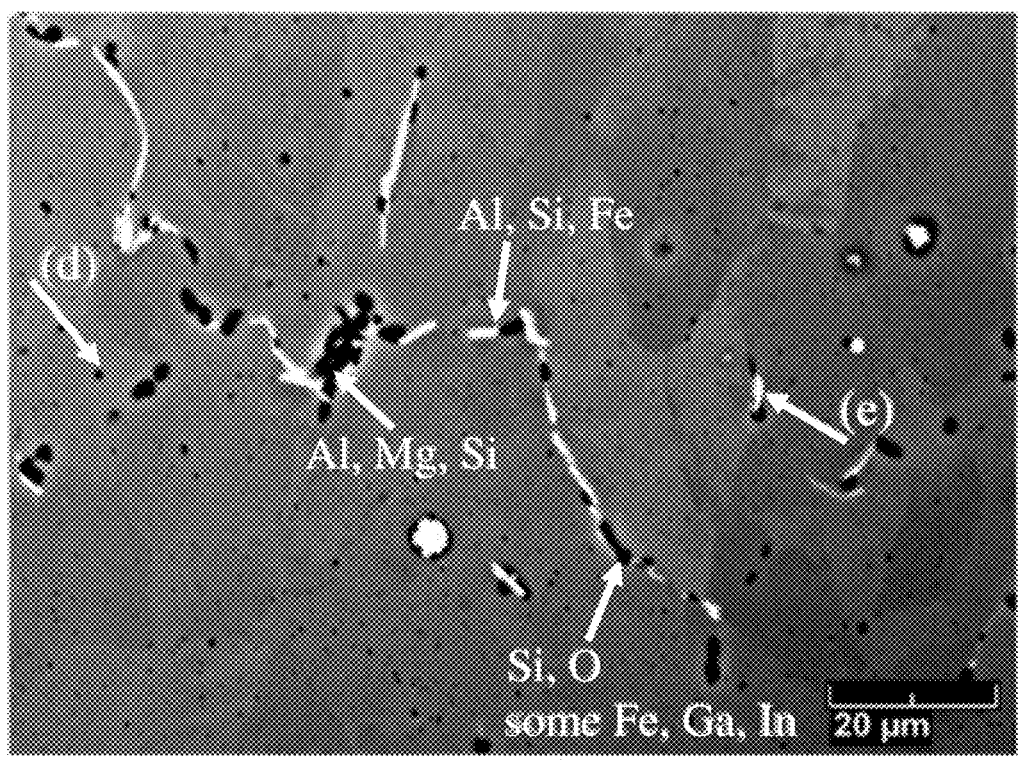
Figures 26D, 26E, 26F:
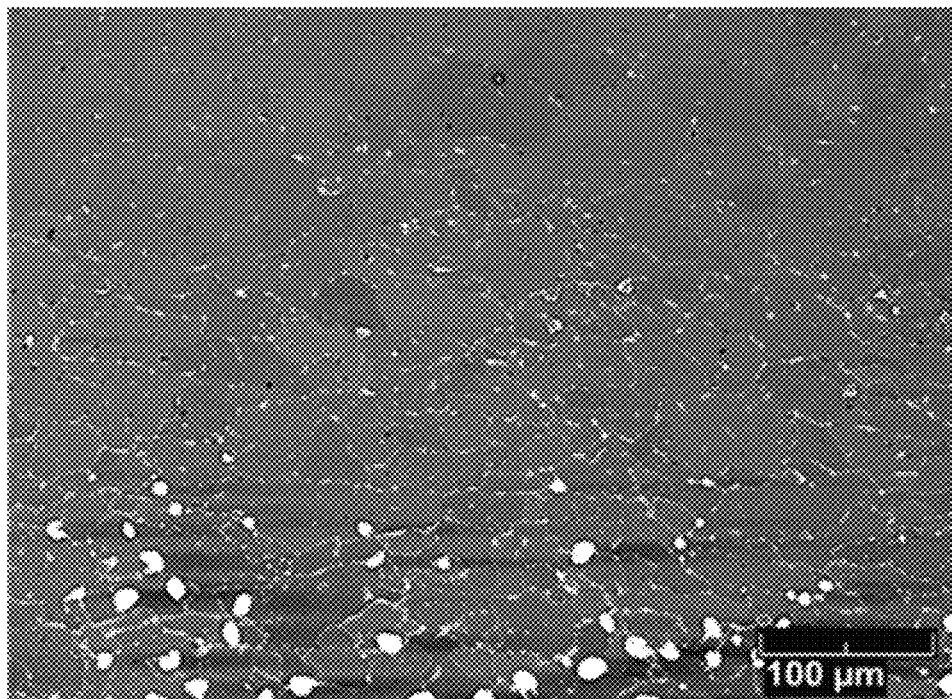
Figure 26G:
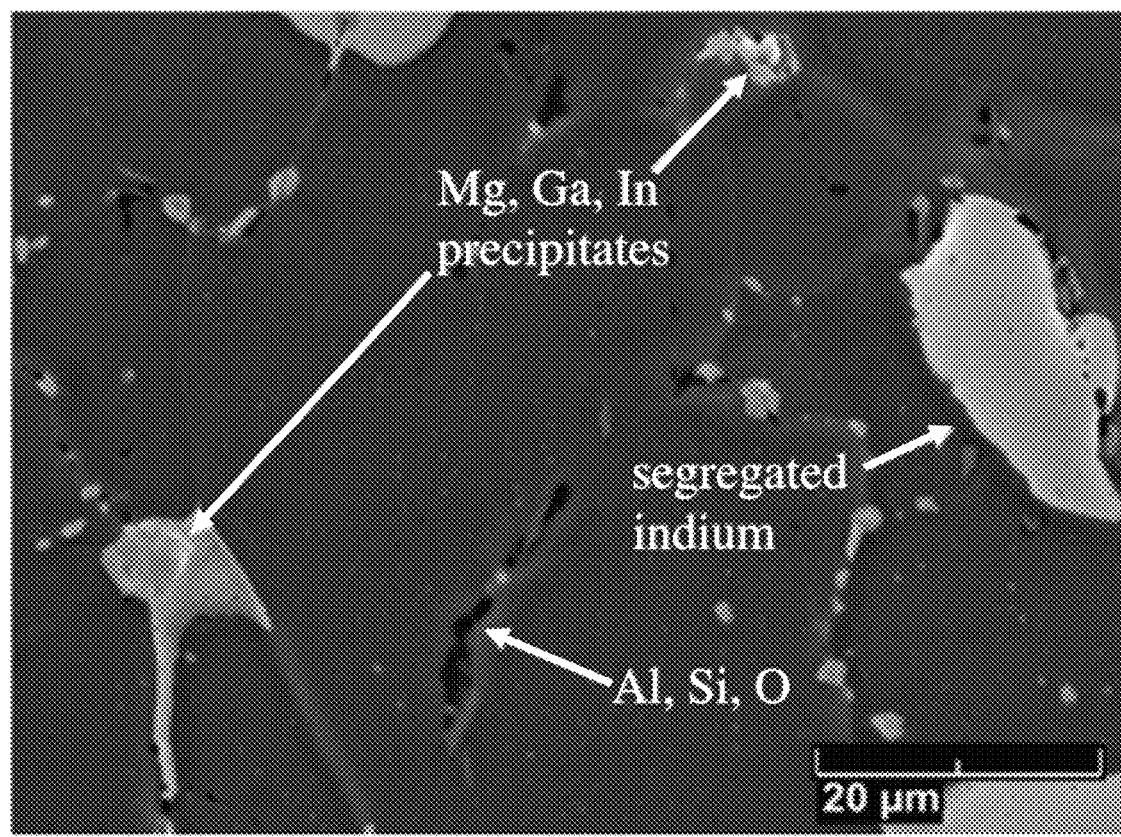
Figure 27A:
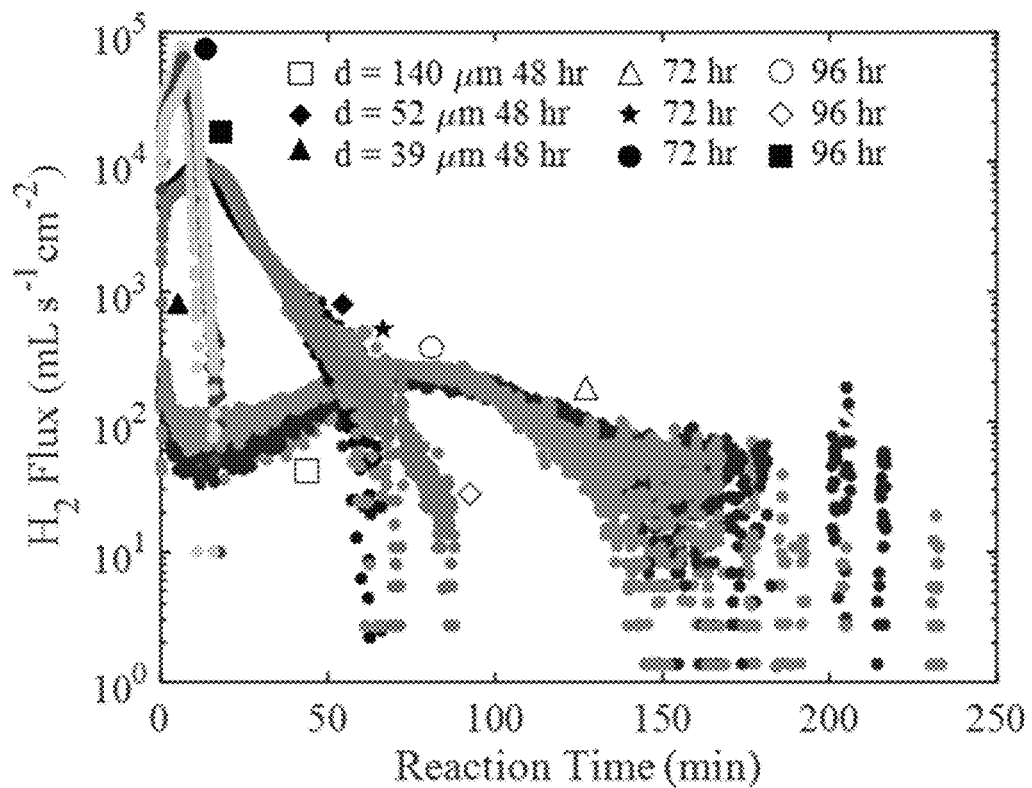
FIG. 27A shows, according to some embodiments, the hydrogen evolution data for Al hydrogen flux for various grain size distributions and permeation times.
Figure 27B:
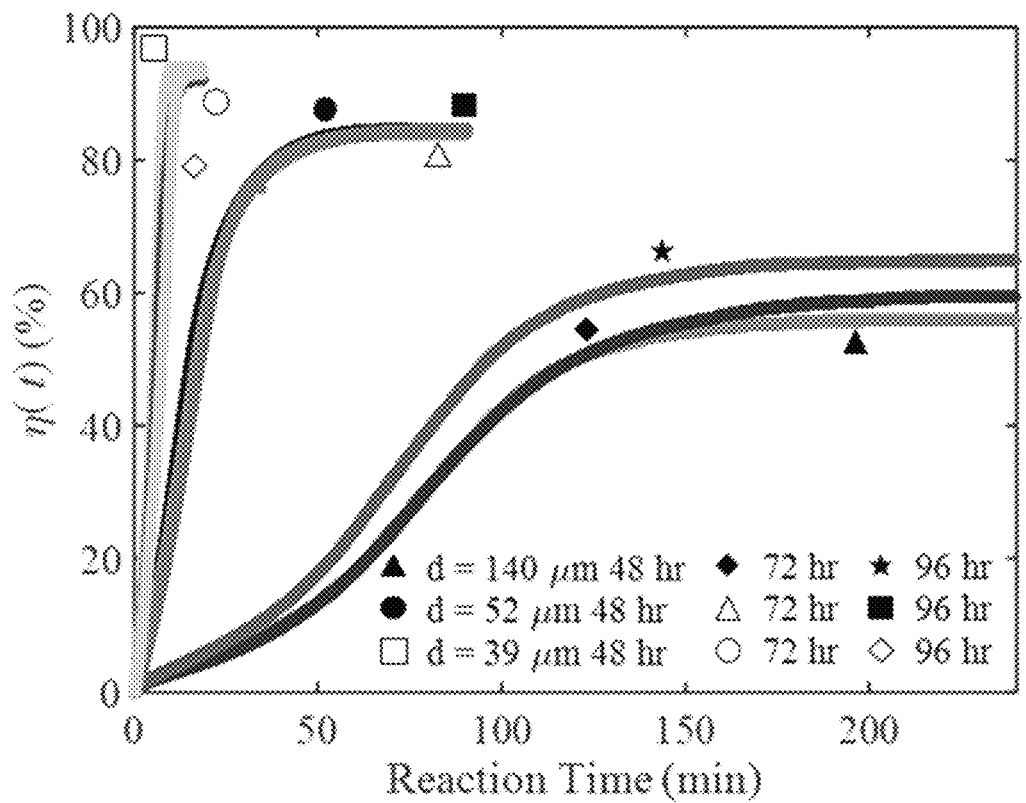
FIG. 27B shows, according to some embodiments, the hydrogen evolution data for Al reaction efficiency for various grain size distributions and permeation times.
Figure 28A:
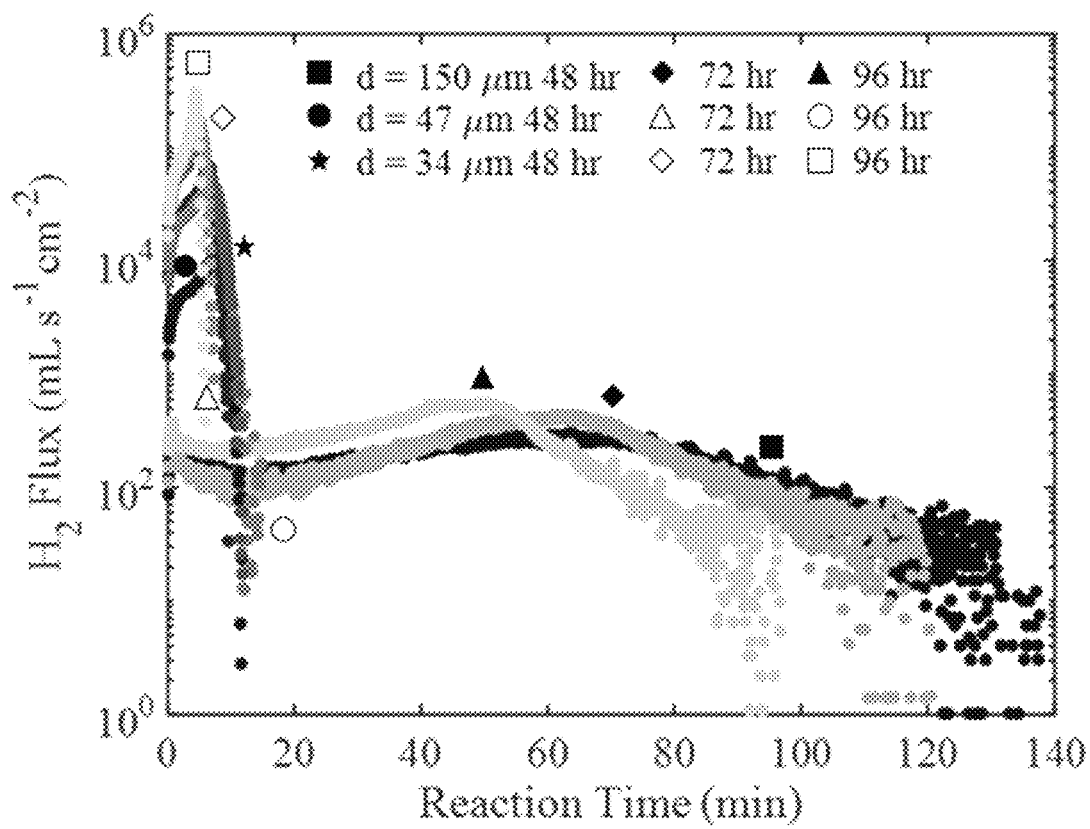
FIG. 28A shows, according to some embodiments, the hydrogen evolution data for $AlSi_{0.6}$ hydrogen flux for various grain size distributions and permeation times.
Figure 28B:
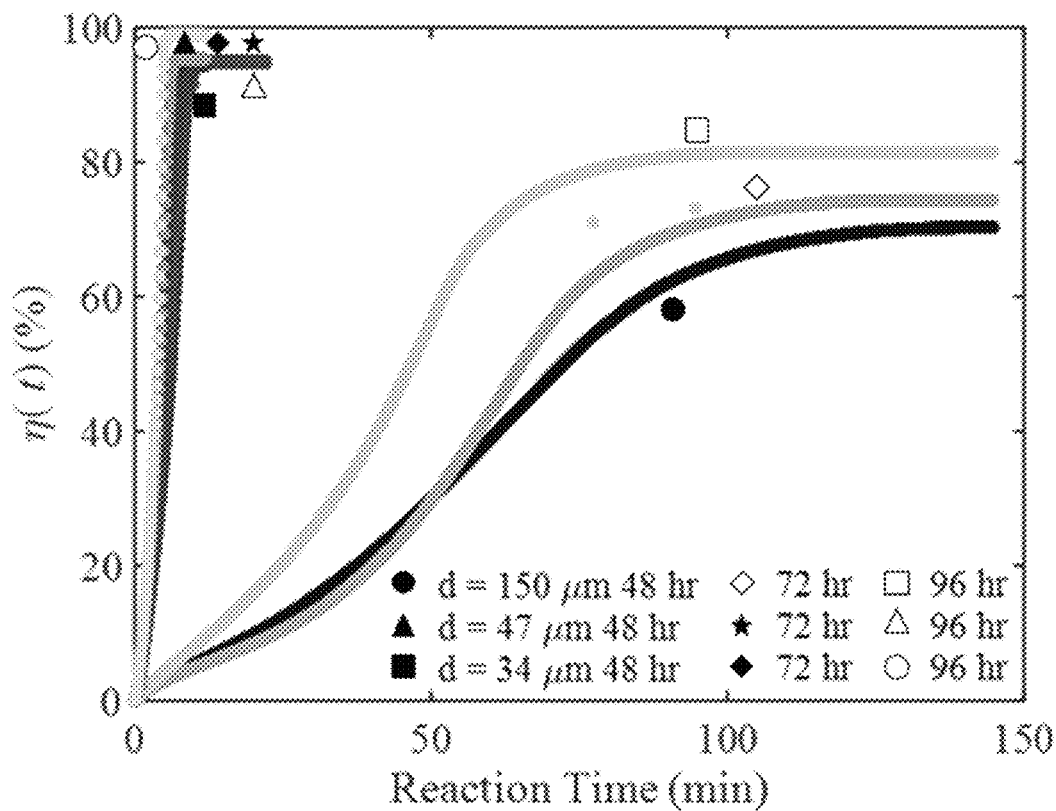
FIG. 28B shows, according to some embodiments, the hydrogen evolution data for $AlSi_{0.6}$ reaction efficiency for various grain size distributions and permeation times.

The effects of magnesium on eGaIn permeation become more significant as grain size was reduced below 100 micrometers. In as-cast Mg-doped aluminum, eGaIn was previously shown to permeate through grain boundaries, but not sub-grain boundaries. In microstructures with a of d<100 micrometers, the distribution of eGaIn through grain boundaries became less uniform, as shown in FIG. 24A when d was 30 micrometers in $AlMg_1$. This was partially explained by the change in grain boundary chemistry with cold-rolling and recrystallization, which can lead to segregation of magnesium from bulk aluminum to the grain boundaries. Magnesium may have been decorating the grain boundaries in the form of discontinuous β-phase $Mg_2Al_3$ precipitates. Compositional analysis of grain boundary points showed segregated magnesium, as well as gallium segregated from indium. Segregation of indium in an Al—Mg—Ga—In—Sn alloy was also observed, concluding that magnesium induced the segregation. Detailed EDS analyses of the $AlMg_1$ microstructure is provided in FIGS. 25A-25G. An additional explanation for the permeation behavior of eGaIn concerns the solute magnesium. Magnesium solute in aluminum is known to result in solute drag in aluminum, effectively pinning high angle grain boundaries but not low-angle grain boundaries. The limited mobility of high-angle grain boundaries and strain fields caused by solute magnesium may have resulted in the inhomogeneous distribution of eGaIn through the grain boundaries Similarly, eGaIn did not permeate evenly through the grain boundaries of Mg,Si-doped aluminum (FIG. 24B). Grain boundary precipitates included magnesium, iron and silicon, as shown in FIG. 24C. Magnesium was also in solution. Additional compositional analysis of the $AlMg_1Si_{0.6}$ permeated microstructure is provided in FIGS. 26A-26G. While eGaIn permeation appeared incomplete from backscattered SEM imaging, the effects of permeation time on hydrogen generation rates were negligible in Mg- and Mg,Si-doped aluminum (see FIGS. 27A-27B and FIGS. 28A-28B). This indicated that eGaIn permeated through the grain boundaries to the extent that was energetically favorable, and thus longer permeation times would not improve the lack in uniformity of eGaIn.

Example 8

The following example describes the effects of grain size on reaction efficiency of the composition with water.

Reaction efficiency (η), as shown below, was defined as the extent of the Al-water reaction, in which the experimentally generated amount of hydrogen ($n_{H_2}$) was compared to the theoretical limit ($n_{th}$) for a given amount of aluminum. The transient behavior of the Al-water reaction was measured, giving rise to a reaction efficiency that was a function of reaction time (t). The following results are of samples that were tested 96 hours after the application of eGaIn to the aluminum surface.

$$\eta(t) = \frac{n_{H_2}(t)}{n_{th}}$$

Figure 29A:
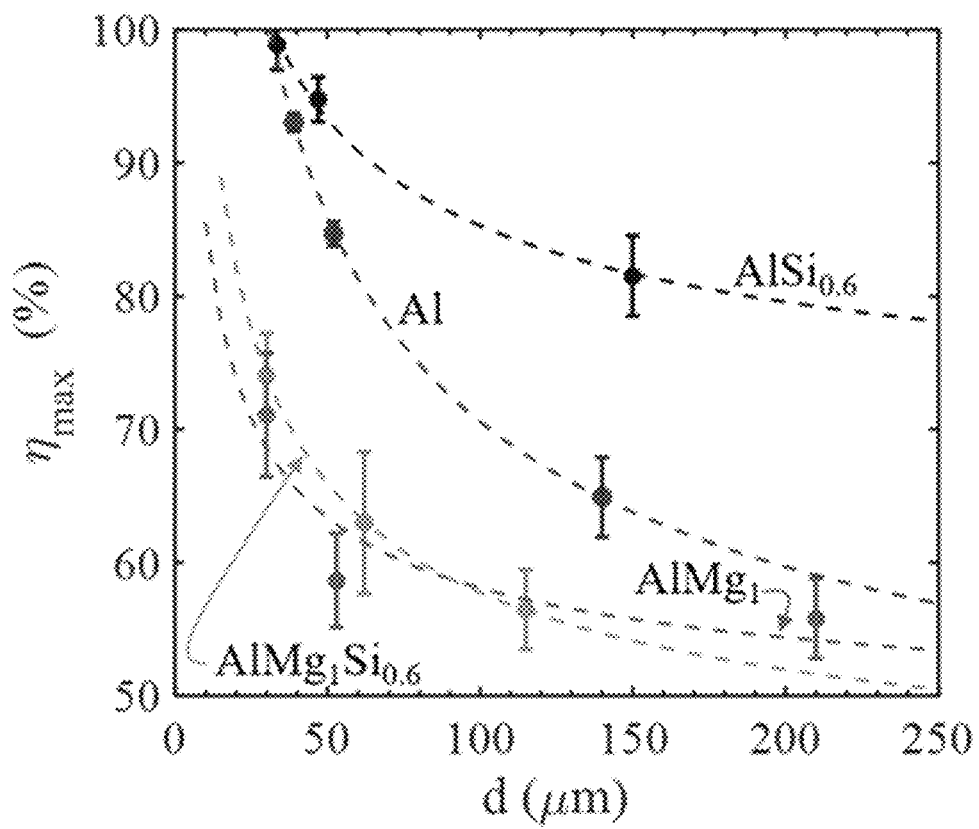
FIG. 29A shows, according to some embodiments, the hydrogen generation reaction efficiency with respect to grain size per doping element(s)
Figure 29B:
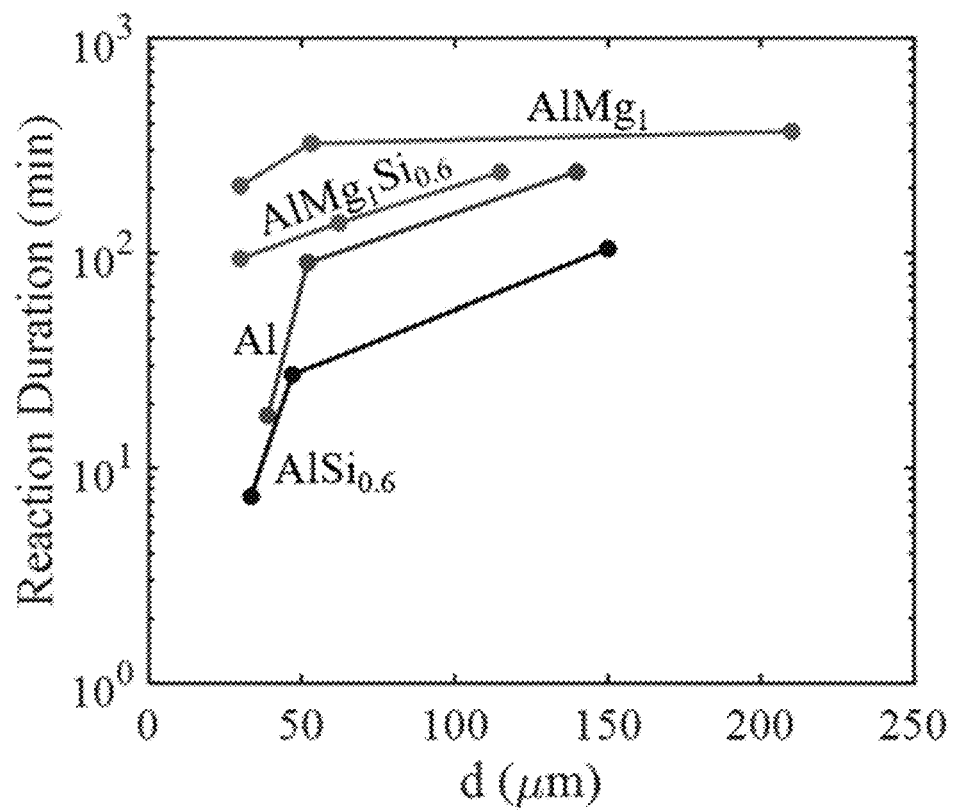
FIG. 29B shows, according to some embodiments, the hydrogen generation reaction duration with respect to grain size per doping element(s)

Across compositions, reducing grain size increased reaction efficiencies in eGaIn-depassivated aluminum of homogenous or heterogeneous microstructures. However, the degree to which reaction efficiency increased with grain size depended on the dopant. The maximum reaction efficiency obtained (i.e., η once the Al-water reaction stops) for each composition with respect to grain size is shown in FIG. 29A, along with the corresponding duration of the reaction in FIG. 29B. As can be seen from FIG. 29A, the reaction efficiency of commercially pure aluminum was relatively sensitive to d. Grain size dependency of reaction efficiency was especially significant when reducing grain size in aluminum from an as-cast microstructure (d≈150 micrometers) to d 50 micrometers. With a single 50% reduction increment through cold-rolling, the reaction efficiency increased by +20%. A further reduction in grain size did not significantly increase the reaction efficiency in aluminum but did significantly reduce the reaction duration (FIG. 29B).

Figure 29C:
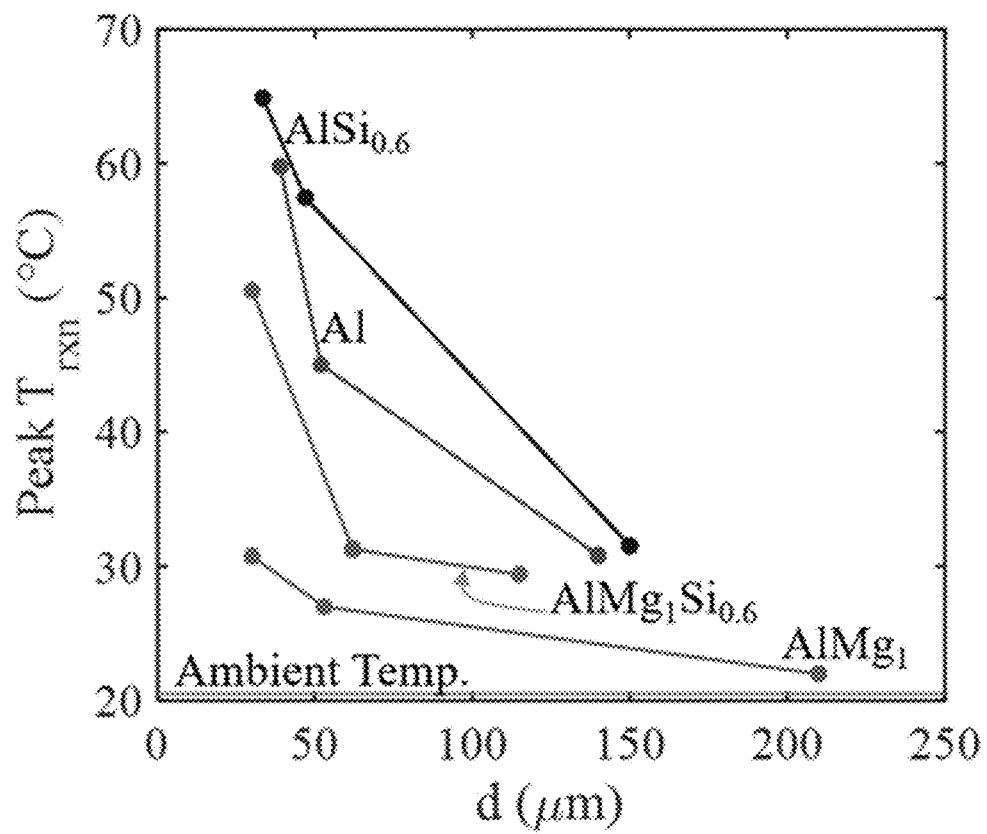
FIG. 29C shows, according to some embodiments, the hydrogen generation peak reaction temperature with respect to grain size per doping element(s)

Although $AlSi_{0.6}$ contained less aluminum on a per weight basis than commercially pure aluminum, Si-doped aluminum had a higher reaction efficiency for the grain sizes tested, shown in FIG. 29A. As grain boundary distances decreased, the difference in reaction efficiency between aluminum and Si-doped aluminum began to converge. The same was true for reaction duration but only for values of d below 50 micrometers (FIG. 29B). In both commercially pure aluminum and $AlSi_{0.6}$, a reduction in average grain/subgrain size from around 150 micrometers to around 35 micrometers increased the room temperature Al-water reaction efficiency to nearly 100% and reduced the reaction duration by more than an order of magnitude. While the Al-water solution began at room temperature, the temperature of the solution increased as the exothermic reaction(s) proceeded. The peak reaction temperatures of FIG. 29C generally corresponded to the temperature of the aluminum/water solution when samples were reacting at their peak rate. Although samples contained less than 0.23 g of aluminum, eGaIn-depassivated aluminum and $AlSi_{0.6}$ reached incredibly high temperatures during their reaction.

It was previously shown that the presence of magnesium significantly reduced the reaction efficiency in aluminum when eGaIn was at the grain boundaries, beyond which was explainable from a classic corrosion framework. Here, this remained true even for smaller grain sizes. From FIG. 29A, a reduction in d from >200 micrometers to 50 micrometers had negligible effect on reaction efficiency, reaction duration and reaction temperature in $AlMg_1$. Grain size effects became more significant in $AlMg_1$ for d less than 50 micrometers. Similar to reaction efficiencies in Si-doped aluminum versus aluminum, doping $AlMg_1$ with silicon also increased the reaction efficiency despite the higher concentration of alloying elements. From FIG. 29A, $AlMg_1Si_{0.6}$ had slightly higher reaction efficiencies than $AlMg_1$ across the tested grain sizes, and shorter reaction durations. Such trends alluded to the opposing effects of magnesium and silicon on the Al-water reaction in the presence of eGaIn. While silicon in the $AlMg_1Si_{0.6}$ microstructure was partially bonded to magnesium in the form of intermetallic precipitates, silicon seemed to still improve the Al-water reaction properties in $AlMg_1Si_{0.6}$.

Interestingly, commercially pure aluminum, $AlSi_{0.6}$ and $AlMg_1Si_{0.6}$ followed a power law in reaction efficiency that paralleled the Hall-Petch equation. The Hall-Petch equation states that the yield strength ($\sigma_y$) of a material scales with grain size (d) to the power of $-\frac{1}{2}$, as shown below.

$$\sigma_y = \sigma_0 + k_y d^{-\frac{1}{2}}$$

Yield strength is also a factor of the yield strength of the material without any grain boundaries ($\sigma_0$) such as in a single crystal, and an experimentally determined coefficient ($k_y$). The results in FIG. 29A followed a similar trend, in which the final reaction efficiency ($\eta_{max}$) was found to scale with grain size to the power of $-\frac{1}{2}$, also shown below.

$$\eta_{max} \propto d^{-1/2}$$

Solid lines in FIG. 29A represent the fitting of $d^{-1/2}$ to experimental data. While Si-doped aluminum, commercially pure Al, and Mg,Si-doped aluminum were well represented by this trend, Mg-doped aluminum was not well represented by $d^{-1/2}$.

Example 9

The following example describes the evaluation of hydrogen evolution rates using compositions comprising an aluminum alloy and eutectic composition.

Figure 30A:
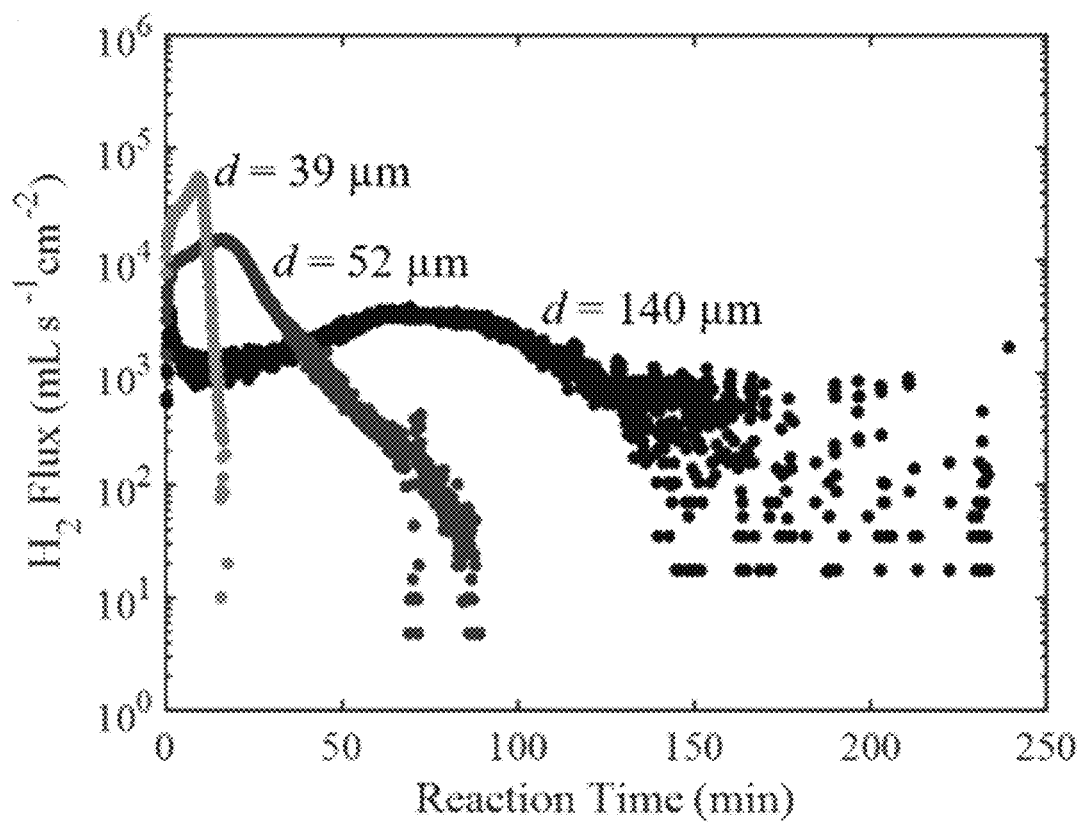
FIG. 30A shows, according to some embodiments, hydrogen flux with respect to reaction time for commercially pure aluminum.
Figure 30B:
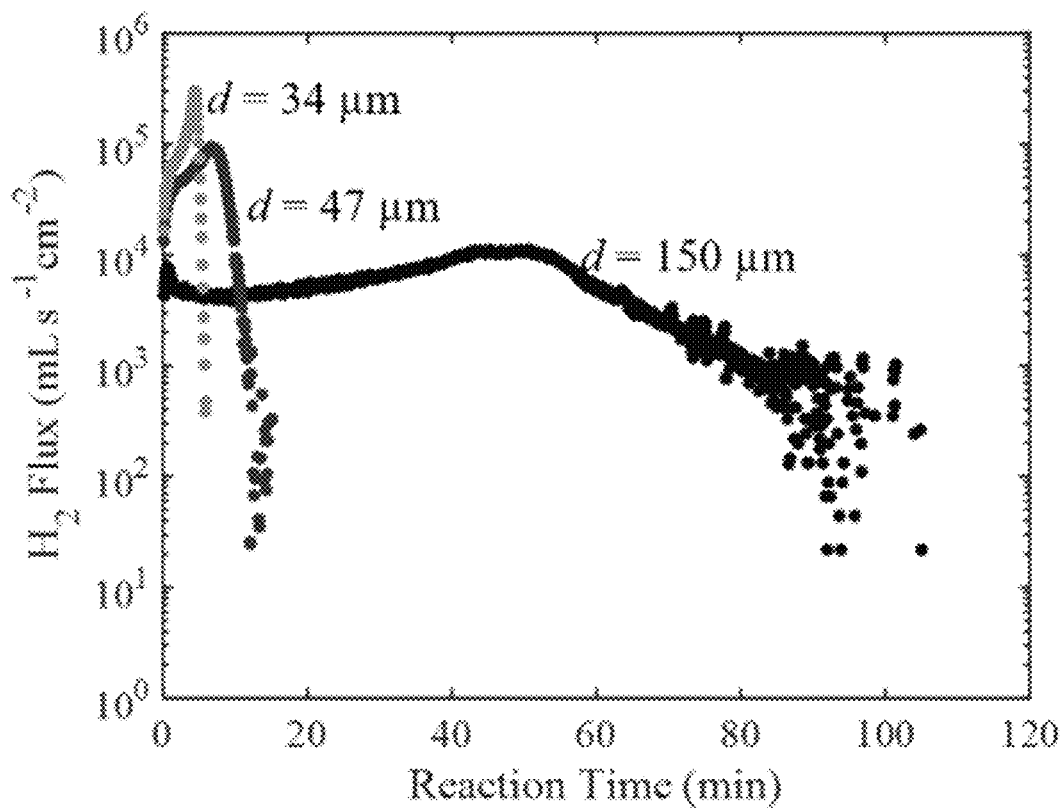
FIG. 30B shows, according to some embodiments, hydrogen flux with respect to reaction time for $AlSi_{0.6}$.

As previously mentioned, the underlying mechanism of the Al-water reaction when eGaIn is at the grain boundaries is poorly understood. Insight into the reaction mechanism can be drawn from the variation in hydrogen evolution rates with reaction time, for different grain sizes and doping elements. Numerous observations were made from the results provided in FIGS. 30A-30D. First was the further divergence of behavior in redox reaction between eGaIn-depassivated aluminum and water (FIG. 30A) from that of aluminum corrosion. In commercially pure aluminum, corrosion current densities have been reported to decrease with decreasing grain size. Because microstructures comprised of smaller grains have more grain boundary area, and thus more reactive surfaces, it was suggested that the decrease in corrosion rate is due to a greater area for oxide formation (i.e., more readily passivate) and film ion conduction. Here, hydrogen generation flux increased with decreasing grain size, not only in commercially pure aluminum but also in doped aluminum. Because the Al-water reaction occurred at the grain boundaries (for eGaIn-depassivated aluminum), a higher hydrogen flux for smaller grain sizes would presumably be due to the same factors that caused pure aluminum corrosion rates to decrease with grain size (more reactive surfaces). However, the presence of eGaIn coating the grain surfaces inhibited passivation as would occur in typical aluminum corrosion. Similar grain size effects on the Al-water reaction for hydrogen production have been obtained by others, although different methods of depassivation were practiced. Once doping elements are involved, the corrosion behavior of aluminum becomes more complex due to dependencies on precipitate size and distribution. As such, effects of grain size on corrosion remain widely debated, despite being a heavily researched area due to aluminum's industrial applications.

In doped-aluminum samples, grain refinement can result in segregation of alloying elements to grain boundaries and in variation of precipitate size and/or distribution. This results in variable reaction rates that are not solely a function of grain size. Silicon generally segregates to aluminum grain boundaries due to its limited solubility in aluminum. As such, aluminum is doped with silicon to achieve 'second-phase' hardening. The effects of silicon on aluminum corrosion are highly debated. As silicon is cathodic to the adjacent aluminum matrix, it is possible for local galvanic interactions to occur, resulting in the dissolution of aluminum. However, other studies have also shown that the cathodic current density of silicon is too low to result in substantial dissolution of aluminum. The effects of grain refinement on corrosion in Si-doped aluminum is also debatable, and highly dependent on the processing method employed to reduce grain size. Depending on the processing method, reducing grain size can also lead to reducing the size of precipitates and their distribution. For example, in more heavily doped aluminum (>5% silicon), grain refinement through equal-channel angular pressing or high-pressure torsion resulted in finer secondary-phase particles throughout the microstructure. Additionally, these fine particles were more uniformly distributed. The reduced micro galvanic activity of the grain refined alloy was attributed to the more uniform microstructure and small cathode to large anode effect.

Here, a significant catalytic effect of 0.6 wt. % silicon on the Al-water reaction was observed when eGaIn was present at the grain boundaries, especially for microstructures composed of grains smaller than 150 micrometers (FIG. 39B). Silicon has negligible solubility in both gallium and indium, resulting in pure silicon particles in a liquid phase of gallium/indium. As grain size decreased in Si-doped aluminum, grain boundary concentrations of iron and silicon increased (see FIGS. 22A-22F and FIGS. 23A-23D). Iron and/or silicon-based precipitates were also identified at the grain surface, often covered or surrounded by gallium and indium, though the size of the precipitates did not change with grain size. Considering that a grain size reduction of −100 micrometers in Si-doped aluminum (FIG. 30B) was shown to have a significant effect on hydrogen flux compared to what was observed in commercially pure aluminum (FIG. 30A), the increase in flux was attributable to the higher concentrations of silicon and iron. Below 150 micrometers, the hydrogen flux produced at the surface of Si-doped aluminum grains was almost an order of magnitude greater than the hydrogen flux produced at the surface of commercially pure aluminum grains. The underlying mechanism of the enhanced Al-water reaction with silicon doping remains unknown.

Doping of aluminum with 1 wt. % magnesium primarily gave rise to solid solution strengthening, since the solubility limit of magnesium in aluminum is slightly greater than 1 wt. %. In solid solution, it has been found that magnesium has little effect on the electrochemical corrosion rates of Mg-doped aluminum in aqueous solutions. During solidification or thermomechanical processing, magnesium will form precipitates, the composition of which depends on other alloying elements or impurities present. For the Al—Mg system considered here, the main precipitate to be expected (if any) was the grain boundary β-phase, $Mg_2Al_3$. Magnesium is more electrochemically active than aluminum, resulting in $Mg_2Al_{13}$ precipitates being anodic to the surrounding aluminum matrix. This gives rise to dissolution of $Mg_2Al_{13}$ in aqueous environments, increasing the susceptibility of the alloy to intergranular corrosion or stress corrosion cracking.

Figure 30C:
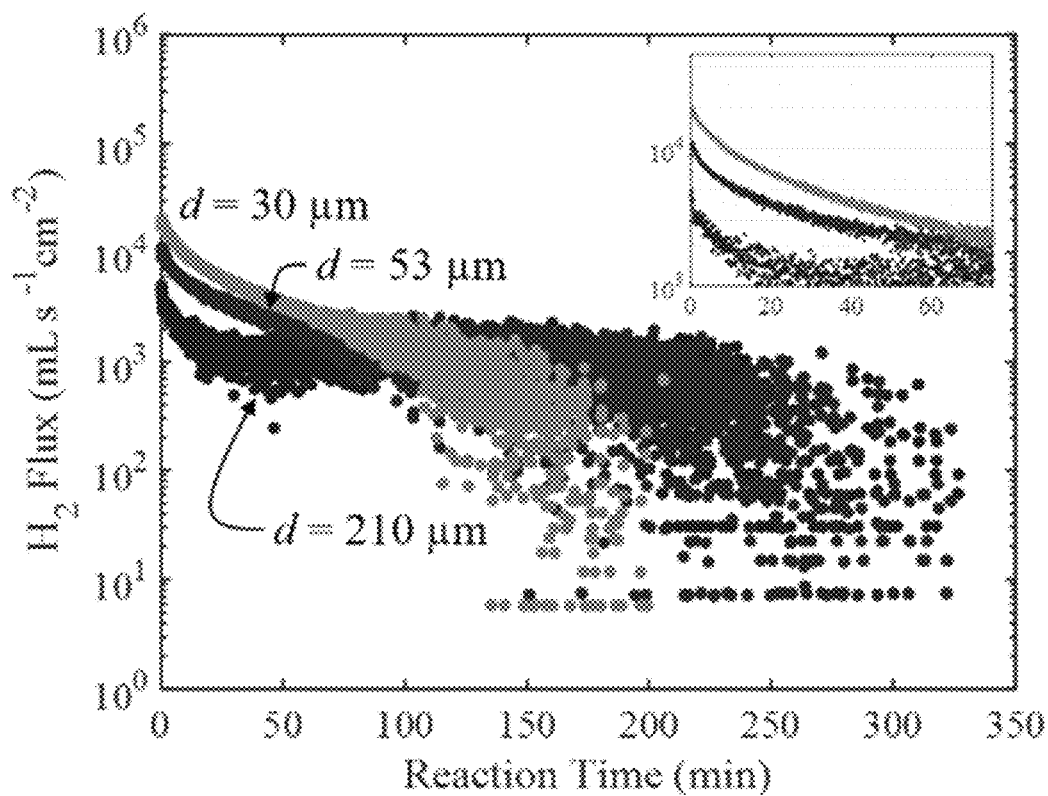
FIG. 30C shows, according to some embodiments, hydrogen flux with respect to reaction time for $AlMg_1$.

When eGaIn was at aluminum grain boundaries, presence of magnesium limited the hydrogen flux to below $2\times10^4$ $mLs^{-1}cm^{-2}$ across grain sizes tested (FIG. 30C). Additionally, the transient behavior of the Al-water reaction significantly changed when magnesium was in the system. In aluminum and $AlSi_{0.6}$, there was a period of time in which the hydrogen evolution rate increased until reaching a peak, followed by a decline in reaction rate. Furthermore, with decreasing grain size, there was a decrease in the delay before observing a peak flux. The presence of magnesium completely eliminated this period of delay; the peak flux occurred at the very beginning of the reaction. For microstructures with an average grain boundary distance of 53 micrometers or less, the evolution rate continuously decreased with time.

Although the peak hydrogen flux in aluminum was almost an order of magnitude greater than that in Mg-doped aluminum, the initial hydrogen flux in both was comparable across grain sizes. To explain the trend of decreasing hydrogen flux with reaction time in eGaIn-depassivated Mg-doped aluminum, the following theories were considered. The Al-water reaction resulted in grain dissolution, which in turn would result in segregation of magnesium to the grain surface (i.e., grain boundary). Magnesium is insoluble in gallium around room temperature and has a maximum solid solubility of 5 at. % Mg in indium. In magnesium, indium has a maximum solid solubility of 19.4 at. % In with various intermetallic phases arising from solid-state transformation between indium and magnesium. With more than 5 at. % Mg segregated to the grain boundary, a build-up of magnesium at the grain surface would potentially inhibit aluminum from reacting with water. Another possible explanation was that magnesium began to corrode rather the aluminum, since aluminum is cathodic to magnesium. However, once 1% wt. of magnesium was reduced, the aluminum would proceed to react with water in the same manner as observed in commercially pure aluminum samples. Lastly, the Al-water reaction may have decreased due to the reduced density of grain boundary sites that contained eGaIn in $AlMg_1$ compared to the density of eGaIn-covered grain boundary sites in commercially pure aluminum or $AlSi_{0.6}$.

In $AlMg_1Si_{0.6}$, the Al-water reaction proceeded in a manner that captured behavioral aspects of both Mg-doped aluminum and Si-doped aluminum. From FIG. 30D, in grain sizes less than 115 micrometers, a small period of delay was observed before peak hydrogen flux rates were produced. The delay was not as pronounced as observed in aluminum or Si-doped aluminum, but nonetheless present. It was hypothesized that the presence of silicon in Mg,Si-doped aluminum has the same catalyzing effect on reaction rates as previously described. With magnesium also present, providing a retarding force, the two elements produced opposing forces thus creating the profile in FIG. 30D. This combined effect is interesting, since a majority of the silicon in Mg,Si-doped aluminum is expected to be present in the form of $Mg_2Si$ precipitates.

Figure 30D:
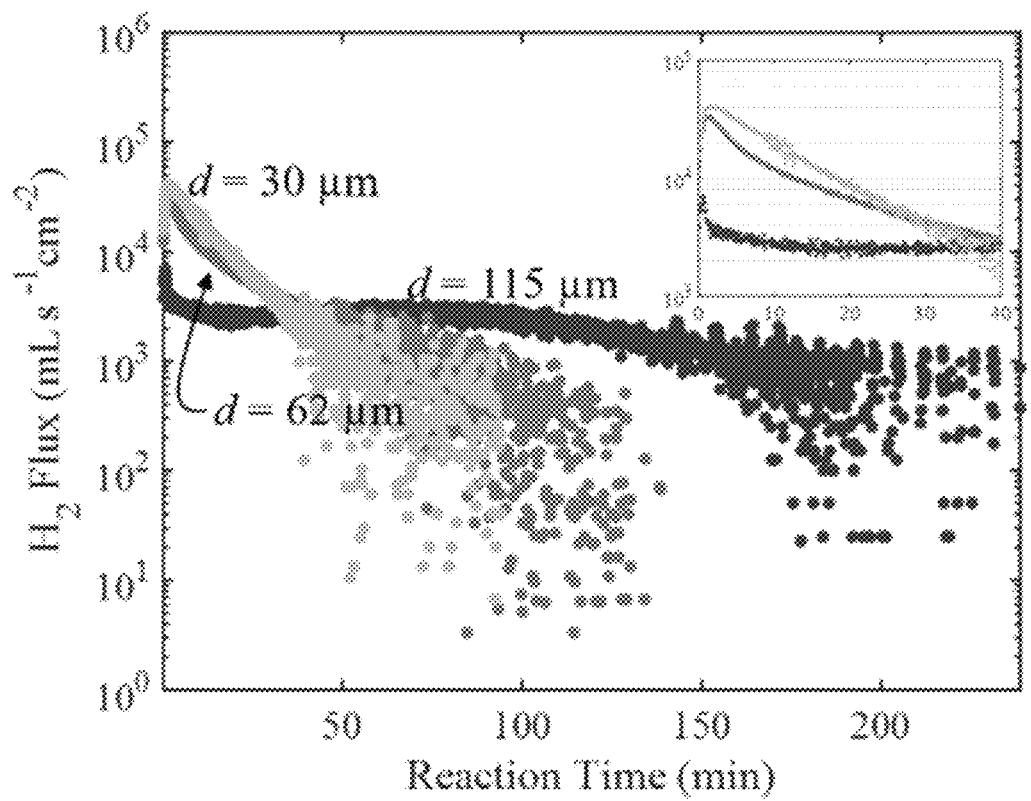
FIG. 30D shows, according to some embodiments, hydrogen flux with respect to reaction time for $AlMg_1Si_{0.6}$ permeated by eGaIn.

In aluminum corrosion, $Mg_2Si$ precipitates increase intergranular corrosion susceptibility in aluminum. As $Mg_2Si$ has a lower corrosion potential than the aluminum matrix, $Mg_2Si$ forms a local galvanic cell with aluminum and corrodes. However, it is primarily magnesium in the $Mg_2Si$ that dissolves through electrochemical activity. Although the remaining silicon is cathodic to the aluminum matrix, silicon's catalytic ability has been found to be too low to support cathodic reactions, as previously mentioned. Therefore, corrosion typically seizes following the preferential dissolution of magnesium. In terms of grain size effects, corrosion resistance has been found to decrease with decreasing grain size. The same trend was observed here; decreasing grain size increased reaction rates in Mg-doped aluminum (FIG. 30D). However, the differential in peak reaction rate with grain size decreased after an average grain size of 62 μm is reached. Decreasing the grain size from 62 micrometers to 30 micrometers had a minimal effect on the peak reaction rate.

The above-described embodiments of the reactors described herein can be implemented in any of numerous ways. For example, the embodiments may be implemented using hardware, software, or a combination thereof. When implemented in software, the software code can be executed on any suitable processor or collection of processors, whether provided in a single computing device or distributed among multiple computing devices. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Further, it should be appreciated that a computing device may be embodied in any of a number of forms, such as a rack-mounted computer, a desktop computer, a laptop computer, or a tablet computer. Additionally, a computing device may be embedded in a device not generally regarded as a computing device but with suitable processing capabilities, including a Personal Digital Assistant (PDA), a smart phone, tablet, or any other suitable portable or fixed electronic device.

Also, a computing device may have one or more input and output devices. These devices can be used, among other things, to present a user interface. Examples of output devices that can be used to provide a user interface include display screens for visual presentation of output and speakers or other sound generating devices for audible presentation of output. Examples of input devices that can be used for a user interface include keyboards, individual buttons, and pointing devices, such as mice, touch pads, and digitizing tablets. As another example, a computing device may receive input information through speech recognition or in other audible format.

Such computing devices may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the embodiments described herein may be embodied as a computer readable storage medium (or multiple computer readable media) (e.g., a computer memory, one or more floppy discs, compact discs (CD), optical discs, digital video disks (DVD), magnetic tapes, flash memories, RAM, ROM, EEPROM, circuit configurations in Field Programmable Gate Arrays or other semiconductor devices, or other tangible computer storage medium) encoded with one or more programs that, when executed on one or more computers or other processors, perform methods that implement the various embodiments discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computing devices or other processors to implement various aspects of the present disclosure as discussed above. As used herein, the term "computer-readable storage medium" encompasses only a non-transitory computer-readable medium that can be considered to be a manufacture (i.e., article of manufacture) or a machine. Alternatively or additionally, the disclosure may be embodied as a computer readable medium other than a computer-readable storage medium, such as a propagating signal.

The terms "program" or "software" are used herein in a generic sense to refer to any type of computer code or set of computer-executable instructions that can be employed to program a computing device or other processor to implement various aspects of the present disclosure as discussed above. Additionally, it should be appreciated that according to one aspect of this embodiment, one or more computer programs that when executed perform methods of the present disclosure need not reside on a single computing device or processor, but may be distributed in a modular fashion amongst a number of different computers or processors to implement various aspects of the present disclosure.

Computer or processor-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

The embodiments described herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

While several embodiments of the present disclosure have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present disclosure. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present disclosure is/are used. Those skilled in the art will recognize, or be able to ascertain using no more than routine experimentation, many equivalents to the specific embodiments of the disclosure described herein. It is, therefore, to be understood that the foregoing embodiments are presented by way of example only and that, within the scope of the appended claims and equivalents thereto, the disclosure may be practiced otherwise than as specifically described and claimed. The present disclosure is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present disclosure.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A composition, comprising:
an aluminum alloy comprising less than or equal to 50 weight percent (wt. %) silicon (Si) and/or less than or equal to 50 wt. % magnesium (Mg) based on a total weight of the aluminum alloy, wherein:
the aluminum alloy comprises an activating composition comprising gallium (Ga),
the Ga is concentrated proximate to grain boundaries of the aluminum alloy, wherein the aluminum alloy comprises the activating composition in an amount greater than 10 wt. % based on the total weight of the aluminum alloy, and wherein the composition is reactive with water.

2. The composition of claim 1, wherein the aluminum alloy comprises greater than or equal to 0.6 wt. % Si and greater than or equal to 1 wt. % Mg based on the total weight of the aluminum alloy.

3. The composition of claim 1, wherein the aluminum alloy comprises greater than or equal to 0.6 wt. % Si based on the total weight of the aluminum alloy.

4. The composition of claim 1, wherein the aluminum alloy comprises greater than or equal to 1 wt. % Mg based on the total weight of the aluminum alloy.

5. The composition of claim 1, wherein the activating composition comprises indium (In), tin (Sn), bismuth (Bi) and/or zinc (Zn), and wherein the In, Sn, Bi, and/or Zn is concentrated proximate to the grain boundaries of the aluminum alloy.

6. The composition of claim 1, wherein the activating composition is an eutectic composition comprising Ga and In.

7. The composition of claim 1, wherein the aluminum alloy comprises the activating composition in an amount less than or equal to 50 wt. % based on the total weight of the aluminum alloy.

8. The composition of claim 1, wherein the aluminum alloy comprises an average grain size of less than or equal to 500 micrometers.

9. The composition of claim 1, wherein the aluminum alloy comprises an average grain size of greater than or equal to 20 micrometers.

10. The composition of claim 1, wherein the aluminum alloy comprises an eutectic composition comprising Ga and In disposed within the grain boundaries and/or subgrain boundaries of the aluminum alloy.

11. The composition of claim 1, wherein the aluminum alloy comprises an equiaxed grain structure.

12. The composition of claim 11, wherein the aluminum alloy comprises an average grain size of less than or equal to 100 micrometers.

13. The composition of claim 1, wherein the aluminum alloy comprises an elongated grain structure.

14. The composition of claim 1, wherein the aluminum alloy comprises greater than or equal to 1 wt. % Si and greater than or equal to 1 wt. % Mg based on the total weight of the aluminum alloy.

15. The composition of claim 1, wherein the aluminum alloy comprises the activating composition in an amount greater than or equal to 20 wt. % based on the total weight of the aluminum alloy.

16. The composition of claim 1, wherein the aluminum alloy comprises the activating composition in an amount greater than or equal to 30 wt. % based on the total weight of the aluminum alloy.

17. The composition of claim 1, wherein the aluminum alloy comprises the activating composition in an amount greater than or equal to 40 wt. % based on the total weight of the aluminum alloy.

* * * * *